(12) United States Patent
Grigore

(10) Patent No.: US 11,809,846 B2
(45) Date of Patent: Nov. 7, 2023

(54) USER INTERFACE (UI) DESCRIPTORS, UI OBJECT LIBRARIES, UI OBJECT REPOSITORIES, AND UI OBJECT BROWSERS FOR ROBOTIC PROCESS AUTOMATION

(71) Applicant: UiPath, Inc., New York, NY (US)

(72) Inventor: Mircea Grigore, Bucharest (RO)

(73) Assignee: UiPath, Inc., New York, NY (US)

( * ) Notice: Subject to any disclaimer, the term of this patent is extended or adjusted under 35 U.S.C. 154(b) by 279 days.

(21) Appl. No.: 16/941,758

(22) Filed: Jul. 29, 2020

(65) Prior Publication Data
US 2022/0012025 A1    Jan. 13, 2022

Related U.S. Application Data

(63) Continuation of application No. 16/922,289, filed on Jul. 7, 2020.

(51) Int. Cl.
*G06F 8/38* (2018.01)
*G06F 8/34* (2018.01)
*G06F 9/451* (2018.01)
*G06V 30/148* (2022.01)
*G06V 30/10* (2022.01)

(52) U.S. Cl.
CPC ............ *G06F 8/38* (2013.01); *G06F 8/34* (2013.01); *G06F 9/451* (2018.02); *G06V 30/153* (2022.01); *G06V 30/10* (2022.01)

(58) Field of Classification Search
CPC .. G06F 8/38; G06F 9/451; G06F 8/34; G06K 9/344; G06K 2209/01
See application file for complete search history.

(56) References Cited

U.S. PATENT DOCUMENTS

| | | | |
|---|---|---|---|
| 9,555,544 B2 | 1/2017 | Bataller et al. | |
| 10,620,975 B1 | 4/2020 | Zohar et al. | |
| 2007/0201654 A1* | 8/2007 | Shenfield | G06F 9/465 |
| | | | 379/201.01 |
| 2010/0223325 A1 | 9/2010 | Wendker et al. | |
| 2011/0321008 A1 | 12/2011 | Jhoney et al. | |

(Continued)

FOREIGN PATENT DOCUMENTS

| | | |
|---|---|---|
| EP | 3112965 A1 | 1/2017 |
| WO | 2016141131 | 11/2016 |

OTHER PUBLICATIONS

Keith D Bloomquist, "Non-Final Office Action", dated Feb. 3, 2021, U.S. Appl. No. 16/922,289.

(Continued)

*Primary Examiner* — Keith D Bloomquist
(74) *Attorney, Agent, or Firm* — LeonardPatel PC; Michael A. Leonard, II; Sheetal S. Patel

(57) ABSTRACT

User interface (UI) object descriptors, UI object libraries, UI object repositories, and UI object browsers for robotic process automation (RPA) are disclosed. A UI object browser may be used for managing, reusing, and increasing the reliability of UI descriptors in a project. UI descriptors may be added to UI object libraries and be published or republished as UI object libraries for global reuse in a UI object repository. The UI object browser, UI object libraries, and UI object repository may facilitate reusability of UI element identification frameworks and derivatives thereof.

22 Claims, 62 Drawing Sheets

(56) References Cited

U.S. PATENT DOCUMENTS

| | | | |
|---|---|---|---|
| 2012/0173998 A1* | 7/2012 | Chaturvedi | G06F 11/368 715/762 |
| 2014/0250386 A1 | 9/2014 | Schick | |
| 2015/0067664 A1 | 3/2015 | Ligman et al. | |
| 2016/0034441 A1 | 2/2016 | Nguyen et al. | |
| 2017/0060368 A1 | 3/2017 | Kochura | |
| 2018/0217722 A1 | 8/2018 | Venkataraman et al. | |
| 2020/0050983 A1 | 2/2020 | Balasubramanian et al. | |
| 2021/0026594 A1* | 1/2021 | Kessler | G06F 40/30 |

OTHER PUBLICATIONS

International Search Report & Written Opinion, dated Apr. 7, 2021, PCT Application No. PCT/US20/52429.

International Search Report & Written Opinion, dated Apr. 7, 2021, PCT Application No. PCT/US20/52436.

Automation Anywhere Object Properties Configuration Page available at https://docs.automationanywhere.com/bundle/enterprise-v11.3/page/enterprise/topics/aae-client/metabots/getting-started/configuring-metabot-screens.html (updated May 12, 2020).

David Chappell, "Understanding RPA Scalability—the Blue Prism Example," available at https://www.blueprism.com/uploads/resources/white-papers/Understanding-RPA-Scalability-The-Blue-Prism-Example-1.0.pdf (2018).

Inflectra Rapise RPA Test Automation Features Page available at https://www.inflectra.com/rapise/highlights/robotic-process-automation.aspx (last accessed May 20, 2020).

Katalon Spy Web Utility Page available at https://docs.katalon.com/katalon-studio/docs/spy-web-utility.html (last accessed Jul. 27, 2020).

Keith D Bloomquist, "Final Office Action", dated Aug. 6, 2021, U.S. Appl. No. 16/922,289.

Keith D Bloomquist, "Examiner's Answer", dated Jan. 24, 2022, U.S. Appl. No. 16/922,289.

Decision on Appeal issued in U.S. Appl. No. 16/922,289, filed Apr. 6, 2023.

Keith D Bloomquist, "Notice of Allowance", dated Jul. 12, 2023, U.S. Appl. No. 16/922,289.

* cited by examiner

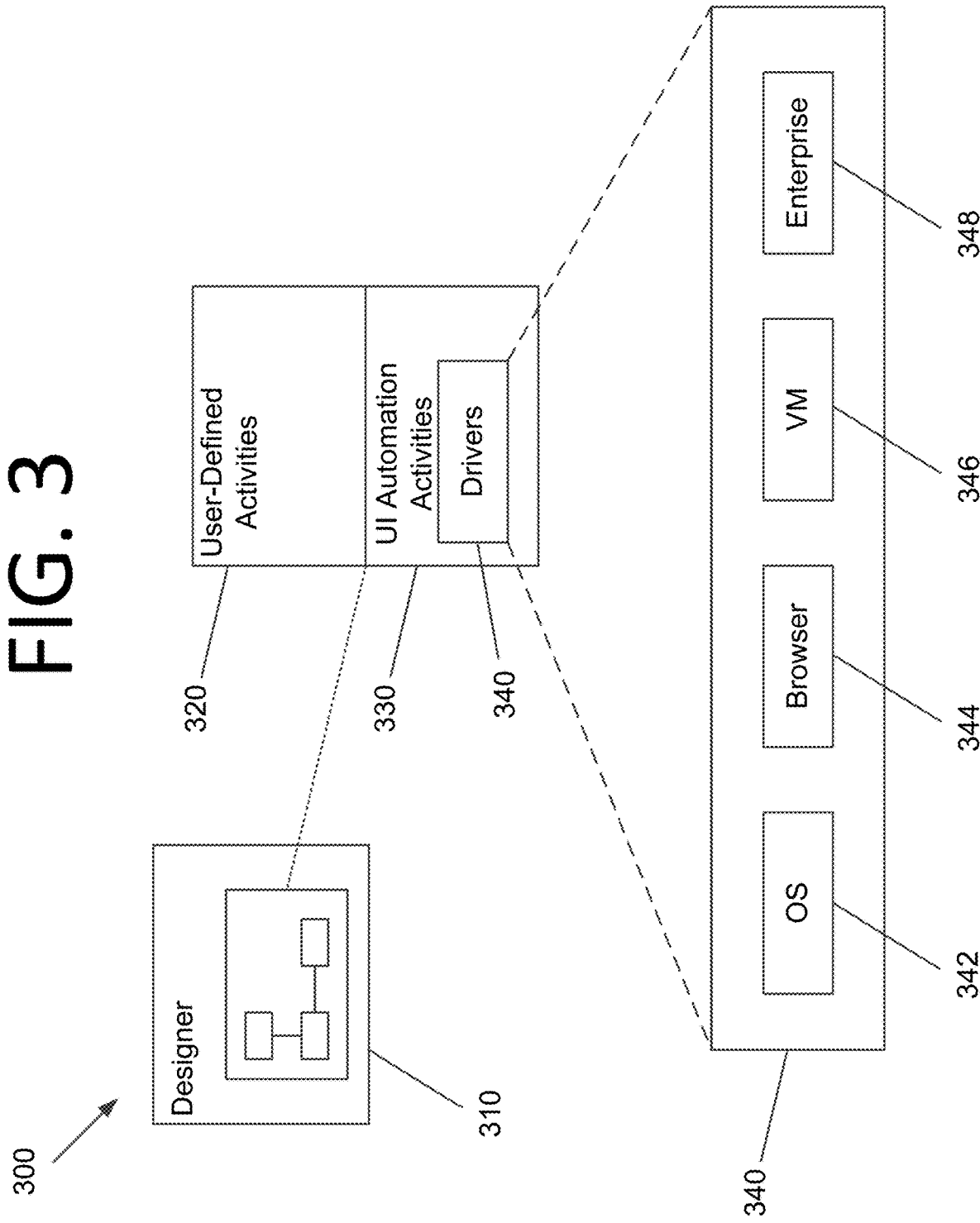

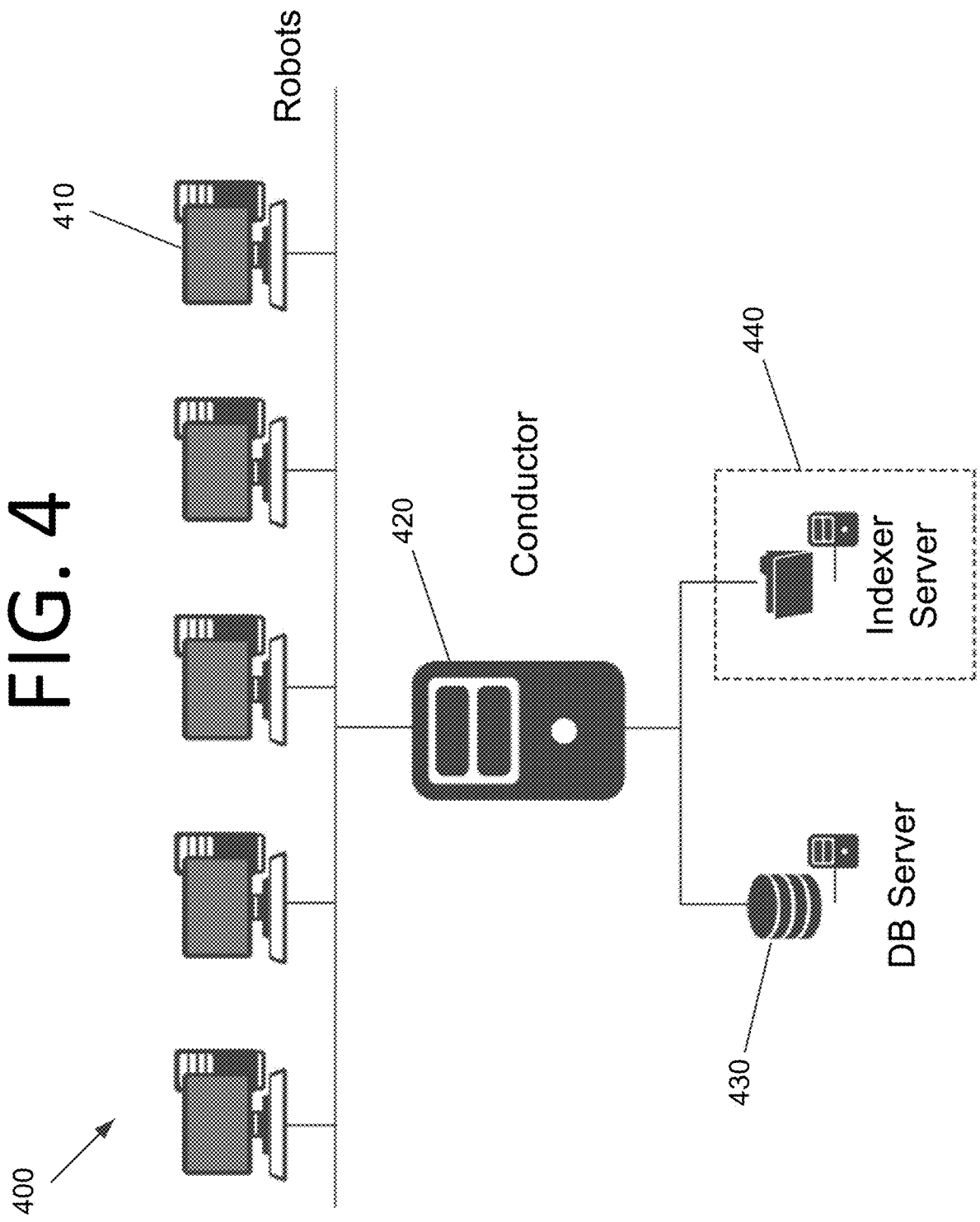

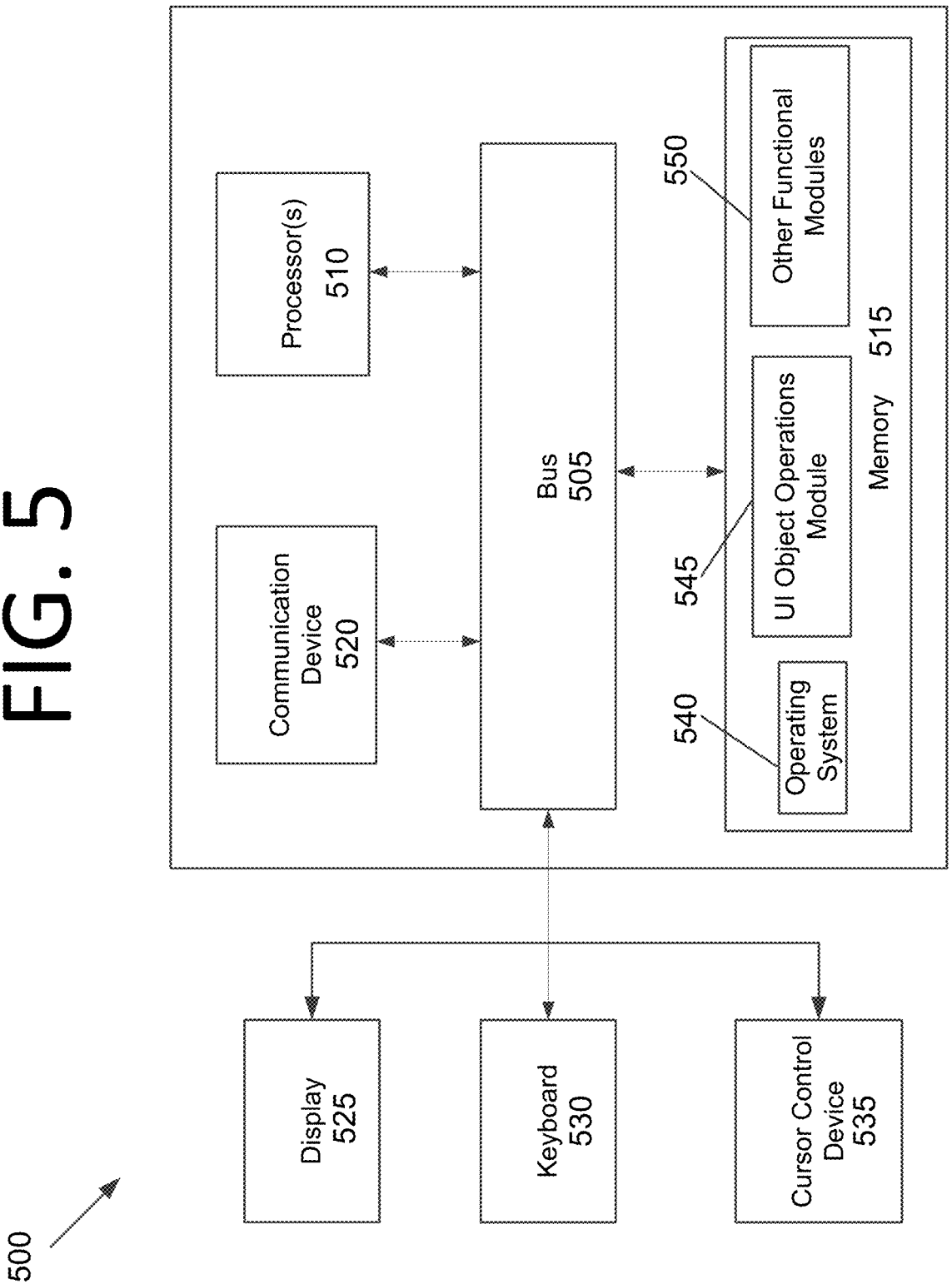

630

612

725

728

FIG. 7Z
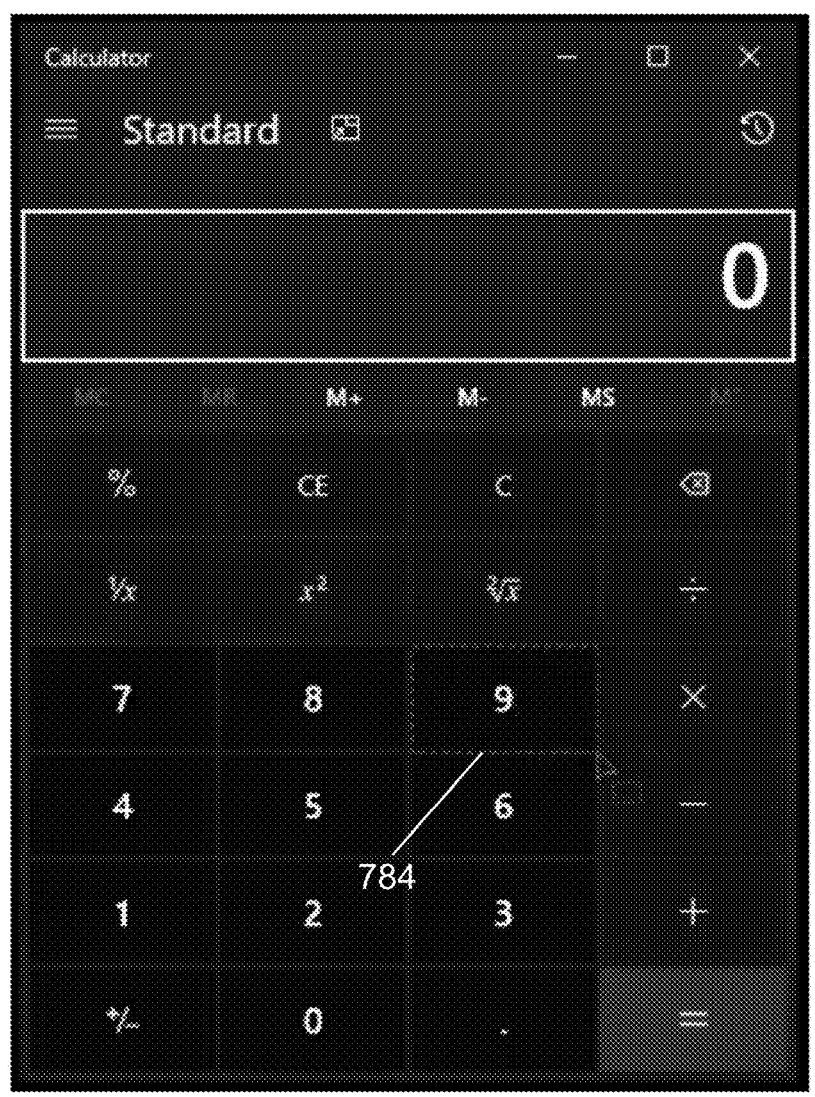
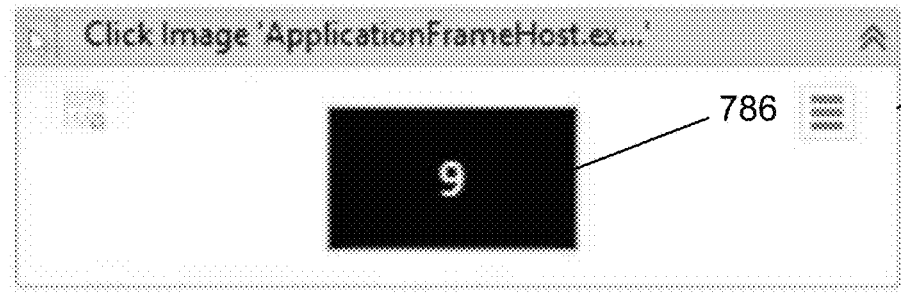

760

750

790

798

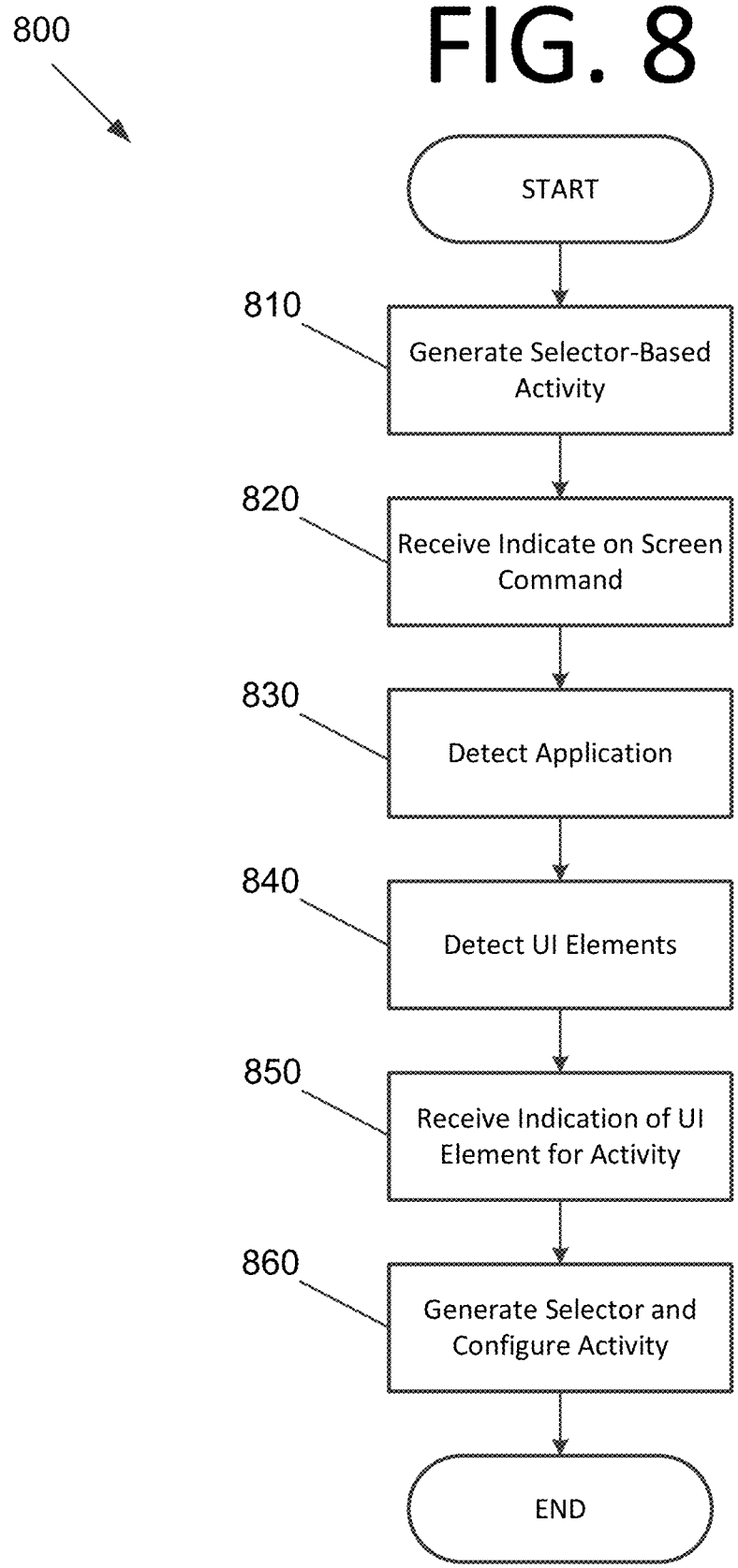

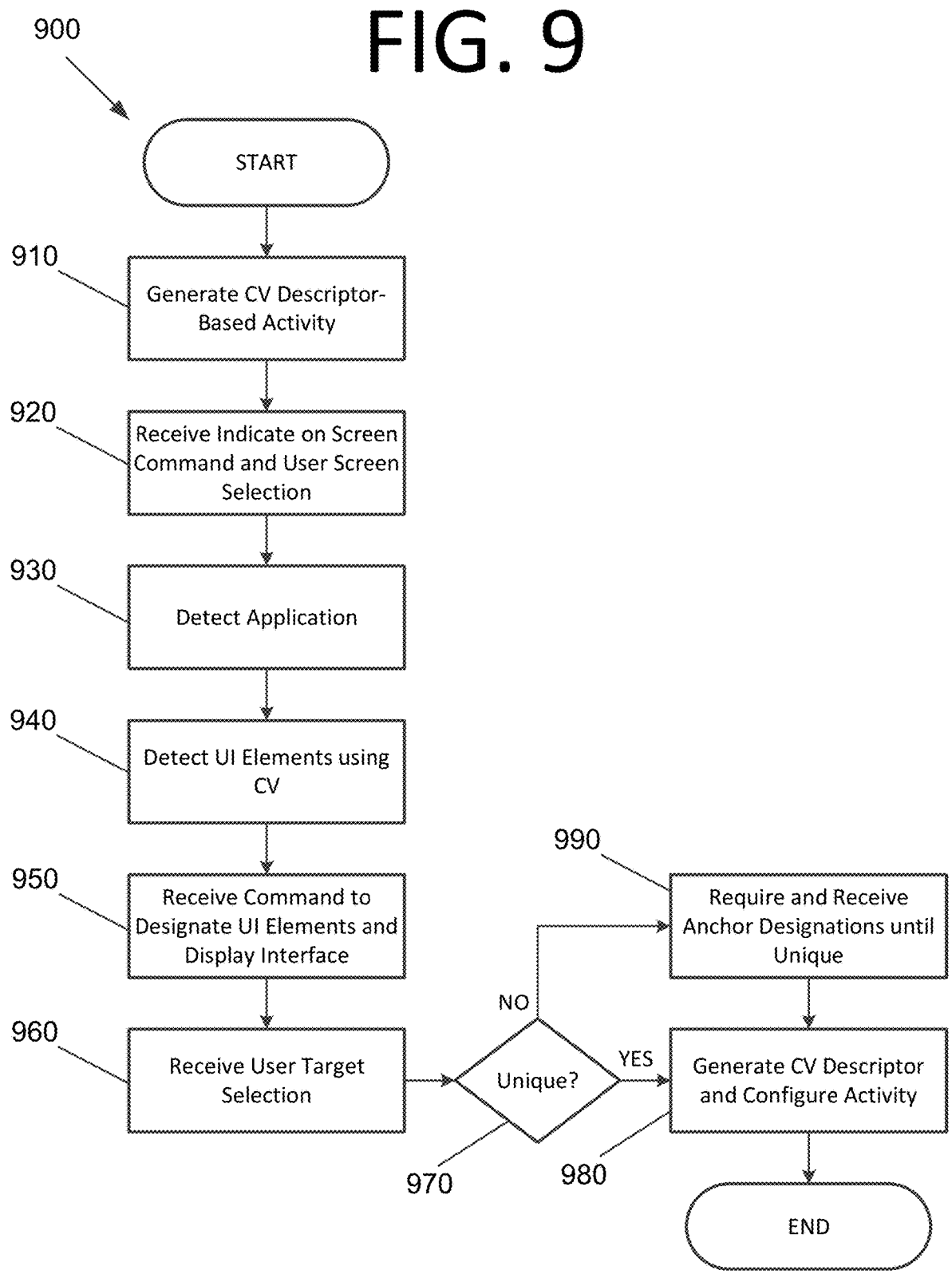

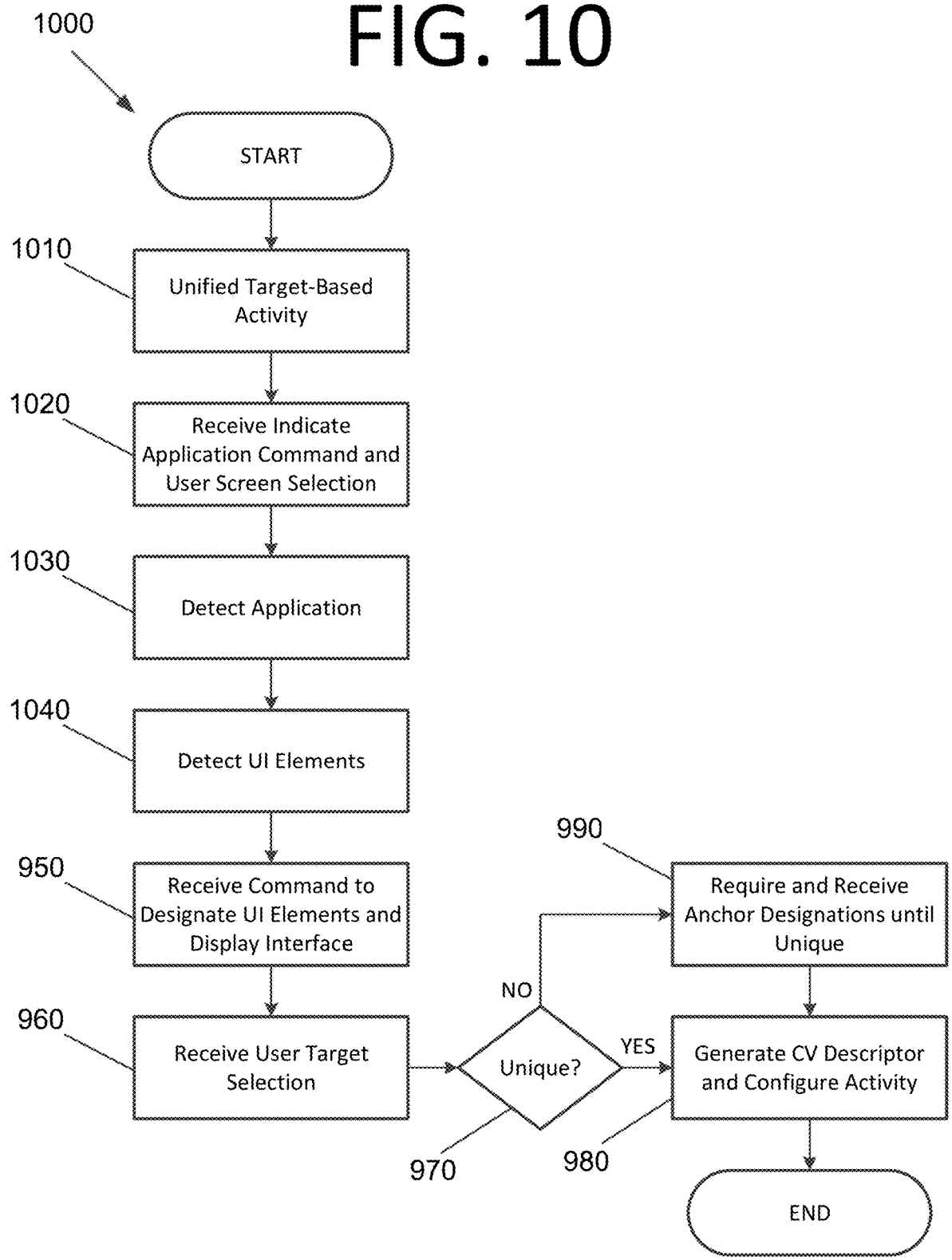

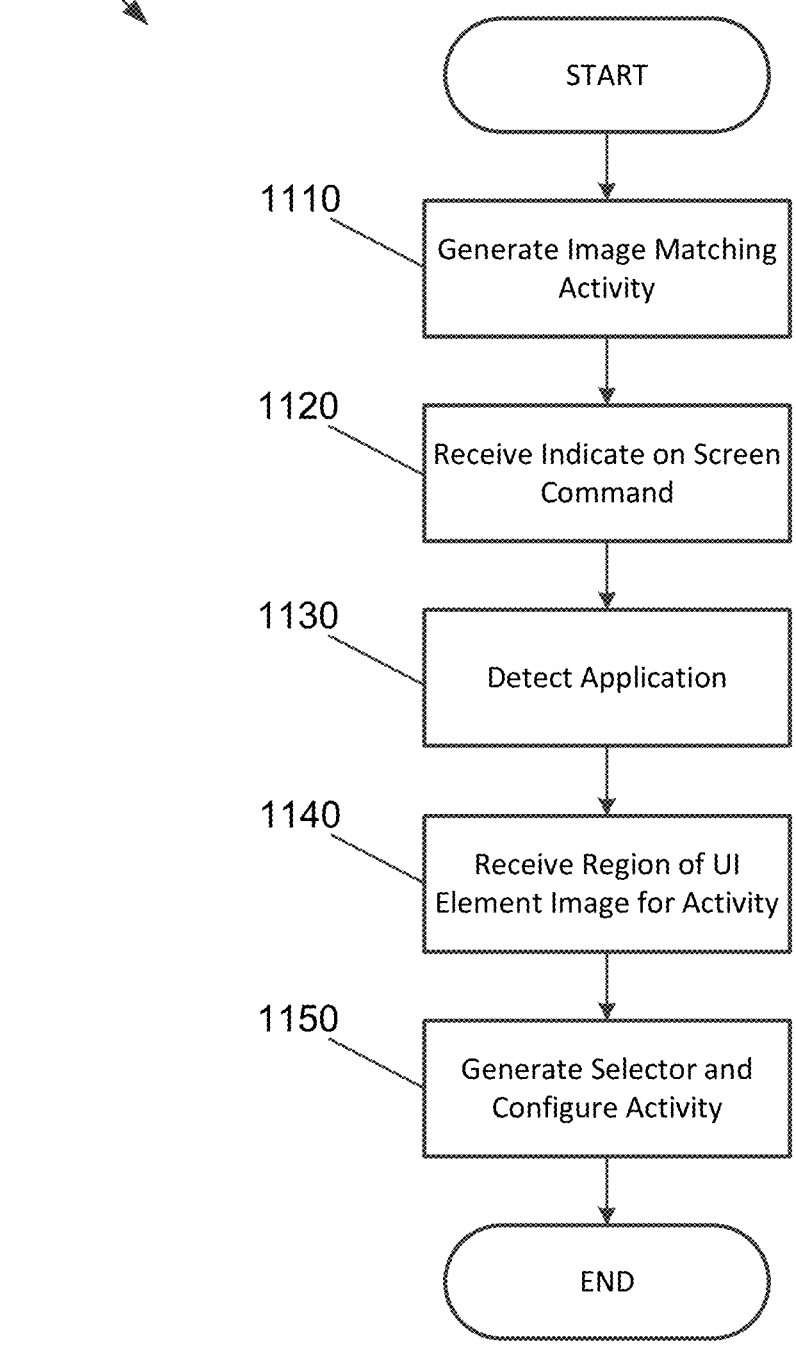

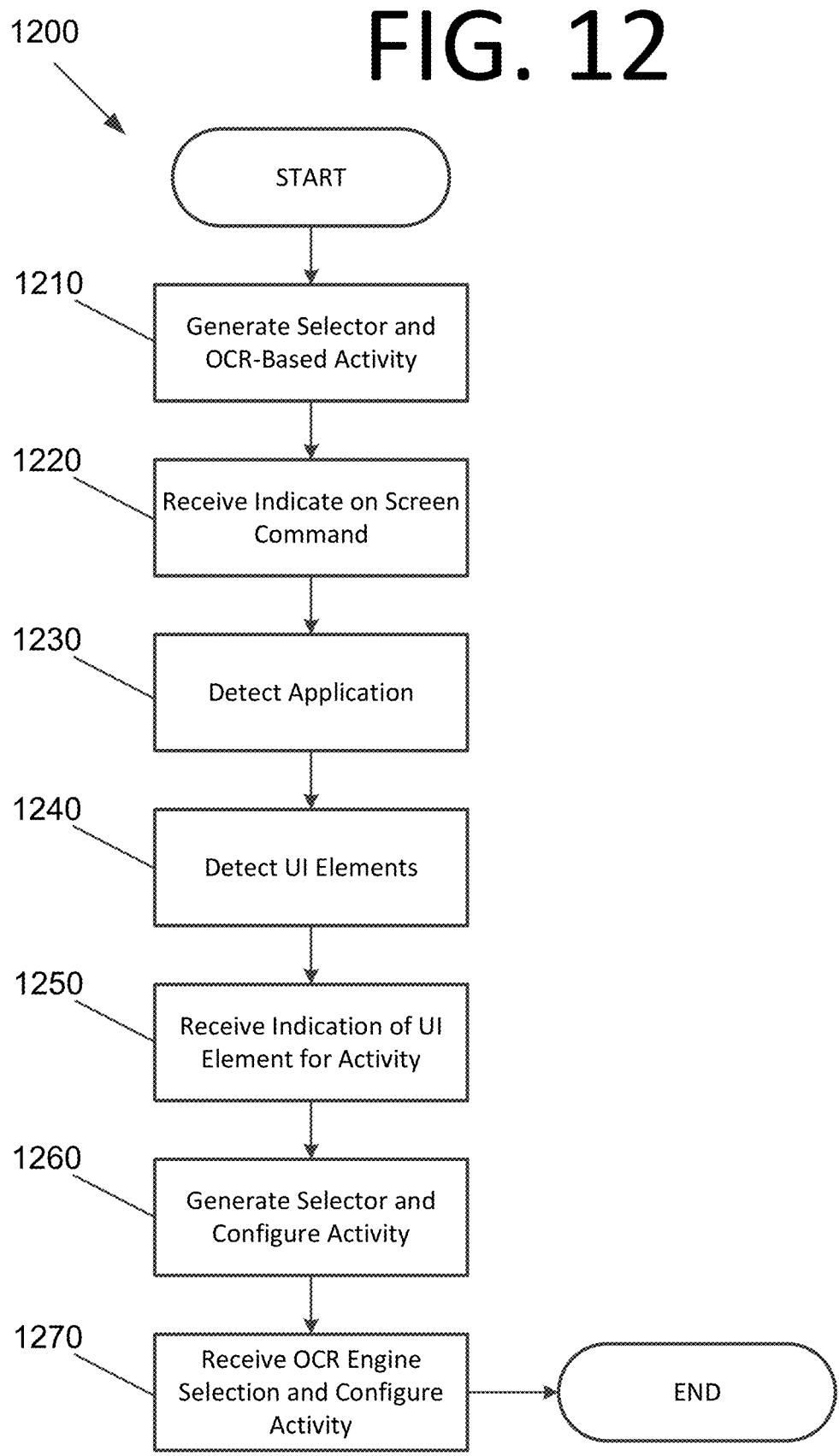

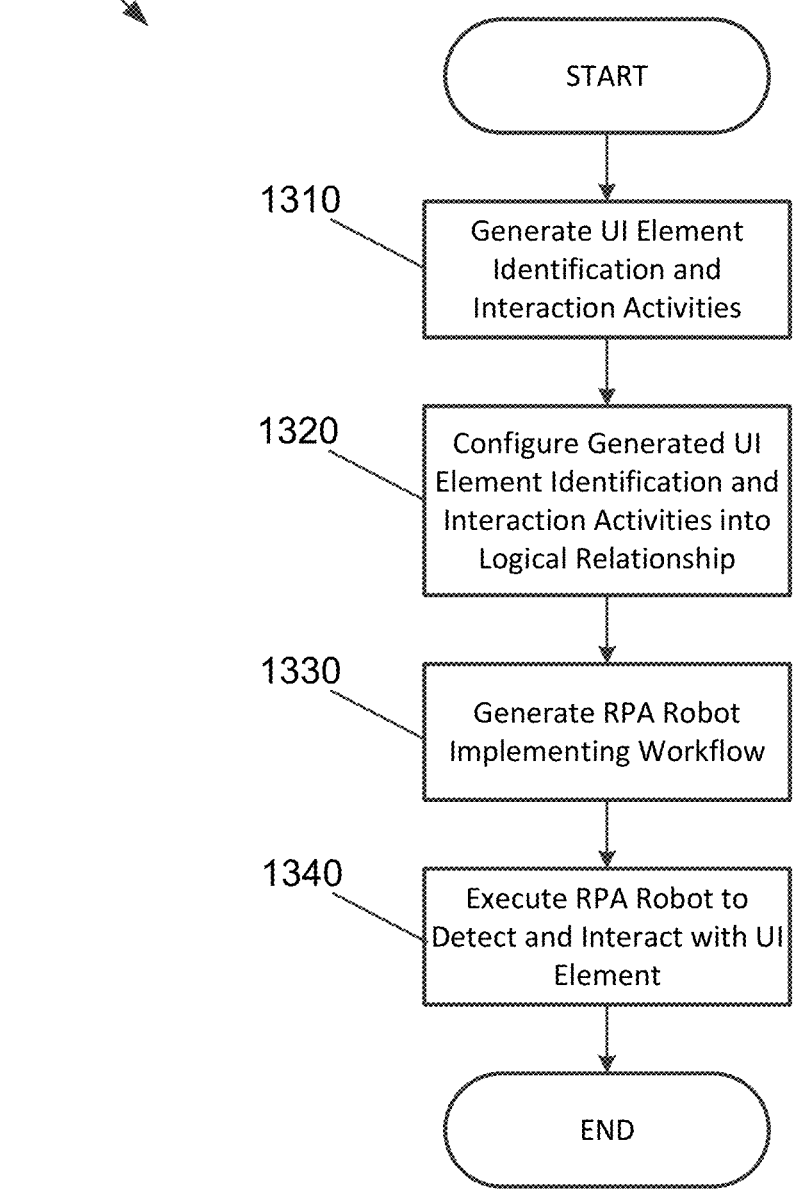

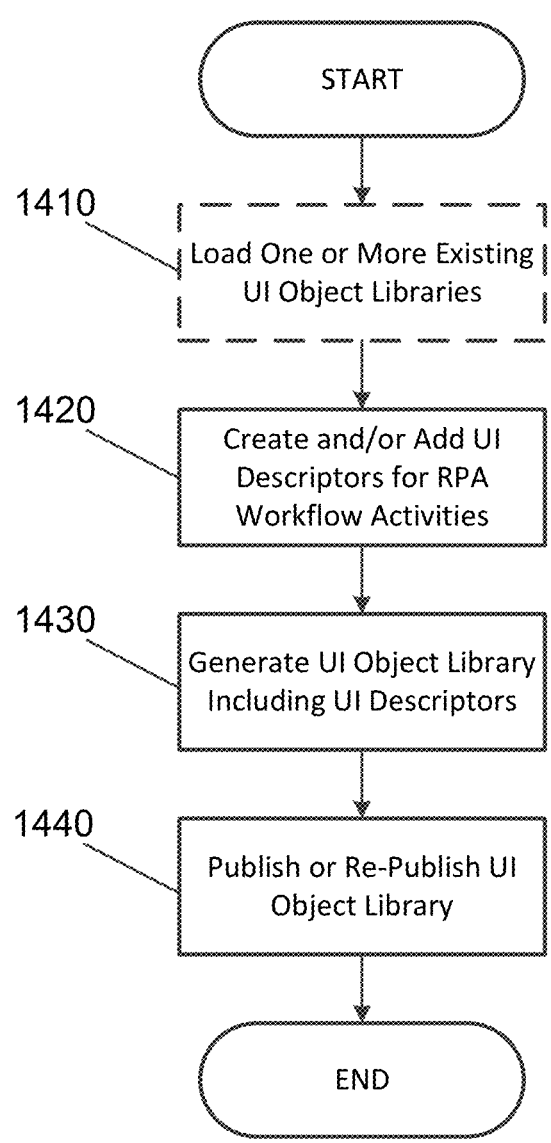

USER INTERFACE (UI) DESCRIPTORS, UI OBJECT LIBRARIES, UI OBJECT REPOSITORIES, AND UI OBJECT BROWSERS FOR ROBOTIC PROCESS AUTOMATION

CROSS-REFERENCE TO RELATED APPLICATION

This application is a continuation of U.S. Nonprovisional patent application Ser. No. 16/922,289 filed Jul. 7, 2020. The subject matter of this earlier filed application is hereby incorporated by reference in its entirety.

FIELD

The present invention generally relates to robotic process automation (RPA), and more specifically, to user interface (UI) object descriptors, UI object libraries, UI object repositories, and/or UI object browsers for RPA.

BACKGROUND

For RPA automation in a user interface (UI), developers typically build descriptors (e.g., selectors) for each UI action. Default descriptors are typically generated. However, building a reliable descriptor may consume developer time for troubleshooting and trial-and-error development, which may not be efficient. There is also a lack of reusability of descriptors when the same descriptor is needed. Furthermore, when systems and applications are changed or upgraded, the process upgrade path may not be straightforward. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to UI descriptors, UI object libraries, UI object repositories, and/or UI object browsers for RPA.

In an embodiment, a computer program for creating a user interface (UI) object library for RPA is embodied on a non-transitory computer-readable medium. The program is configured to cause at least one processor to detect an application associated with a screen of a UI and detect UI elements on the screen. The program is also configured to cause the at least one processor to receive a selection of a target UI element and generate a UI descriptor for the selected UI element and add the generated UI descriptor for the selected UI element to a respective RPA workflow activity. The program is further configured to cause the at least one processor to create and publish a UI object library including the UI descriptor in a UI object repository.

In another embodiment, a computer program is embodied on a non-transitory computer-readable medium. The program is configured to cause at least one processor to receive a selection of a target UI element on a screen of an application and generate a UI descriptor for the selected UI element. The program is also configured to cause the at least one processor to add the generated UI descriptor for the selected UI element to a respective RPA workflow activity. The RPA workflow activity is or includes a CV-based identification activity or a unified target identification activity.

In yet another embodiment, an RPA developer application is embodied on a non-transitory computer-readable medium. The RPA developer application is configured to cause at least one processor to detect an application associated with a screen of a UI and detect UI elements on the screen. The RPA application is also configured to cause the at least one processor to receive a selection of a target UI element and generate a UI descriptor for the selected UI element. The RPA developer application is further configured to cause the at least one processor to add the generated UI descriptor for the selected UI element to a respective RPA workflow activity. The RPA workflow activity is or includes a selector-based identification activity, a CV-based identification activity, a unified target identification activity, an image matching identification activity, or a selector and OCR-based identification activity. The RPA application includes a UI object browser that displays UI descriptors in one or more UI object libraries of a UI object repository, the one or more UI object libraries organized by application and version.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is an architectural diagram illustrating the relationship between a designer, activities, and drivers, according to an embodiment of the present invention.

FIG. 4 is an architectural diagram illustrating an RPA system, according to an embodiment of the present invention.

FIG. 5 is an architectural diagram illustrating a computing system configured to provide UI descriptors, object libraries, UI object repositories, and/or object browsers for RPA, according to an embodiment of the present invention.

FIG. 7O is a screenshot illustrating the CV-based identification activity in the workflow after the CV-based identification activity is configured with the target and anchors, according to an embodiment of the present invention.

FIG. 7Z illustrates screenshots of the Windows® 10 calculator as modified by UiPath Studio™ with a box drawn around the image to be clicked and a screenshot of the image from the selection box in the click image activity, according to an embodiment of the present invention.

FIG. 7a is a screenshot illustrating the properties tab with click image activity properties, according to an embodiment of the present invention.

FIG. 7b is a screenshot illustrating the selector editor for a selector for the image to be clicked, according to an embodiment of the present invention.

FIG. 7c is a screenshot illustrating a click OCR text activity in the workflow, according to an embodiment of the present invention.

FIG. 7d is a screenshot illustrating the click OCR text activity with a screenshot of the button to be clicked, according to an embodiment of the present invention.

FIG. 8 is a flowchart illustrating a process for generating a selector-based activity, according to an embodiment of the present invention.

FIG. 9 is a flowchart illustrating a process for generating a CV descriptor-based activity, according to an embodiment of the present invention.

FIG. 10 is a flowchart illustrating a process for generating a unified target-based activity, according to an embodiment of the present invention.

FIG. 11 is a flowchart illustrating a process for generating an image matching activity, according to an embodiment of the present invention.

FIG. 12 is a flowchart illustrating a process for generating a selector and OCR-based activity, according to an embodiment of the present invention.

FIG. 13 is a flowchart illustrating a process for generating an RPA workflow that uses multiple identification techniques, according to an embodiment of the present invention.

FIG. 14 is a flowchart illustrating a process for creating a UI object library and configuring a project to work with a new version of an application, according to an embodiment of the present invention.

Unless otherwise indicated, similar reference characters denote corresponding features consistently throughout the attached drawings.

DETAILED DESCRIPTION OF THE EMBODIMENTS

Figure 1:
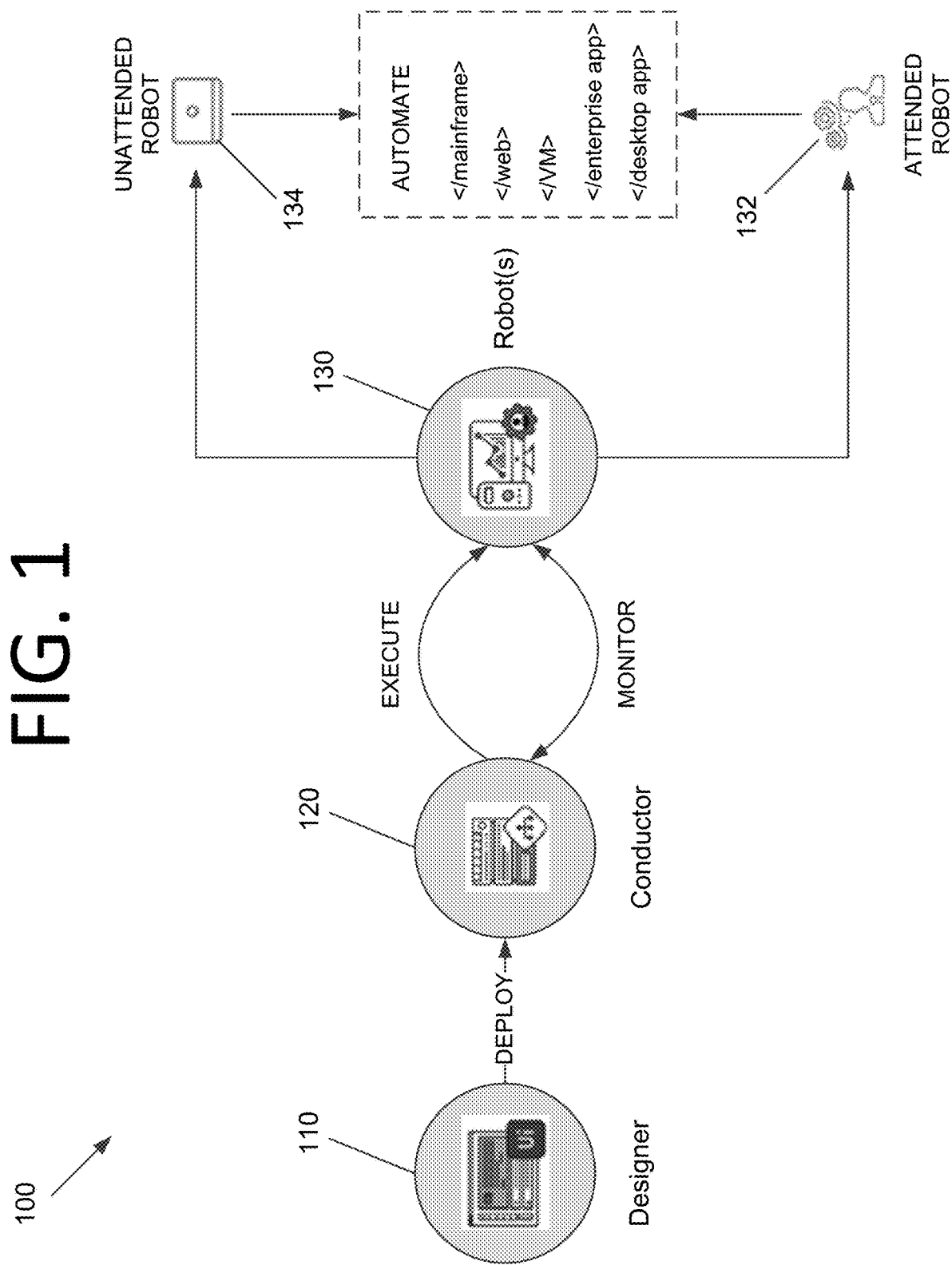
FIG. 1 is an architectural diagram illustrating a robotic process automation (RPA) system, according to an embodiment of the present invention.

Some embodiments pertain to UI descriptors, UI object libraries, UI object repositories, and/or UI object browsers for RPA. UI elements on the screen (e.g., text fields, buttons, labels, menus, checkboxes, etc.) can be grouped by applications, application versions, application screens, and collections of UI elements, and each screen has multiple UI elements. As used herein, a "screen" is an image of an application UI or a portion of the application UI at a certain point in time. An "application" or a version of a given application may be a union of screens in this context. Each UI element may be described by one or more UI descriptors in some embodiments. The UI elements, UI descriptors, applications, and application screens are UI objects. In some embodiments, UI elements and screens may be further differentiated into specific types of UI elements (e.g., buttons, checkboxes, text fields, etc.) and screens (e.g., top windows, modal windows, popup windows, etc.).

A UI object browser may access libraries of UI objects that may be grouped by applications, application versions, application screens, collections of UI elements, a combination thereof, etc. The UI object libraries may be stored in a UI object repository in some embodiments. As used herein, the UI object repository is a collection of UI object libraries. In some embodiments, the UI object repository may be a NuGet™ feed, a web service, etc.

The object browser may be used in some embodiments for navigating, managing, and editing UI object libraries in the UI object repository. The UI object repository of UI object libraries in some embodiments may facilitate the managing, reusing, and increasing the reliability of UI descriptors in a project. UI descriptors may be added to UI libraries and be published or republished for global reuse in a UI object repository in some embodiments. The UI object browser, by providing access to the UI object repository and its UI object libraries, may facilitate reusability of UI element identification frameworks and derivatives thereof.

To make UI objects reusable, they may be extracted into UI object libraries that can be referenced by RPA processes. When selectors or other UI descriptors are modified due to a new version of an application, for example, the library may be recreated (or republished) to include the modified UI descriptors. RPA processes using the UI object library may then call the modified UI descriptor versions. References to the new application programming interface (API) associated with the new library may be modified for an RPA process manually by a developer, modified via a software tool (e.g., a tool that goes through an RPA process and updates UI descriptor references when selectors or other components thereof change), or automatically in some embodiments.

In some embodiments, packages of UI objects may be attached as a dependency (e.g., NuGet™ packages). However, in certain embodiments, the UI objects may be obtained via one or more API calls to a web service. This enables the UI objects to be stored remotely and retrieved and used during the automation.

Initial building of UI descriptors previously required developers with technical knowledge of what happens behind the UI descriptors. However, many RPA processes are no longer built by software developers. These individuals can create RPA workflows with UiPath StudioX™, for example, which does not require in-depth programming knowledge. Some embodiments allow individuals creating RPA workflows to reuse descriptors, which provides time savings since a software developer is not required to build a new UI descriptor from scratch if a suitable UI descriptor is available to the individual creating the RPA workflow.

UI elements added to UI object libraries may represent selectors for use in RPA workflows. To automate specific actions in the UI, the RPA robot may interact with various windows, buttons, drop-down lists, and/or other graphical elements. Conventionally, this is done using the expected screen positions of UI elements. However, this is not dependable.

Some embodiments use selectors that overcome the problems associated with fixed coordinate identification by storing the attributes of a UI element and its parents in an XML fragment. While selectors may be automatically generated in some embodiments where the UI is static, some software programs, such as some web applications, have changing layouts and attribute nodes with volatile values. These changes may not be readily predictable, and this previously required manual generation of some selectors. However, the object browser of some embodiments may overcome this issue.

Selectors are a type of UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node, and represents the top window of the application.

Each node may have one or more attributes that assist with correct identification of a specific level of the selected application. Each node has the following format in some embodiments:

<ui_system_attr_name_1='attr_value_1' . . . attr_name_N='attr_value_N'/>

Every attribute may have an assigned value, and attributes with constant values may be selected. This is because changes to the value of an attribute each time the application is started may lead to the selector not being able to correctly identify the associated element.

UI object library descriptors may be added directly to an RPA workflow activity, saving developer time that may otherwise be required to create a custom selector for the activity. The object browser may provide a database storing created selectors in object libraries to enable the reusability of UI descriptors. An object library is defined herein as a collection of UI descriptors corresponding to one or more screens from a certain version of an application. A UI descriptor is a set of instructions for finding a UI element. UI descriptors in some embodiments are an encapsulated data/struct format that includes UI element selector(s), anchor selector(s), computer vision (CV) descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. A unified target descriptor chains together multiple types of UI descriptors. A unified target descriptor may function like a finite state machine (FSM), where in a first context, a first UI descriptor mechanism is applied, in a second context, a second UI descriptor is applied, etc.

In some embodiments, an RPA designer application may ask the user what type(s) of applications the user plans to automate. For instance, the user may specify Excel®, Workday®, SAP®, etc. The application may be programmed with logic regarding how to automate these applications since the RPA application already contains screen descriptors in UI object libraries for those applications. Out of the box selectors for various versions of these applications may be available, and the user may be able to designate version(s) to automate.

As used herein, the terms "user" and "developer" are used interchangeably. The user/developer may or may not have programming and/or technical knowledge. For instance, in some embodiments, the user/developer may create RPA workflows by configuring activities in the RPA workflow without manual coding. In certain embodiments, this may be done by clicking and dragging and dropping various features, for example.

Conventionally, making a selector reliable requires testing, understanding of intrinsic selector details, etc. This renders creating/refining selectors difficult or impossible for individuals without technical knowledge. By providing a library of working selectors for common UI elements and tasks, some embodiments allow development of automations that work in production by non-technical individuals. A user may indicate a screen of a version of an application to automate, and the RPA development application may fetch that screen. The user may then interact with the screen to define what he or she would like to do.

In some embodiments, as new UI descriptors are created and/or existing UI descriptors are modified, a global database of UI object libraries may be built that is sharable, collaborative, and potentially open source. In certain embodiments, taxonomies and ontologies may be used. Applications, versions, screens, UI elements, descriptors, etc. may be defined as a taxonomy, which is a hierarchical structure of subcategories.

However, many real-world concepts do not readily lend themselves to taxonomical organization. Rather, they may be closer to the concept of a mathematical ontology. In an ontology, the relationships between categories are not necessarily hierarchical. For instance, the case where a button on the screen takes the user to another screen when clicked cannot be readily capture by a taxonomy of that screen since the next screen is not in the hierarchy. When building graphs representing such a case, an object browser for an application may be modeled as an ontology that allows for the creation of interactions between UI elements on the same screen or different screens and provides more information on how UI elements relate to one another.

Consider the example where clicking an OK button leads to an employee screen. An ontological structure may cause the designer application to suggest that the user filter employees on the next screen. The ontological information of the relation between these screens via the OK button allows the designer application to do this. By defining a graphical structure that is not necessarily a tree, but rather, relates to what the application is actually doing, more complex and rich relationships can be captured.

Some embodiments pertain to or include a recorder that allows fetching screens and UI elements from an application faster. For instance, if a given screen has 250 different UI elements, it may take some time to fetch them one by one. A screen pointer may be used to fetch all UI elements that can then be edited. This may be helpful for creating the first version of the tree or ontology.

In some embodiments, the object browser may be exposed as a web service. If a user updates a selector or other UI descriptor, at runtime, an RPA robot may call the latest version of the service if appropriately configured. This allows the RPA robot to always use the current version of the UI descriptor.

UI descriptors may be extracted from activities in an RPA workflow and added to a structured schema that groups the UI descriptors by UI applications, screens, and UI elements. UI descriptors may be part of one project for wide reuse, part of global repositories for testing purposes, or part of UI object libraries for global cross-project sharing in some embodiments. An object library in some embodiments is an encapsulation of UI descriptors grouped by applications, application versions, and screens. UI descriptors can be defined and added to the object library, which can be installed in other projects as dependencies after publishing in some embodiments. This makes the object library of UI descriptors available for reuse. A UI application in some embodiments is a targeted application that has multiple versions where each version has multiple screens.

The UI object repository and UI descriptor reuse may be beneficial for a variety of reasons. For instance, if the location, appearance, and/or functionality of a UI element in an application changes, the UI descriptor may be changed, and the change may then be propagated to activities using the UI descriptor. Thus, reusability may be provided at the level of identifying graphical elements in a UI.

This may be especially beneficial for accommodating new versions of applications. For a new version, a software developer may only need to update UI descriptors and/or develop a few new selectors from scratch, substantially reducing development time. For a webpage, for instance, HyperText Markup Language (HTML) may be inspected to obtain paths to UI elements for the corresponding selectors. Selectors for corresponding UI elements may be different in different web browsers and/or different versions of the same web browser. This concept may and also apply to visual desktop, server, smart phone, and tablet applications. UI object libraries may contain the actual selectors for the application, which is just one type of UI descriptor, per the above. A UI object library may have multiple UI descriptors of different types for one or more applications. UI descriptors may also refer to different technologies with which the application is built. For instance, different UI descriptors may be created and used for standalone desktop, web, and mobile applications. For one technology, you may want to use selectors, for another, you may want to use CV descriptors, etc.

The UI descriptors may work with a unified target that encompasses all UI detection mechanisms through which image detection and definition are performed in some embodiments. The unified target may merge multiple techniques of identifying and automating UI elements into a single cohesive approach. The unified target may prioritize selector-based and driver-based UI detection mechanisms and fallback on CV to find an image if the first two mechanisms are not successful. A selector editor and UI explorer may be configured to support the unified target in some embodiments.

In some embodiments, the designer application includes a section or a panel as an "object browser" that loads object libraries from one or more sources. This object browser may allow a user to visualize the entire UI object set and use any of the UI descriptors via drag and drop and wizards or contextual actions. This may allow the user to choose an action to be performed in an RPA workflow activity, such as click, get text, type into, etc.

An example of an object library structure is provided below.

- SAP
  - version 1
    - screen 1
      - object 1
      - object 2
      - ...
    - screen 2 ...
    - ...
  - version 2 ...
  - ...
- Salesforce ...
- ...

It should be noted that the hierarchy above is provided by way of example only. Any desired number of levels in the hierarchy and elements associated with each level may be used without deviating from the scope of the invention. In certain embodiments, the user can define the application map as he or she desires. Moreover, some nodes in the tree may only serve a management role and not a functional one in some embodiments. For instance, UI elements may be grouped together into a container that does not have UI descriptors. The container may exist for the purpose of grouping only in some embodiments.

A scope can be defined in the designer application by a user in some embodiments through a selection from a set of screens that are available in the object library. When the scope is tied 1-to-1 to a certain screen, the user can add UI actions (e.g., clicks, get text, etc.) and then use intelligent sensing of potential candidate options to map those actions to UI Objects. The set of objects may be limited to the list that is defined for the screen inside the UI object repository (e.g., a database of UI object libraries) in some embodiments.

For example, once the structure of the application screens, UI elements, etc. is determined, a list of identified applications may be provided. In certain embodiments, the user may then select an application for automation, drag the selected application to a canvas, write "SAP", press ".", and all SAP® screens may be listed. After selecting a screen, additional candidate elements, functions, etc. may appear. This allows the user to select the predicted UI elements, functions, applications, and screens.

In some embodiments, when an OLDB is configured in UiPath Studio™, for example, "indicate on screen" may look into the OLDB and pick up the UI descriptor, if available. If the UI descriptor is not available, the UI descriptor may be defined by the user by indicating the missing UI elements. The UI descriptor may then be generated and published in a UI object library.

Usage of the UI descriptors and UI object repository in some embodiments creates relationships and data that can be further expanded on. The UI steps from the automation process can be mapped to a single screen in some embodiments. For example, a screen that contains a form where the user adds and retrieves some data and then hits submit can be documented with a single screenshot that contains the screen capture and each UI step performed on that screen, such as: (1) copied amount; (2) copied number; (3) added name; and (4) clicked "OK."

In case of upgrading processes affected by systems and applications upgrades, "find references" services may be implemented. The find references services may provide the ability to scan a set of projects from a repository and detect processes that are using UI descriptors that belong to a certain application version. The application version may be determined based on a corresponding screen of a UI descriptor in some embodiments. Further, a service may be implemented for detecting differences between UI descriptors that have matching elements from two different versions of an application. The detected processes and the differences of the UI descriptors provide information about processes that may break when an application or a system is upgraded. These processes may be automatically updated to use the UI descriptors from the new application version.

The OLDB UI object repository may be enhanced using OLDB analytics in some embodiments. A mechanism to extract a UI descriptor may be implemented. The extracted UI descriptor data may be sent via the OLDB analytics before or after creation/definition time. Further, the extracted UI descriptor data may give a set of new data that can be used to improve the strength of the UI descriptor for each UI element from any screen of any version of any application using artificial intelligence (AI) and machine learning (ML) techniques in some embodiments.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 may be triggered by user events or be scheduled to automatically happen, and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments or on physical machines, and can automate many processes. Unattended robots 134 may be responsible for remote execution, monitoring, scheduling, and providing support for work queues. Debugging for all robot types may be run from designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
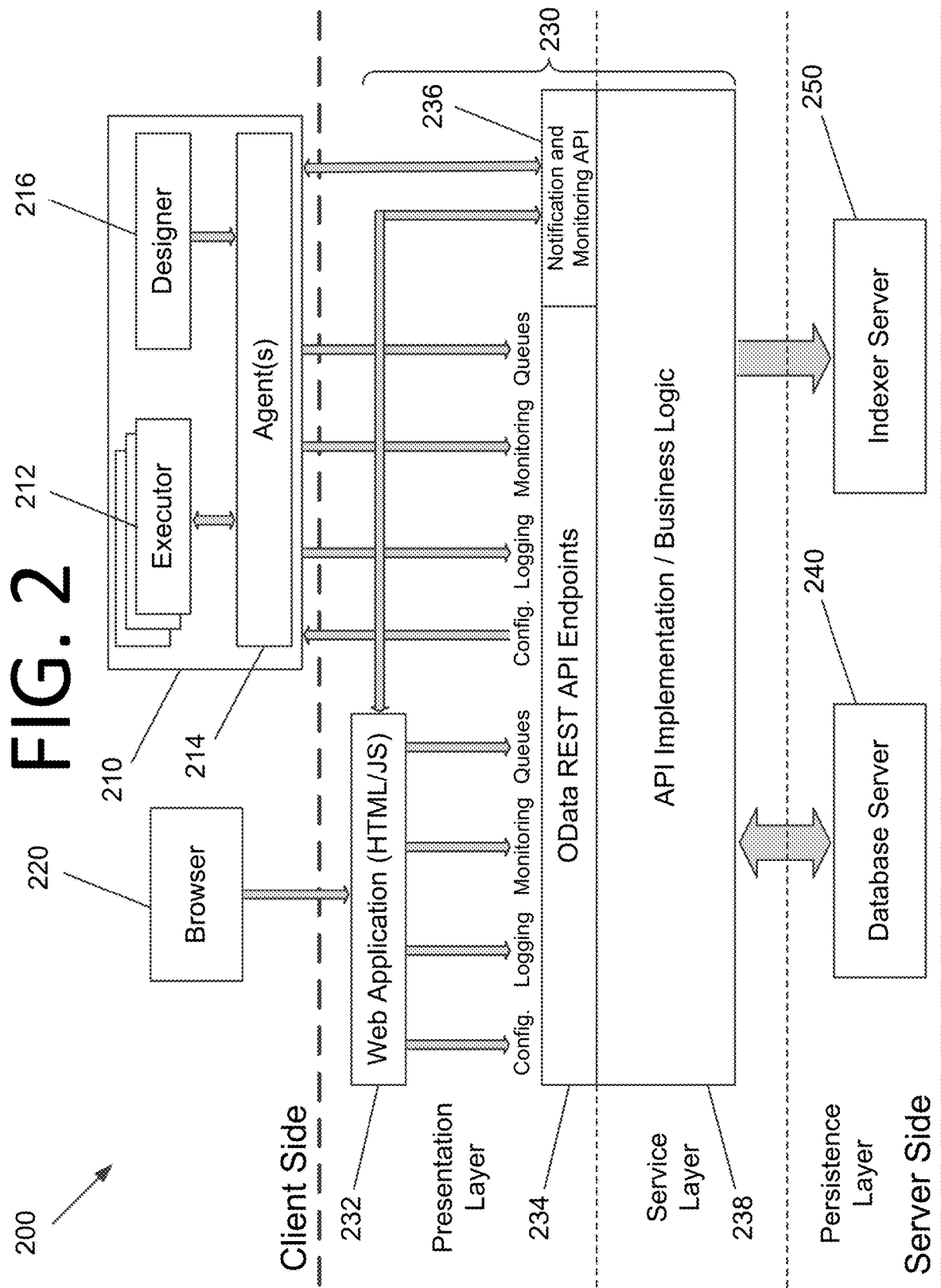
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with applications through the UI layer. In certain embodiments, UI automation activities 300 may simulate" user input through window messages or the like, for example. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client and/or server software may be used without deviating from the scope of the invention. For instance, the conductor may run a server-side application that communicates with non-web-based client software applications on the client computing systems.

FIG. 5 is an architectural diagram illustrating a computing system 500 configured to provide UI descriptors, UI object libraries, UI object repositories, and/or object browsers for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a UI object operations module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Some embodiments store object libraries of collections of UI descriptors corresponding to a screen from a certain version of an application in a database. The object library may be created by an RPA designer application (e.g., UiPath Studio™) when a user is developing an RPA UI automation. This may assist in creating a more extensible and adaptable collection of UI objects that can be used to accommodate post-design time changes, such as new versions of applications.

Consider the case where an employee uses one or more RPA robots to perform tasks on software applications running on his or her computer. The information technology (IT) department then upgrades software applications with which the RPA robot interacts. If the company's RPA team did not make changes to the modified UI descriptors called the RPA robot workflows in advance, some of the RPA processes may now be broken since the RPA robots can no longer find certain UI elements in the applications due to the changes in the new versions (e.g., changed UI element functionality and/or appearance, UI elements being removed entirely or moved to a new screen, etc.). If the UI descriptors for the UI elements for both versions already exist, the UI descriptors for the new version could be swapped with the UI descriptors for the previous version in the appropriate activities of the RPA workflows, and the RPA robots should then work on the new version.

Figure 6A:
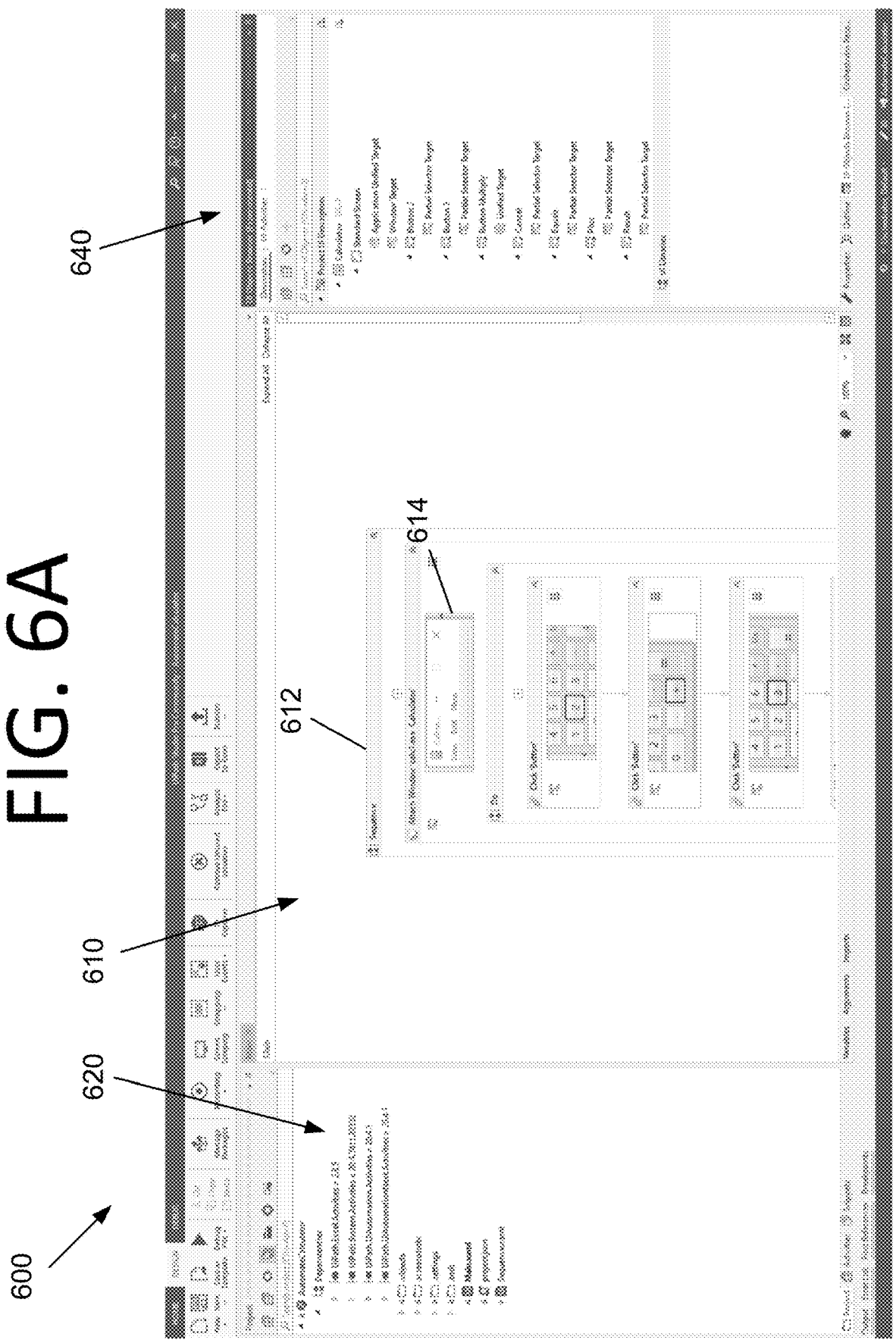
FIG. 6A is a screenshot illustrating an RPA designer application, according to an embodiment of the present invention.

FIG. 6A is a screenshot illustrating an RPA designer application 600, according to an embodiment of the present invention. RPA designer application 600 includes a main RPA development pane 610 that includes an RPA workflow 612 (in this example, a sequence). A "snippets" pane 620 includes reusable components or common automation items that are reusable and applicable in multiple workflows. A properties pane 640 shows properties of a selected activity 614 of RPA workflow 612.

Figure 6B:
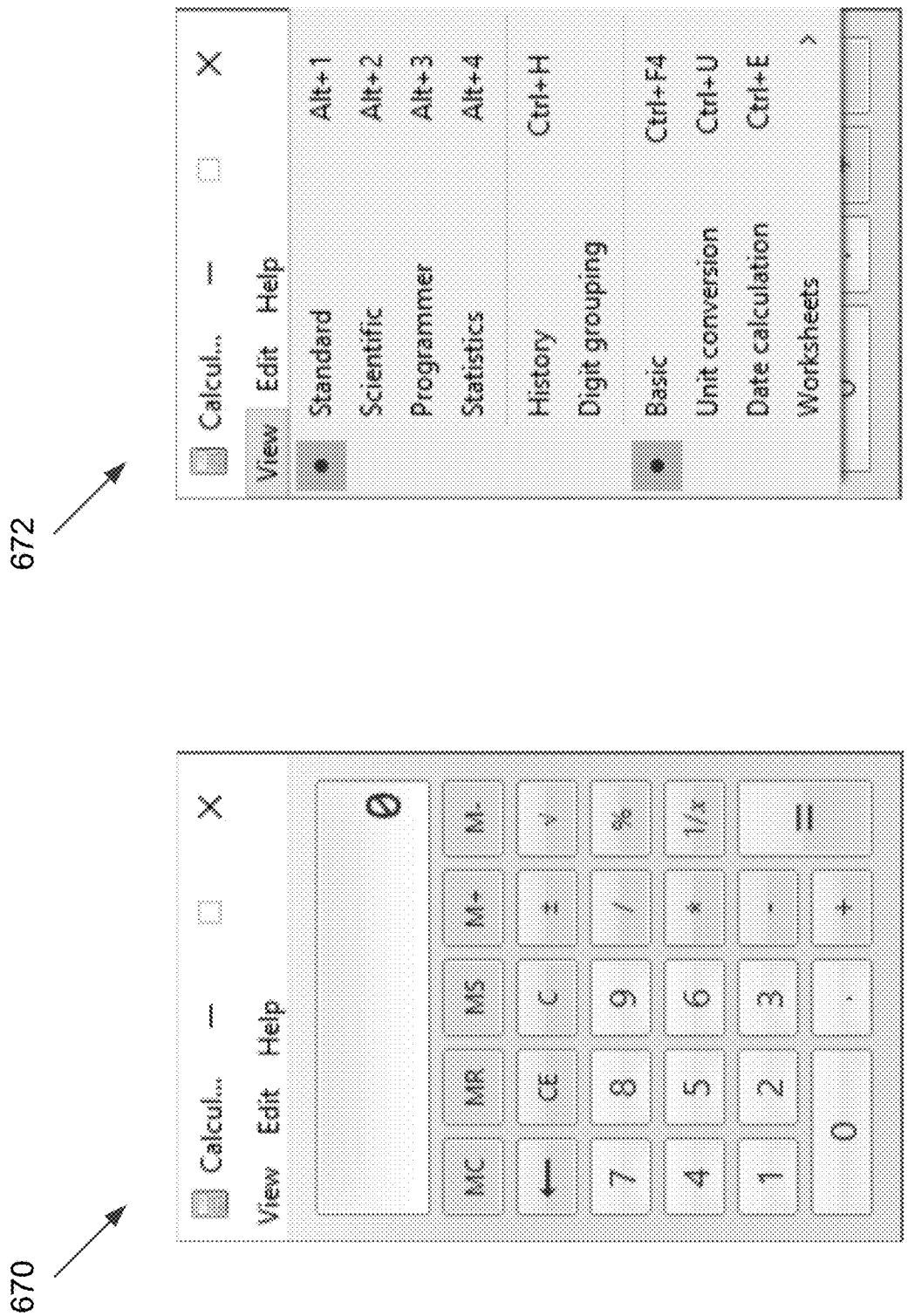
FIG. 6B is a screenshot illustrating the Windows® 7 calculator standard view screen and the view selector tab.
Figure 6C:
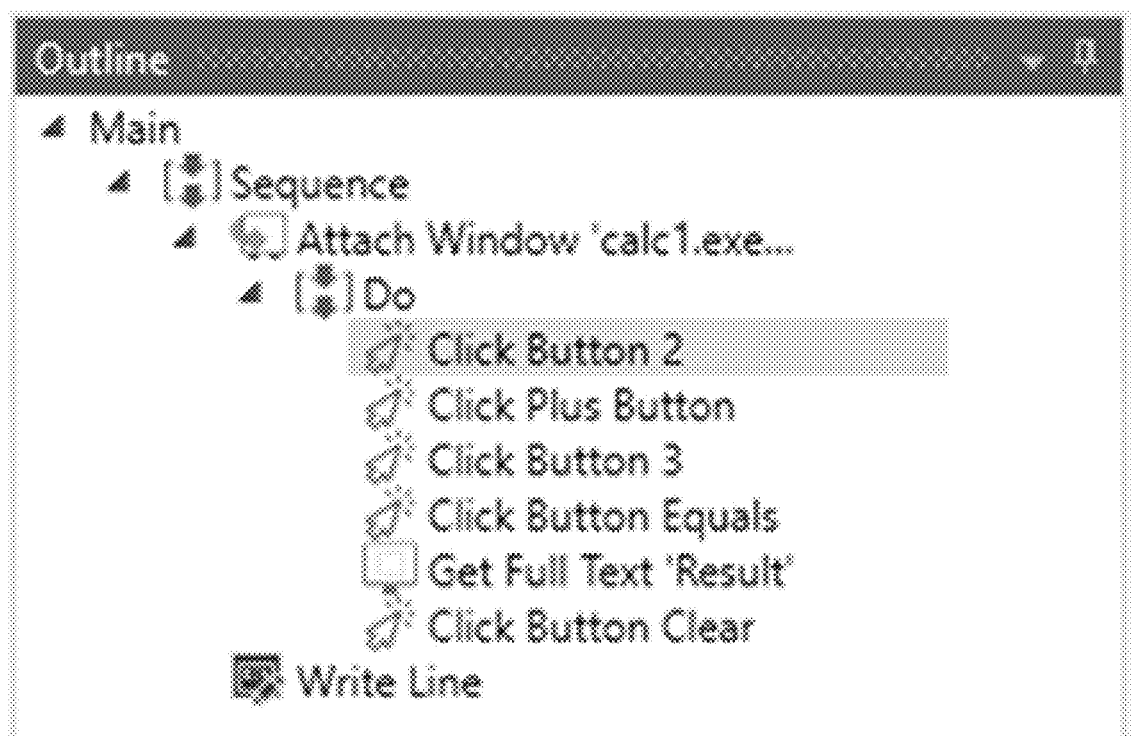
FIG. 6C is an enlarged screenshot view illustrating the sequence in an outline pane of the RPA development application as shown in FIG. 6A, according to an embodiment of the present invention.

In this embodiment, RPA workflow 612 performs a sequence of actions on standard screen (or window) 670 of the Windows® 7 calculator. See FIG. 6B. The user can select from different screens for different calculator settings using view tab 672. The sequence of actions in RPA workflow 612 is clicking button 2, clicking the plus button, clicking button 3, clicking the equals button, getting the text for the result, clicking the clear button, and writing the result via a "write line" operation. An enlarged view of the sequence in outline pane 630 is shown in FIG. 6C.

Figure 6D:
FIG. 6D is an enlarged screenshot view illustrating a snippets pane of the RPA development application as shown in FIG. 6A, according to an embodiment of the present invention.

An enlarged view of snippets pane 620 is shown in FIG. 6D. Snippets pane 620 includes workflow snippets, which may be ready-made workflows that the developer can invoke/include in his or her own workflows (e.g., RPA workflow 612) in RPA designer application 600. Snippets pane 620 may provide a sandbox where a team a company, all interested developers, or any other group of developers can save UI descriptors for elements to be automated in some embodiments. Snippets pane 620 includes UI descriptors 621, which are arranged by application. Under calculator application 622, the Windows® 10 selectors are organized under Windows® 10 version 623, standard window 624, target UI elements 625, and respective UI element selectors 626. The Windows® 7 selectors are organized under Windows® 7 version 623A, standard window 624A, target UI elements 625A, and respective UI element selectors 626A. While selectors are used in this embodiment, CV descriptors, unified target descriptors, or both, could be included in addition to or in lieu of the UI element selectors in some embodiments.

Figure 6E:
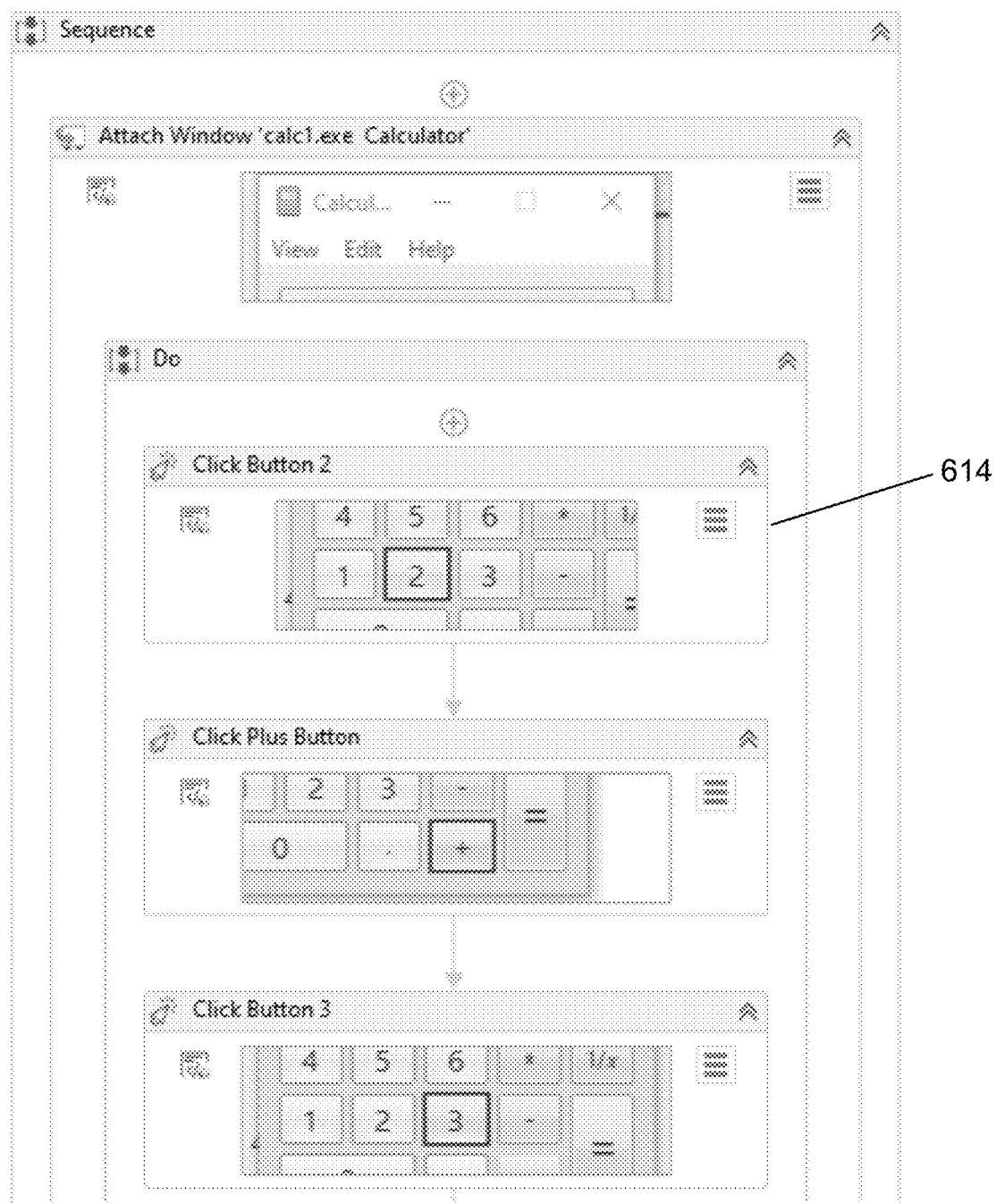
FIGS. 6E and 6F are screenshots showing activities of an RPA workflow with screenshots of respective UI elements for each activity, according to an embodiment of the present invention.
Figure 6F:
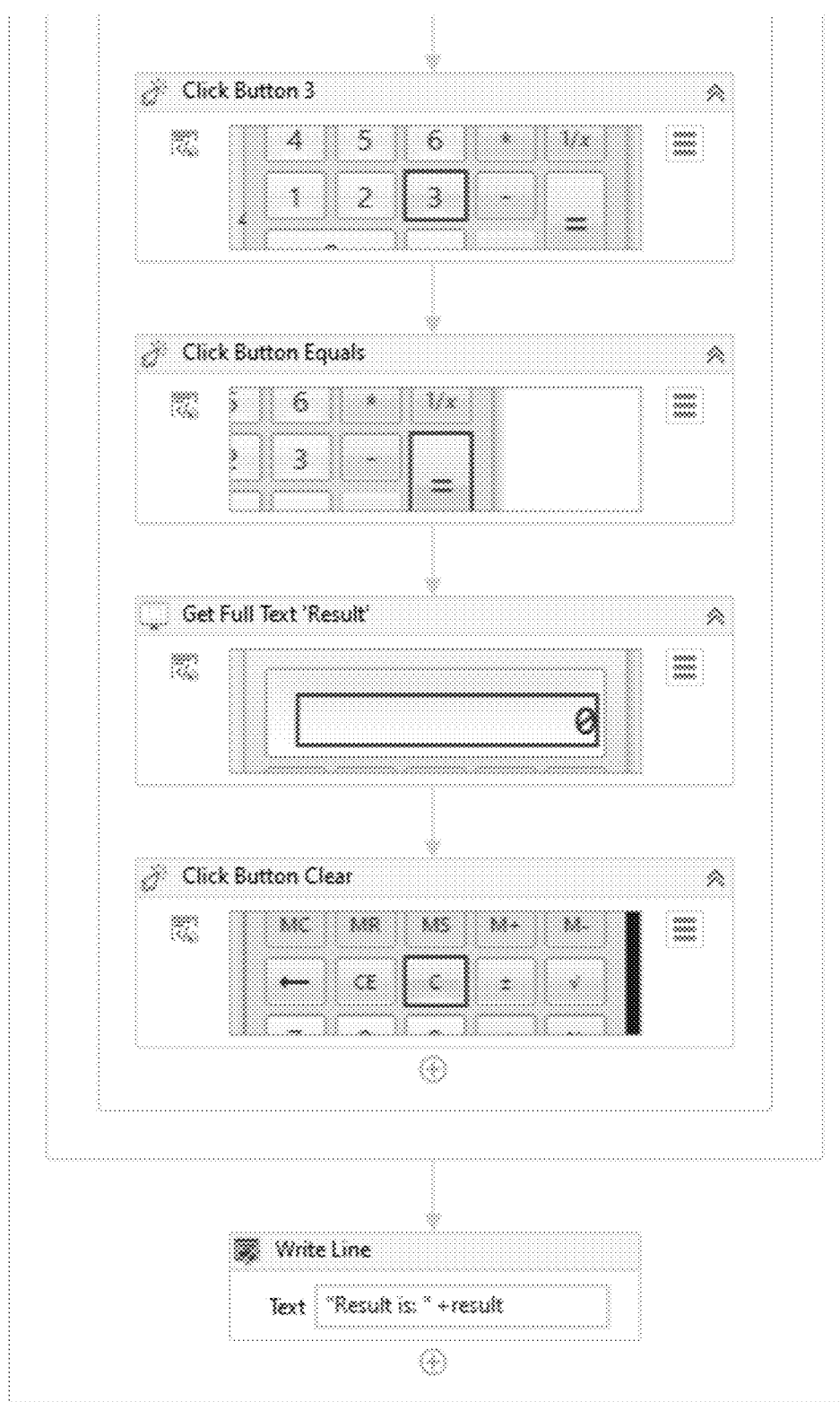
Figure 6G:
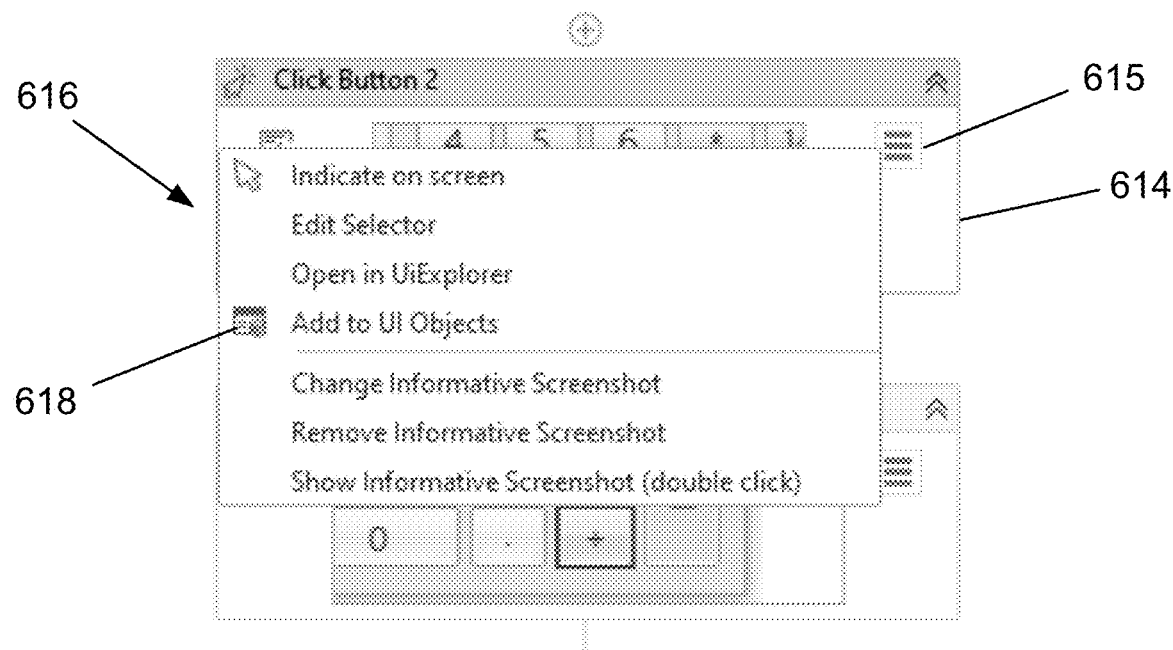
FIG. 6G is a screenshot illustrating a menu of options for a workflow activity, according to an embodiment of the present invention.

FIGS. 6E and 6F show activities of the sequence of RPA workflow 612. Screen captures of the portions of the Windows 7® standard calculator screen that correspond with each of the activities are shown for that activity and highlighted, where applicable. The respective UI elements for the activities may have been selected using "indicate" functionality in UiPath Studio™, for example, as is discussed in more detail later herein with respect to using multiple UI descriptor types for an activity. In this manner, the user can visually verify that the RPA workflow should interact with the desired UI element. By clicking a button 615 for activities that interact with UI elements, a menu 616 appears. See FIG. 6G. The user may add the respective UI object to an object browser by selecting add to UI objects option 618.

Figure 6H:
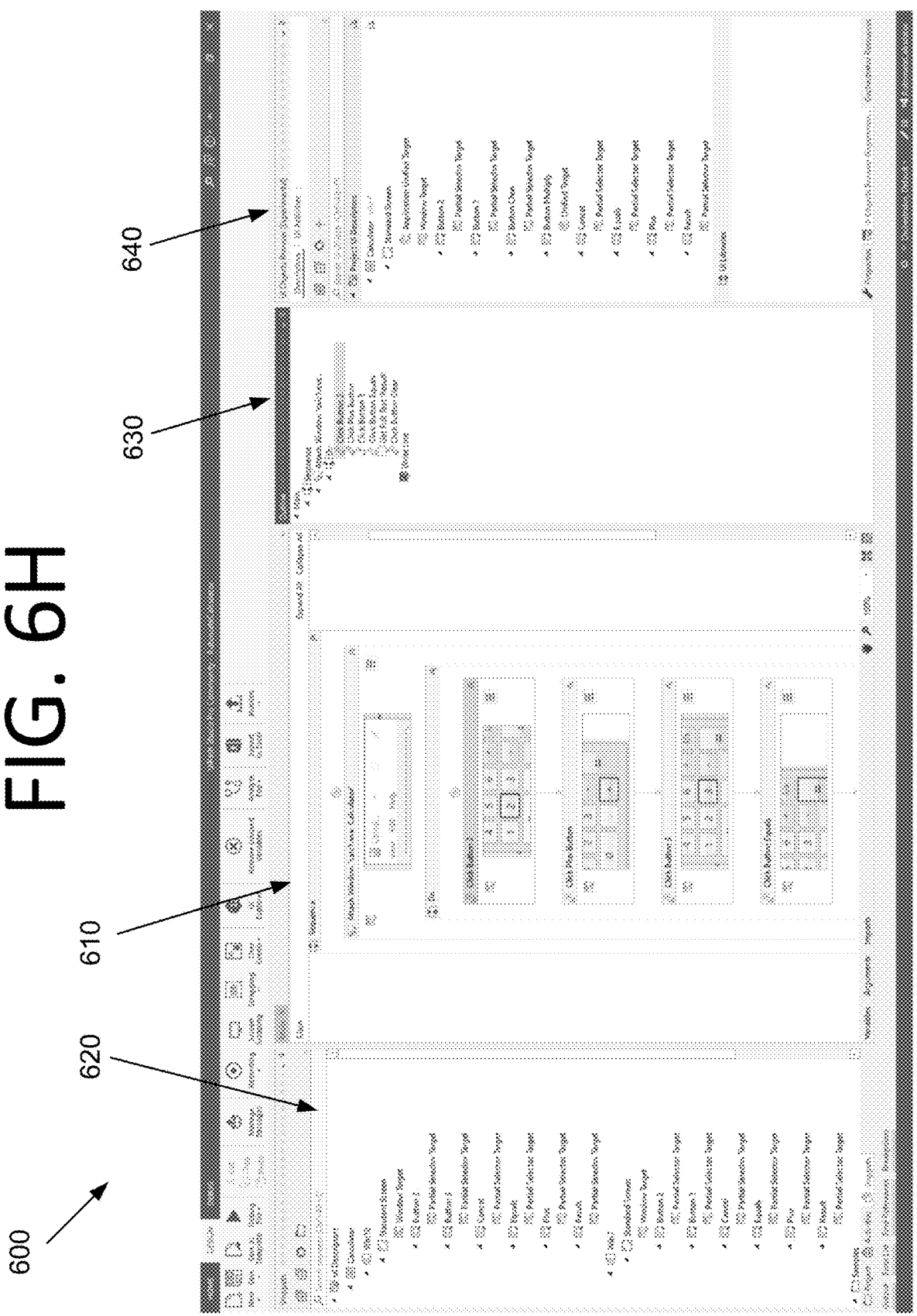
FIG. 6H is a screenshot illustrating the RPA designer application with properties for a click activity shown in a properties pane, according to an embodiment of the present invention.
Figure 6I:
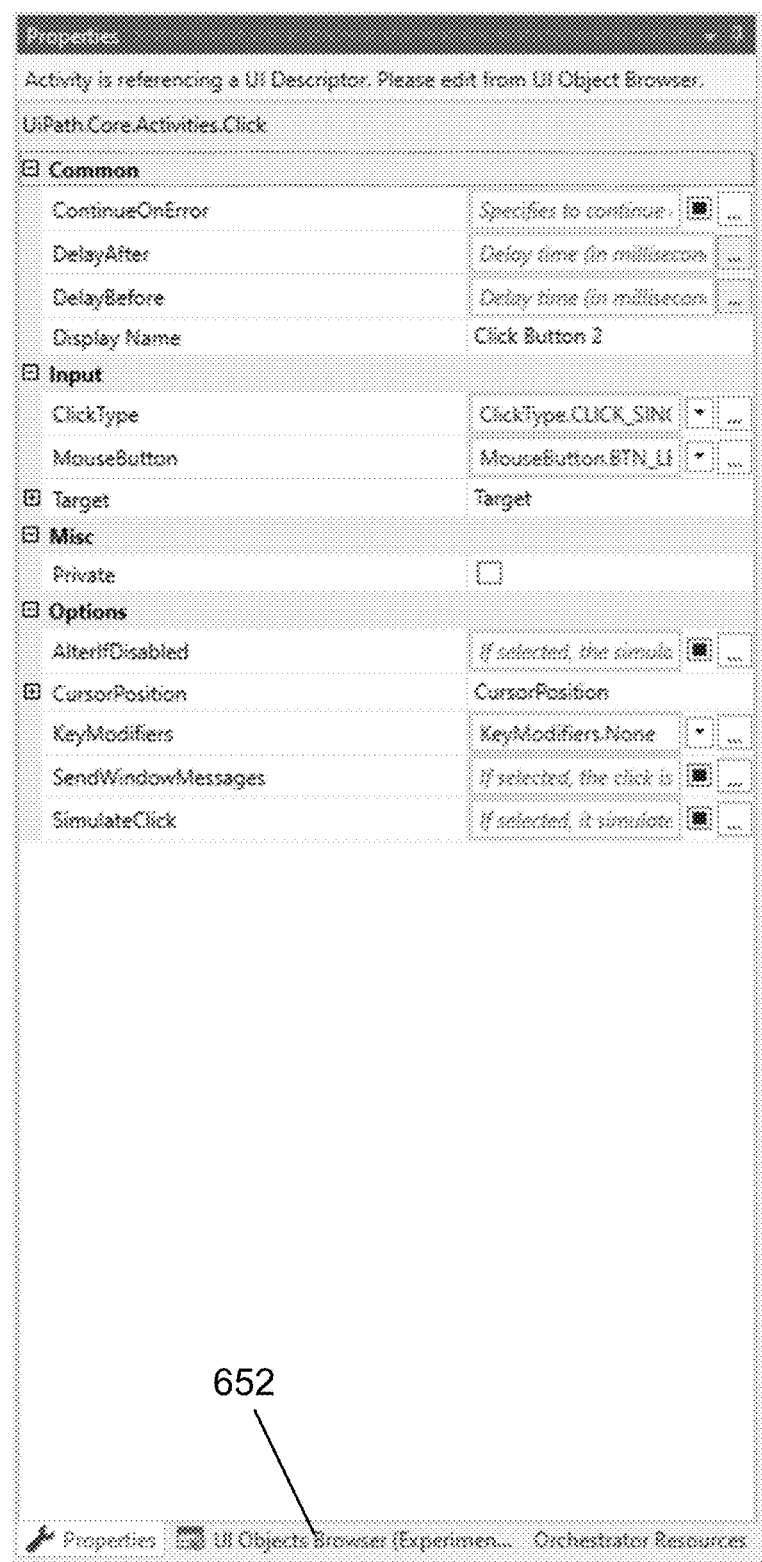
FIG. 6I is an enlarged screenshot illustrating the properties pane of the RPA development application as shown in FIG. 6H, according to an embodiment of the present invention.

FIG. 6H illustrates RPA designer application 600 with properties for a click activity shown in a properties pane 640. FIG. 6I shows an enlarged view of properties pane 640. At the bottom of properties pane 640, the user can select a UI object browser via UI object browser tab 652.

Figure 6J:
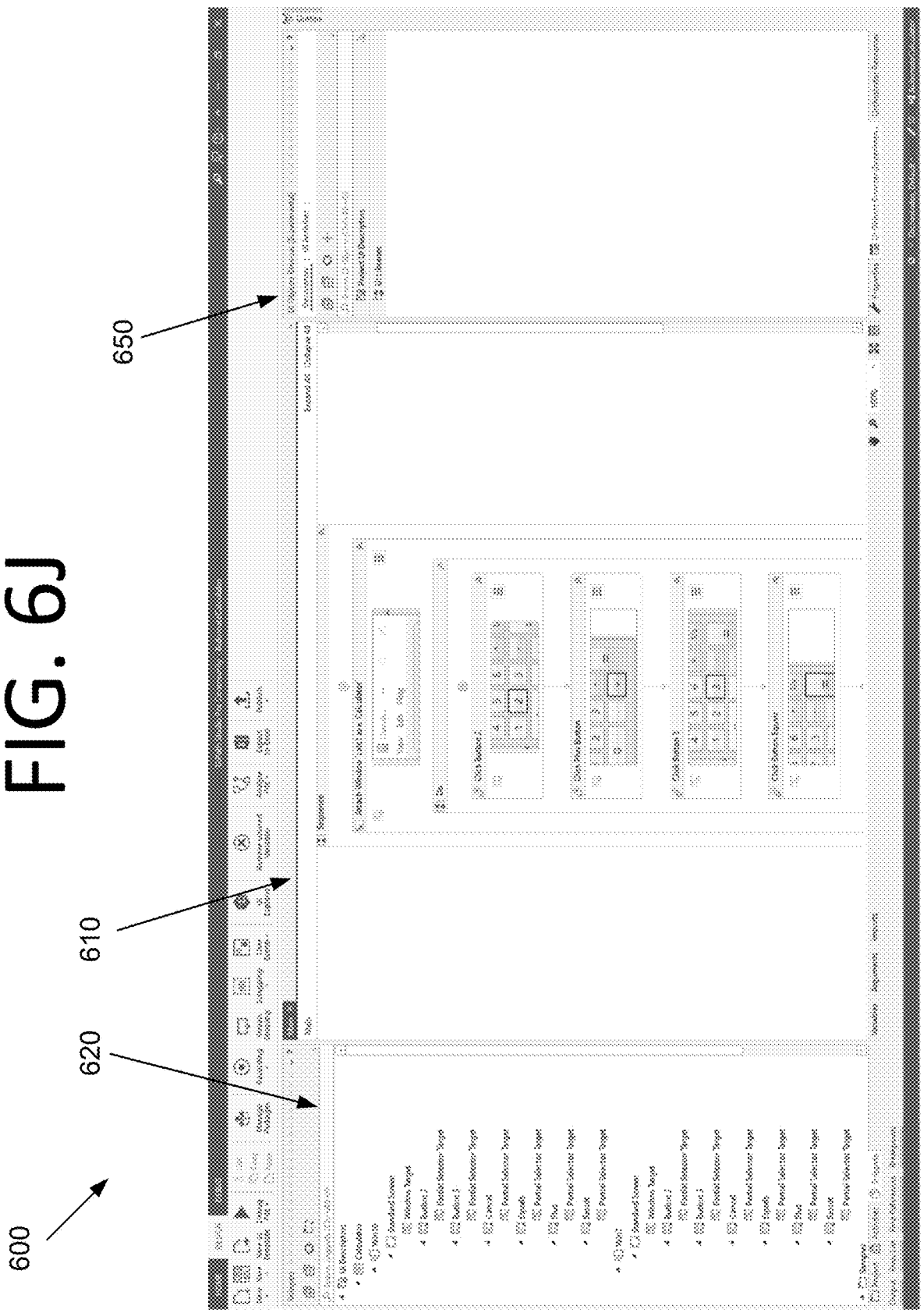
FIG. 6J is a screenshot illustrating the RPA designer application with a UI object browser pane, according to an embodiment of the present invention.
Figure 6K:
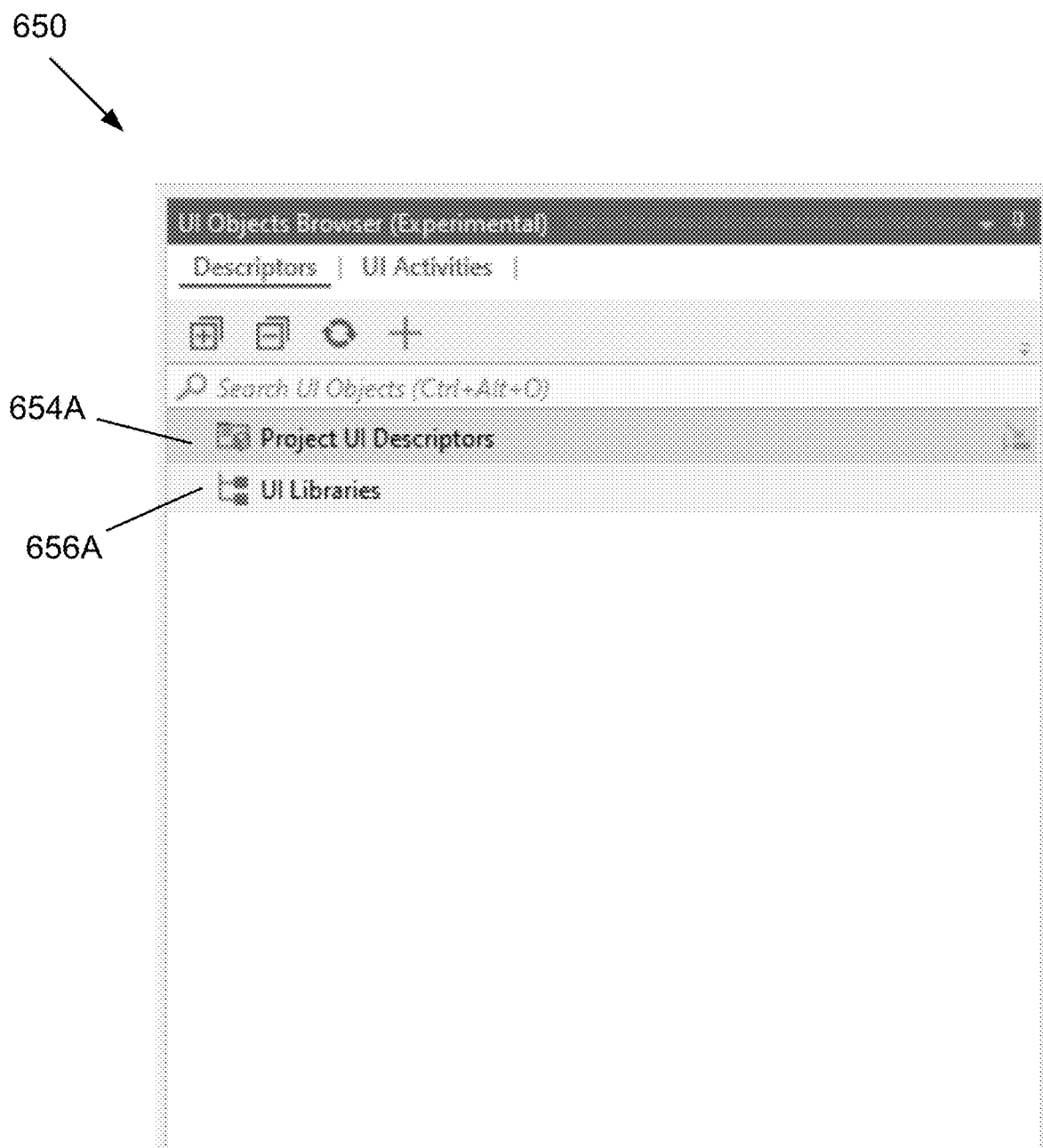
FIG. 6K is an enlarged screenshot illustrating a UI descriptors view of the UI object browser pane of the RPA development application as shown in FIG. 6J, according to an embodiment of the present invention.

FIG. 6J illustrates RPA designer application 600 with a UI descriptors view of UI object browser pane 650 and FIG. 6K shows an enlarged view of UI object browser pane 650 with a UI descriptors view. The UI descriptors view includes project UI descriptors 654A and UI object libraries 656A. In FIG. 6K, no UI descriptors have been selected yet for the project.

Figure 6L:
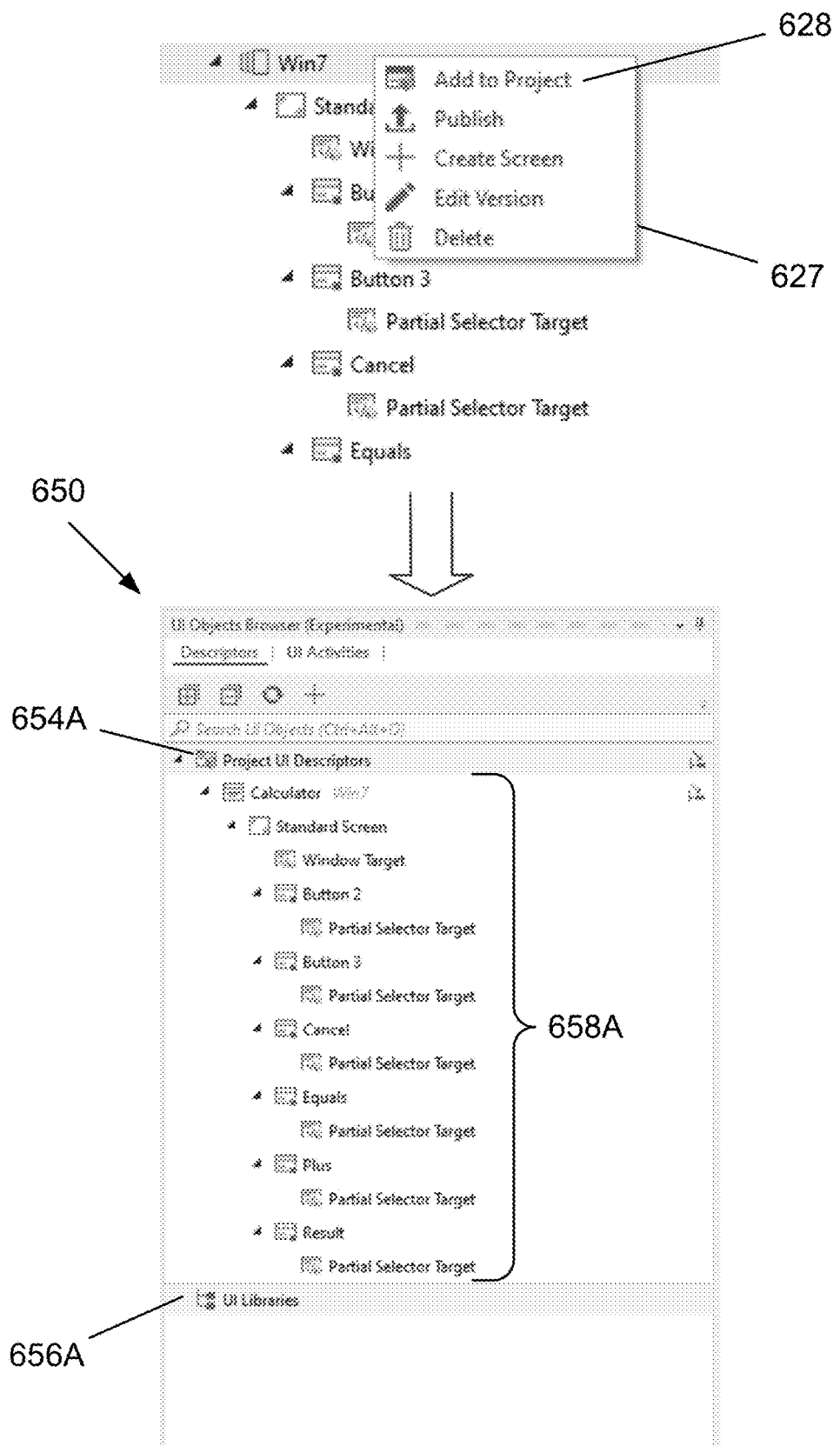
FIG. 6L is an enlarged screenshot illustrating a UI descriptors view of the UI object browser pane of the RPA development application as shown in FIG. 6J, according to an embodiment of the present invention.
Figure 6M:
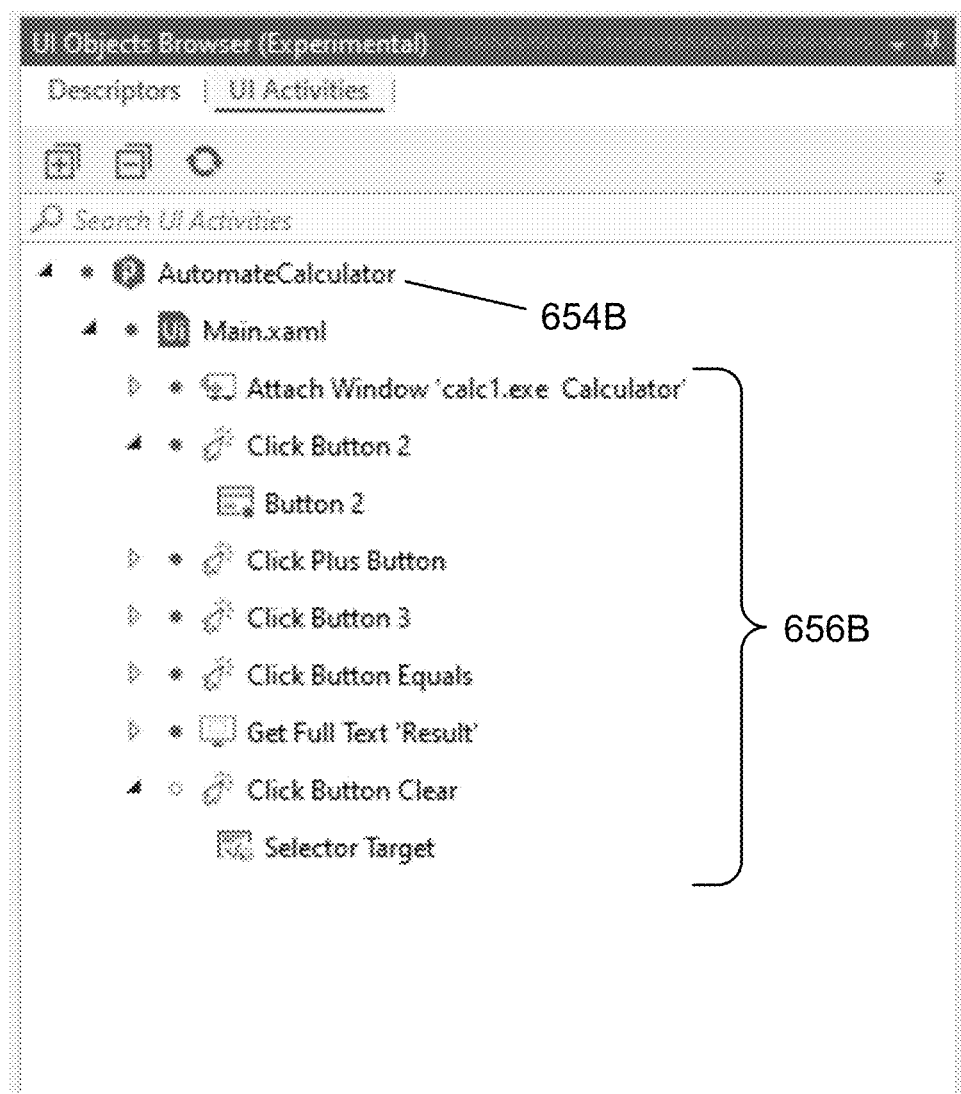
FIG. 6M is a screenshot illustrating a UI activities view of a UI object browser pane, according to an embodiment of the present invention.

In order to add the UI descriptors, the developer may add these using snippets pane 620. For instance, the developer may right click on Windows® 7 version 623A in snippets pane 620, which causes a menu 627 to appear. The developer may select to add these UI descriptors to the project, which causes them to appear under project UI descriptors 654A in UI object browser pane 650, which shows them as UI descriptors 658A. See FIG. 6L. In the UI activities view of UI object browser pane 650 shown in FIG. 6M, the project 654B and UI activities 656B are shown. While an RPA workflow may have various activities of different types, the UI activities view lists UI activities 656B so the developer can readily view them. UI activities 656B can be extracted and have a similar structure to that shown in snippets pane 620. In certain embodiments, all UI descriptors that have been developed and are shared in a library may be displayed in snippets pane 620 whereas only UI descriptors that are used by UI activities appear in the UI activities view of UI object browser pane 650.

Figure 6N:
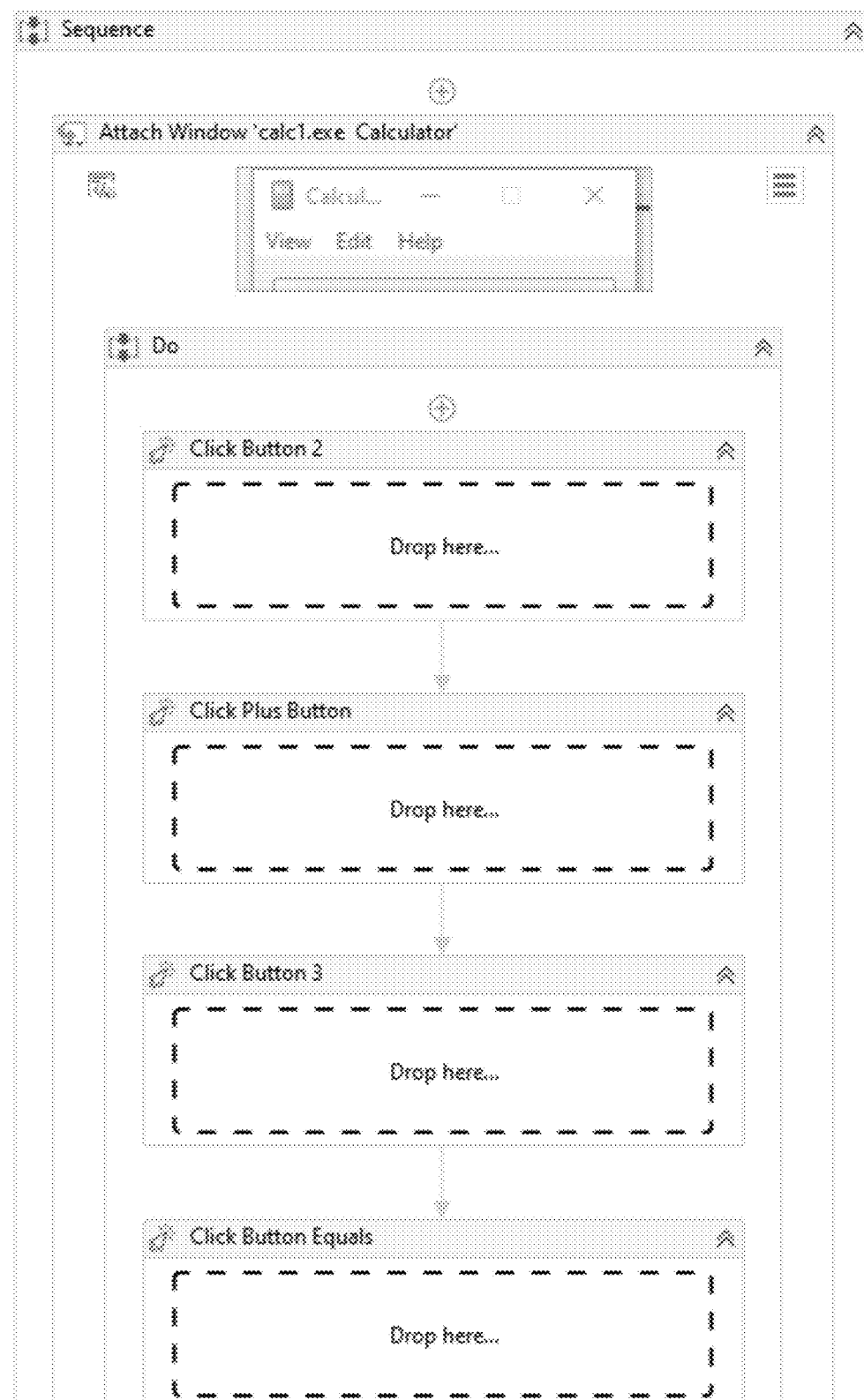
FIG. 6N is a screenshot illustrating drag-and-drop functionality to drop selectors into a desired activity of the RPA workflow, according to an embodiment of the present invention.

Once the selectors are in object browser pane 650, the user can drag-and-drop a given selector into the desired activity, as shown in FIG. 6N. This provides reusability at the project level. In some embodiments, other UI descriptors, such as CV descriptors, unified target descriptors, etc., may be dragged and dropped into desired activities in addition to or in lieu of selectors. Once the selectors have been dropped into the respective activities, RPA workflow 612 is ready to be execute by an RPA robot to interact with the respective UI elements.

Figure 6O:
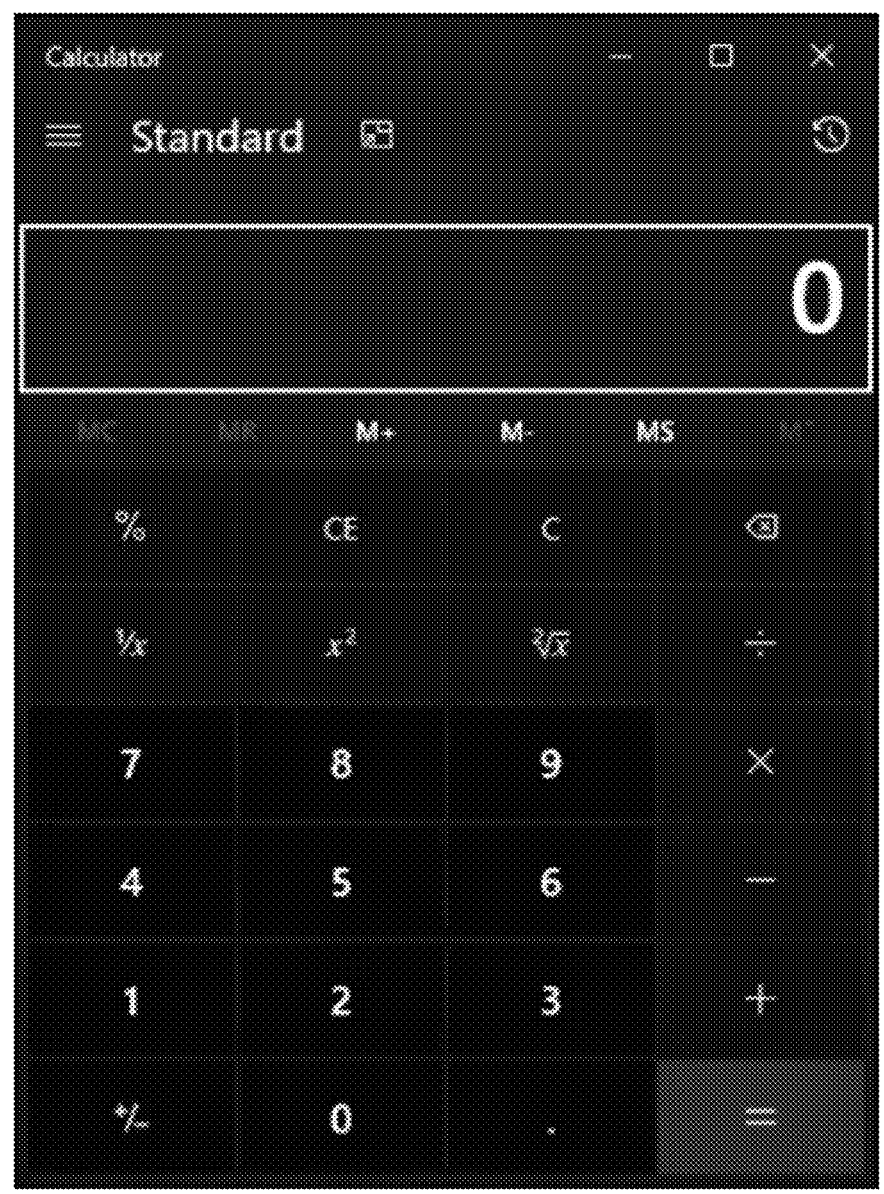
FIG. 6O is a screenshot illustrating the Windows® 10 calculator.

Consider the case where the developer would like to perform the same RPA process for the Windows® 10 calculator (see Windows® 10 calculator 680 of FIG. 6O). Running the RPA process as designed for the Windows® 7 calculator would likely fail for activities interacting with various UI elements since the UI elements of the Windows® 10 calculator are substantially different from those of the Windows® 7 calculator. See FIG. 6B. If selectors have already been developed for the Windows® 10 calculator and are available in a published library of UI descriptors in snippets pane 620, as is the case in this example, the user may delete the selectors for the Windows® 7 calculator and add the selectors for the Windows® 10 calculator, which then appear in the UI activities view of UI object browser pane 650. See FIG. with Windows® 10 calculator selectors, according to an embodiment of the present invention.

Figure 6P:
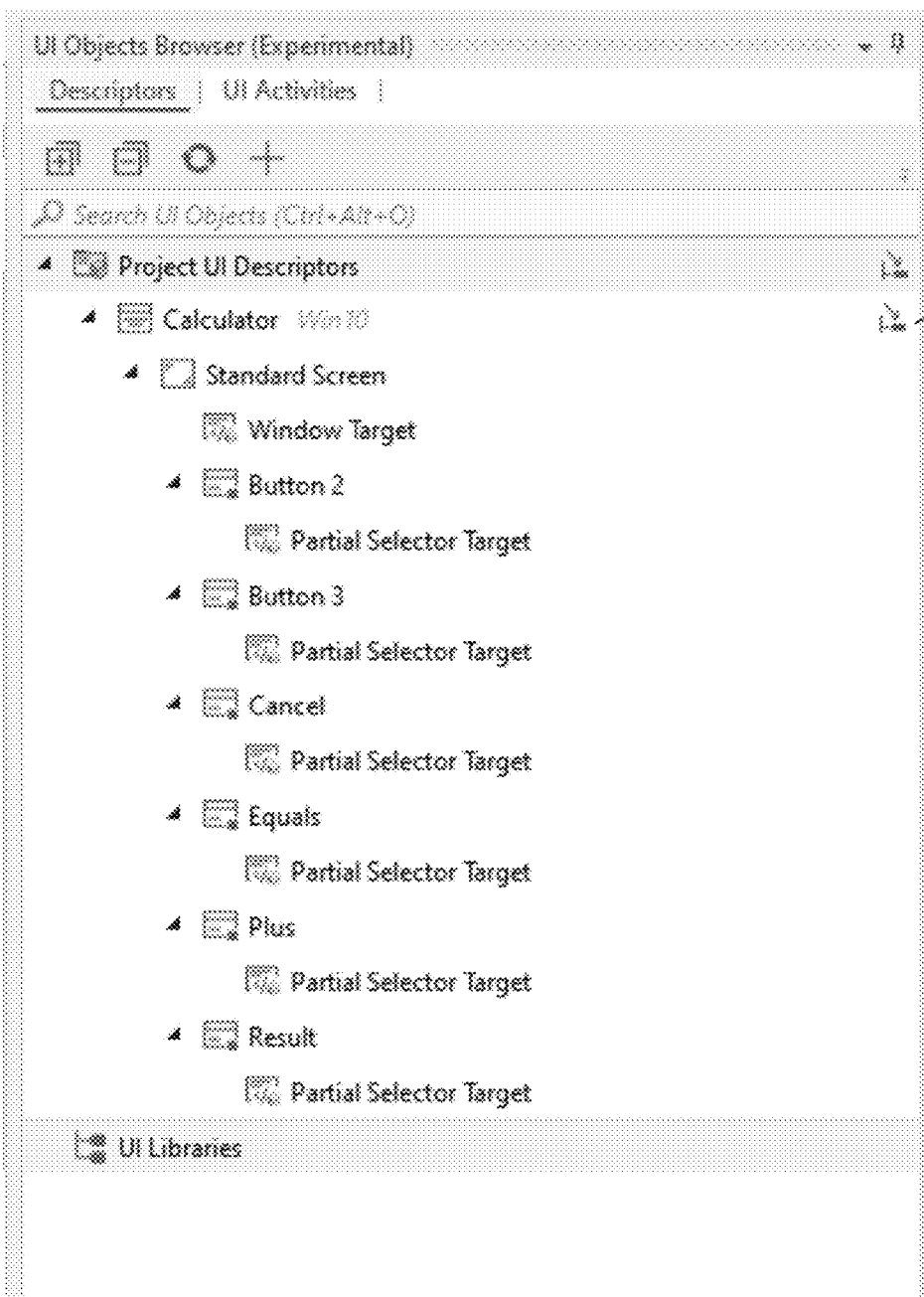
FIG. 6P is a screenshot illustrating the UI activities view of the UI object browser pane with Windows® 10 calculator selectors, according to an embodiment of the present invention.
Figure 6Q:
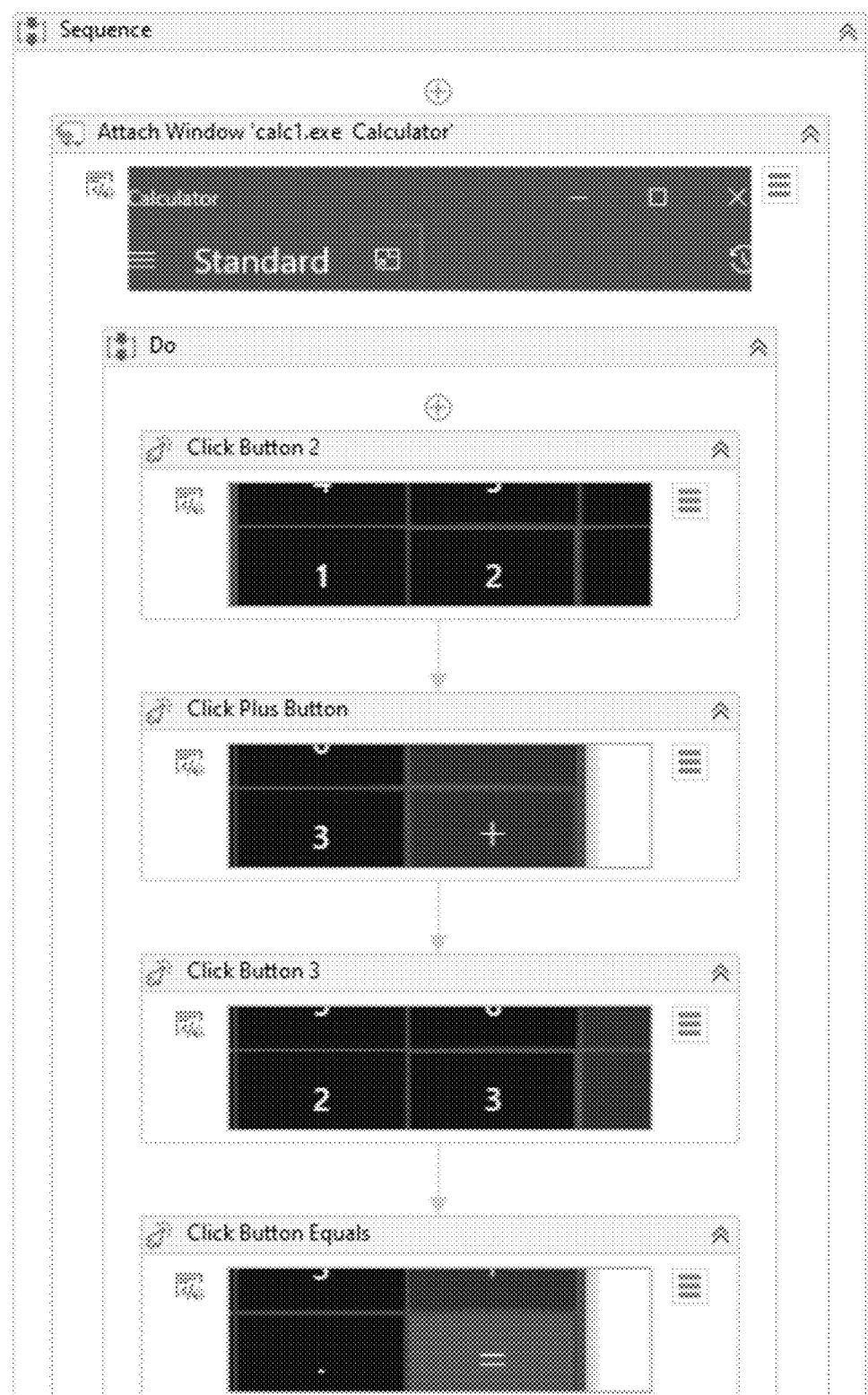
FIG. 6Q is a screenshot illustrating some of the activities of the RPA workflow with updated screenshots of respective UI elements for each activity for the Windows® 10 calculator, according to an embodiment of the present invention.

When the target application is set to the Windows® 10 calculator, the screenshot portions for each activity and the respective selectors are updated in RPA workflow 612. See FIG. 6Q. RPA workflow 612 will not execute correctly on the Windows® 10 calculator. This provides reusability at the project level. However, the selectors are inside this project specifically and are not yet available globally as a UI object library.

In order to "upgrade" the calculator application, the UI descriptors for the UI elements are changed to those for the new version of the application. For instance, a NuGet™ package that includes these UI descriptors may be created, uploaded, and then retrieved. Thus, when the dependency for the UI elements is changed, the UI descriptors will be updated.

Figure 6R:
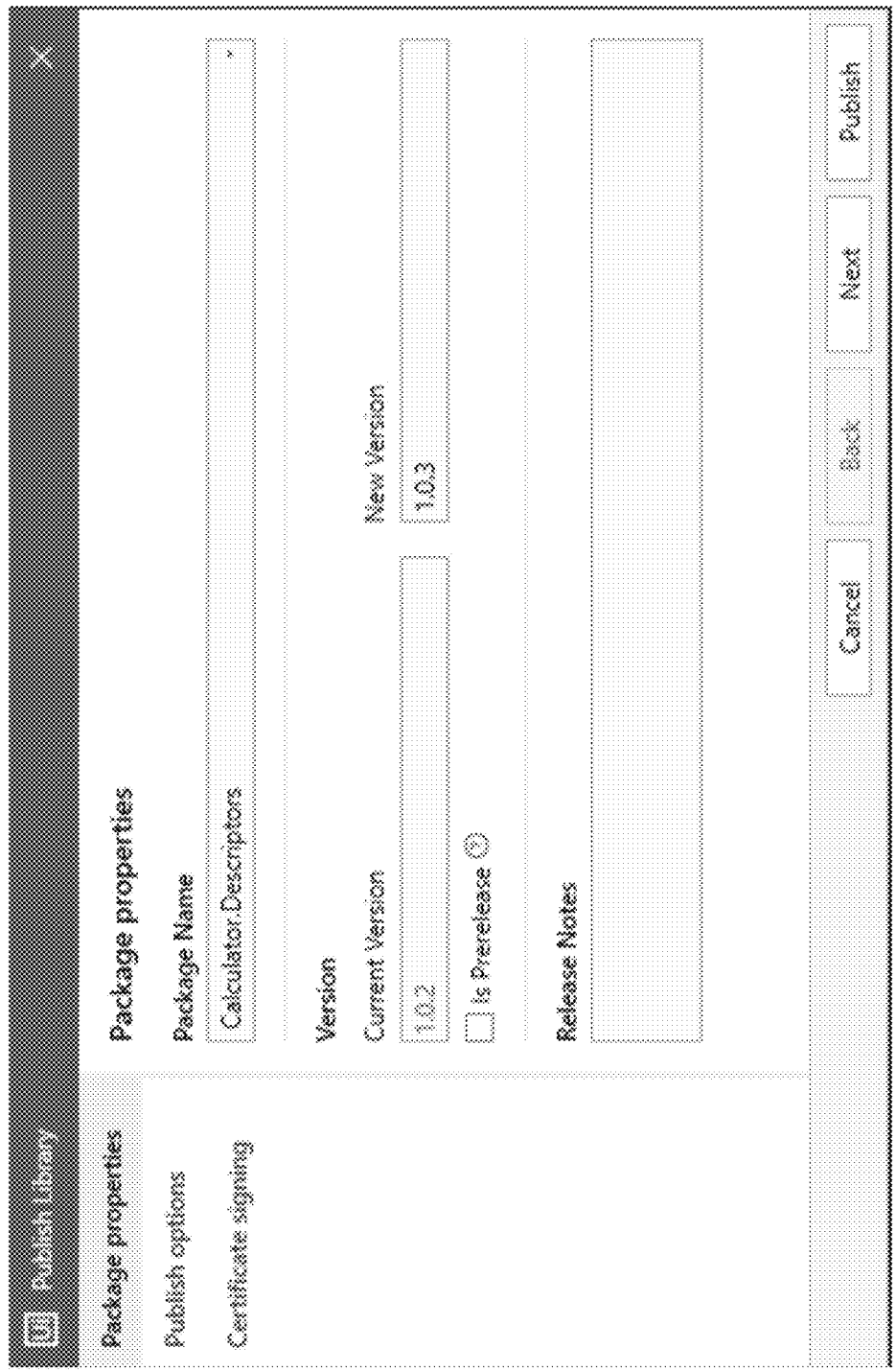
FIG. 6R is a screenshot illustrating a publish UI object library window, according to an embodiment of the present invention.
Figure 6S:
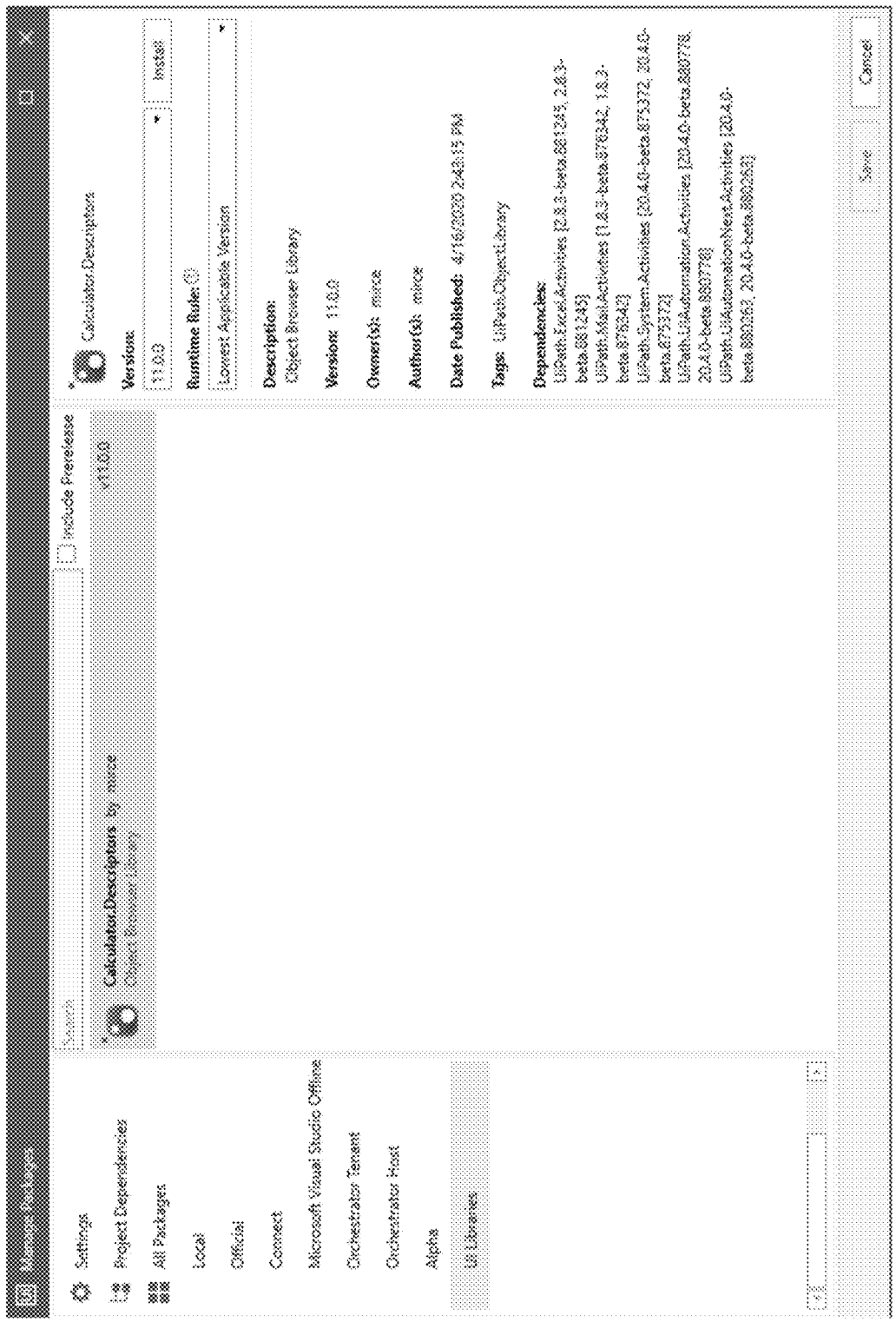
FIG. 6S is a screenshot illustrating a manage packages window, according to an embodiment of the present invention.
Figure 6T:
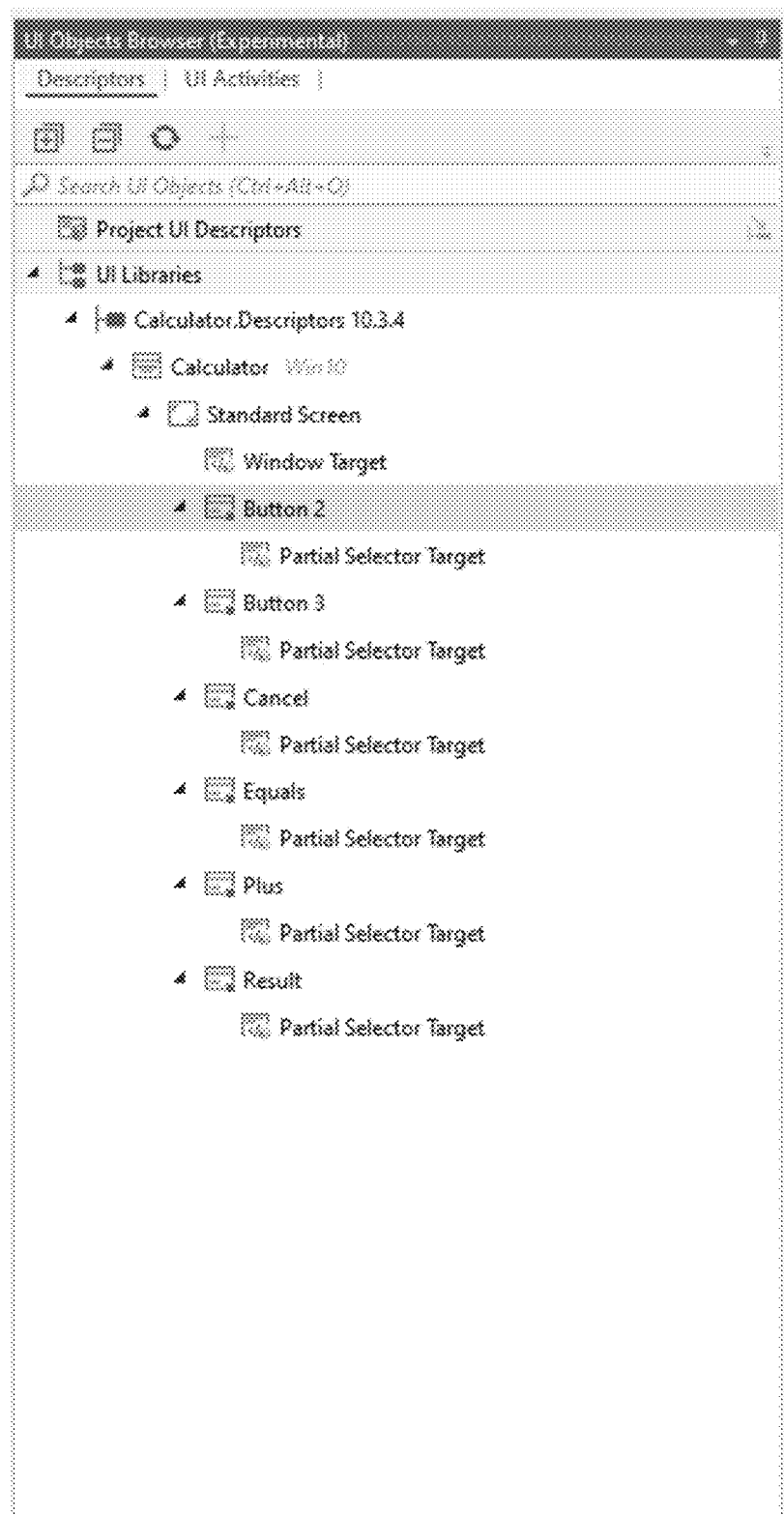
FIG. 6T is a screenshot illustrating the UI activities view of the UI object browser pane with Windows® 10 calculator selectors added to the UI object libraries, according to an embodiment of the present invention.

In order to provide reusability at the global level such that all processes can use the UI descriptors, UI object libraries 656A may be used. By clicking publish button 658 in this embodiment (see FIG. 6P), a publish UI object library window 660 appears. See FIG. 6R. This allows the selectors and/or other UI descriptors from the project to be published into a package (e.g., into a NuGet™ package) that can be accessed and utilized by other developers for other RPA processes after publication via a manage packages window 662. See FIG. 6S. Installing this package of calculator descriptors as a dependency for a project causes the selectors/UI descriptors to appear under libraries 656A in UI object browser pane 650. See FIG. 6T. The UI object library may then be used for the given project. As a best practice, selectors and/or other UI descriptors for interacting with UI elements may be imported from UI object libraries as dependencies only if reuse is desired. However, if a given selector or other UI descriptor is specific to the given project and unlikely to be reused, certain selectors/UI descriptors may be created locally for the project and others may be imported from UI object libraries.

Figure 7A:
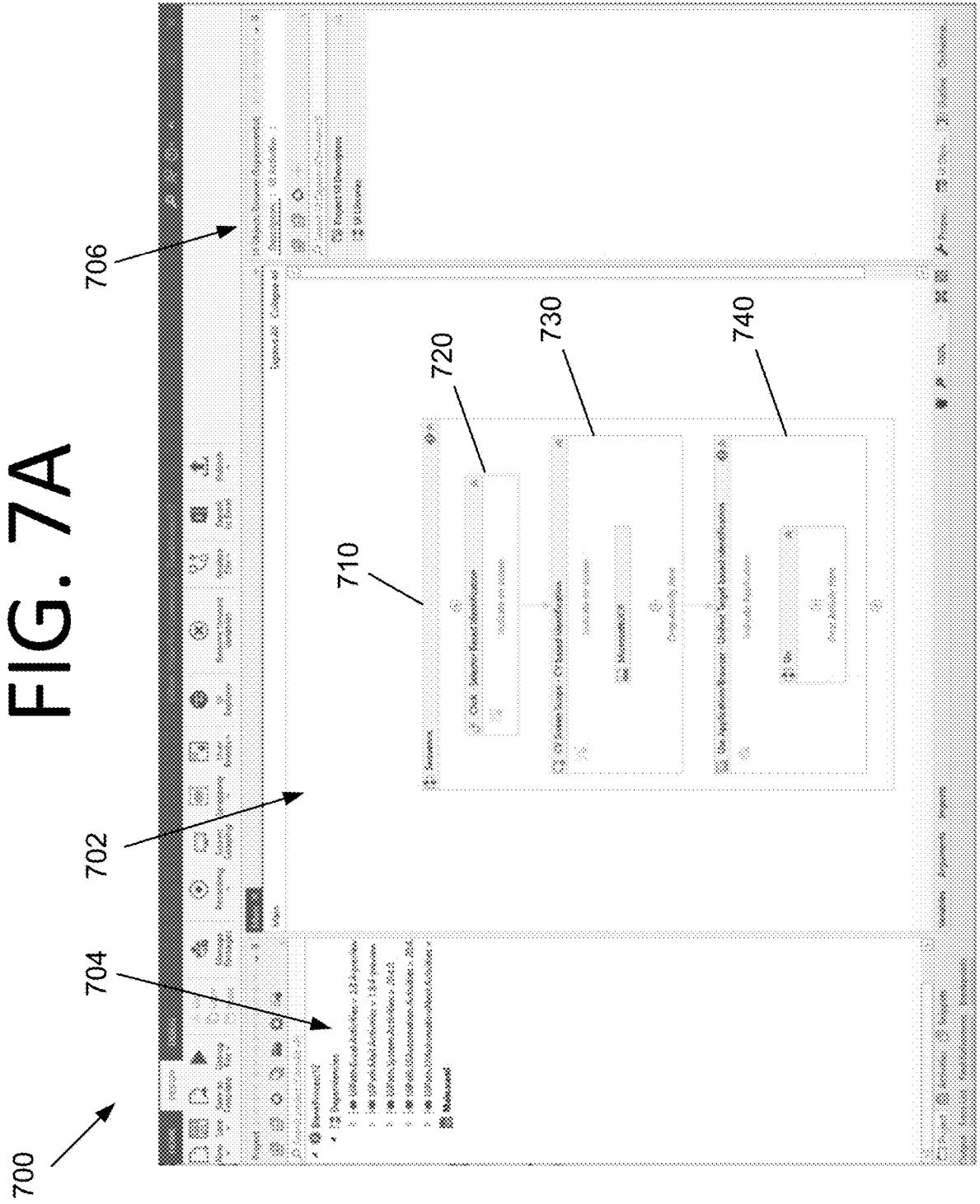
FIG. 7A is a screenshot illustrating an RPA designer application, according to an embodiment of the present invention.

FIG. 7A is a screenshot illustrating an RPA designer application 700, according to an embodiment of the present invention. RPA designer application 700 includes a main RPA development pane 702 that includes an RPA workflow 710 (in this example, a sequence that includes different UI element identification activities). A project pane 704 includes the dependencies for the current project. A UI descriptors pane 706 currently includes no selections for project UI descriptors and UI object libraries.

Figure 7B:
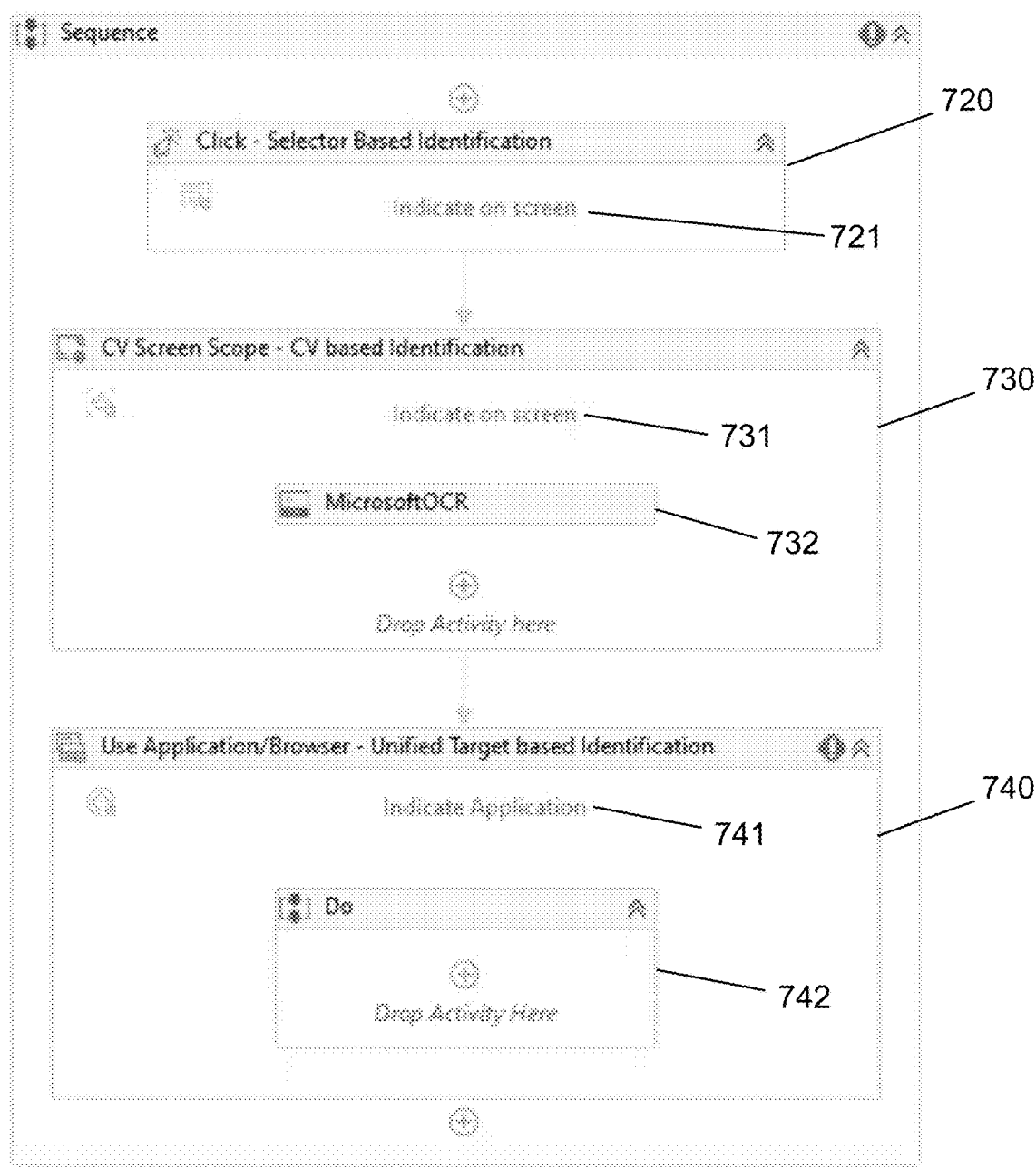
FIG. 7B is a screenshot illustrating an RPA workflow that will be configured to use three different UI element detection techniques, according to an embodiment of the present invention.

FIG. 7B is an enlarged view illustrating RPA workflow 710. Activity 720 will use selector-based identification, activity 730 will use CV-based identification, and activity 740 will use unified target-based identification. The configuration of activities 720, 730, 740 for this example is described below.

Figure 7C:
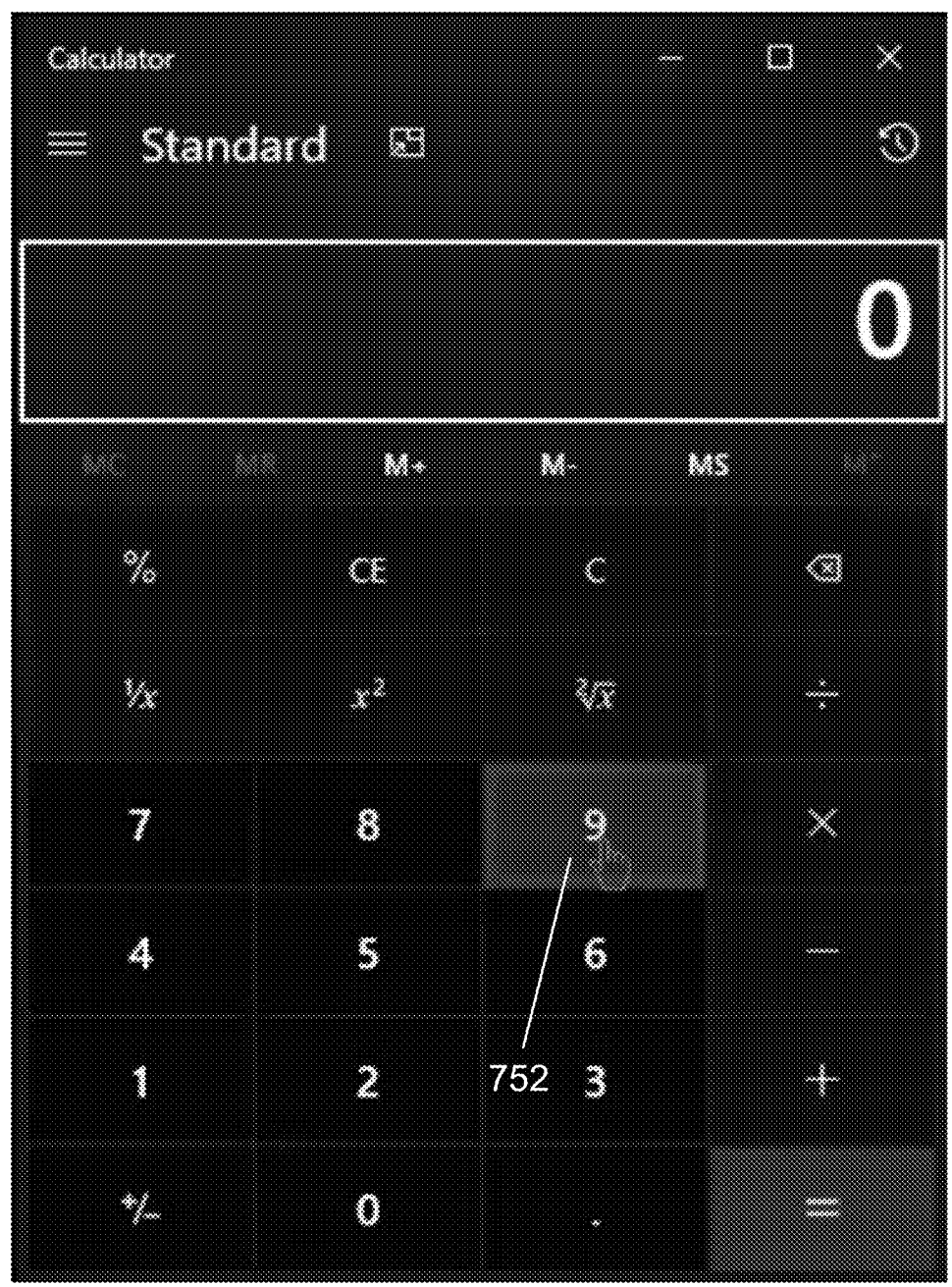
FIG. 7C is a screenshot illustrating the Windows® 10 calculator as modified by UiPath Studio™ after a developer selects "indicate on screen", according to an embodiment of the present invention.
Figure 7D:
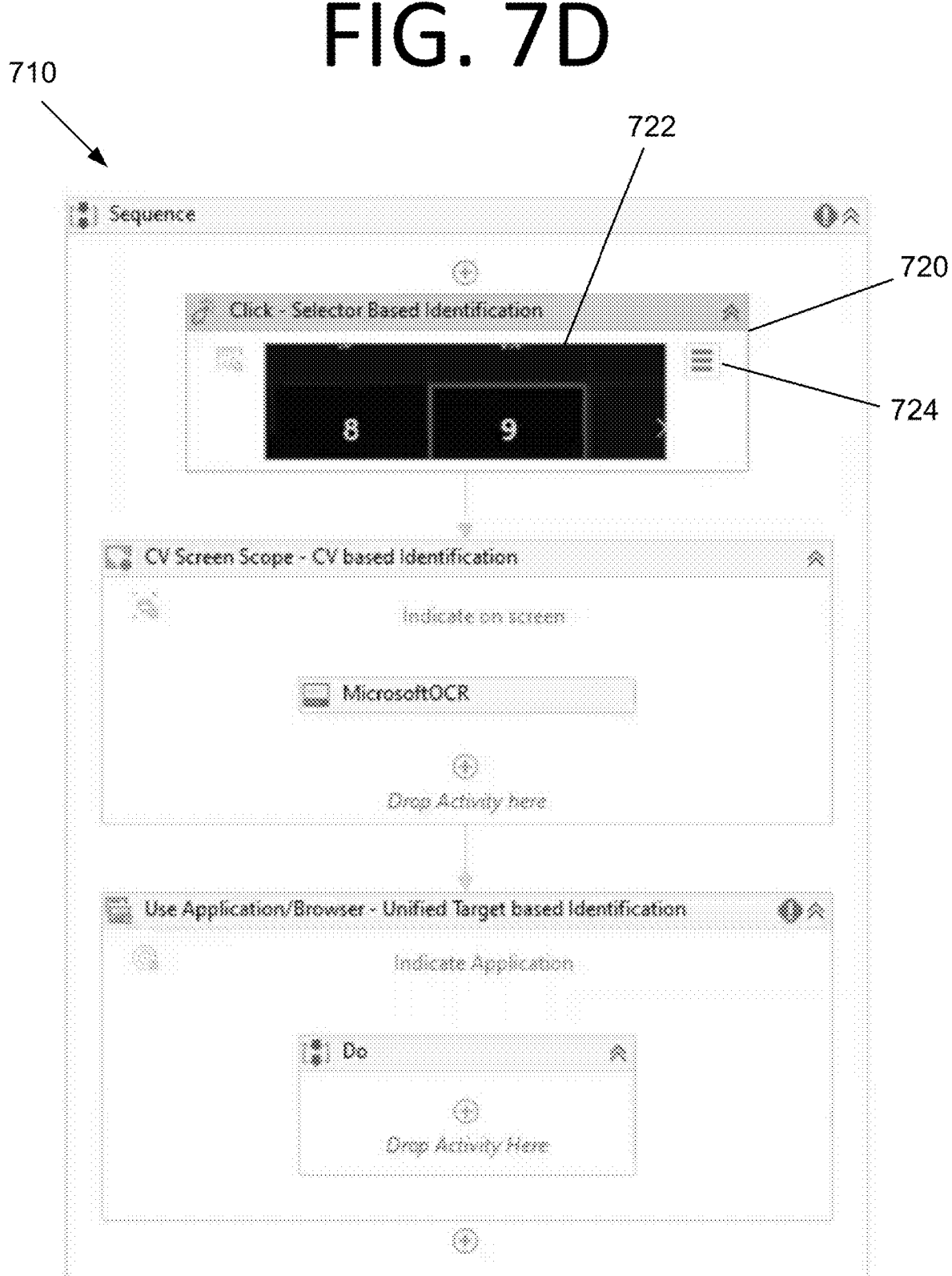
FIG. 7D is a screenshot illustrating the RPA workflow of FIG. 7B with a screenshot of the selected UI element from the Windows® 10 calculator, according to an embodiment of the present invention.

FIG. 7C illustrates Windows® 10 calculator 750 as modifiable by UiPath Studio™. When the user selects "indicate on screen" 721 for selector-based identification activity 720 (see FIG. 7B), recognized elements of the UI that the developer moves the mouse over are highlighted. For instance, in FIG. 7C the 9 button 752 is highlighted. When the user clicks on 9 button 752, a screenshot 722 including the selected UI element appears in selector-based identification activity 720. See FIG. 7D.

Figure 7E:
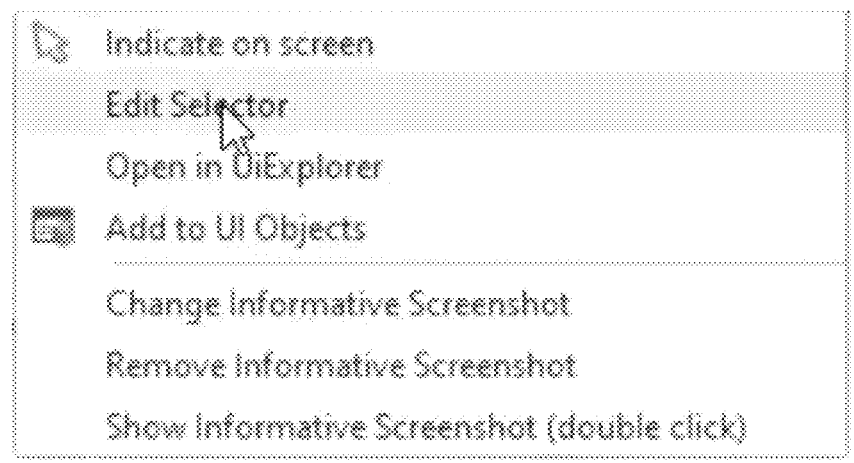
FIG. 7E is a screenshot illustrating an activity options menu, according to an embodiment of the present invention.
Figure 7F:
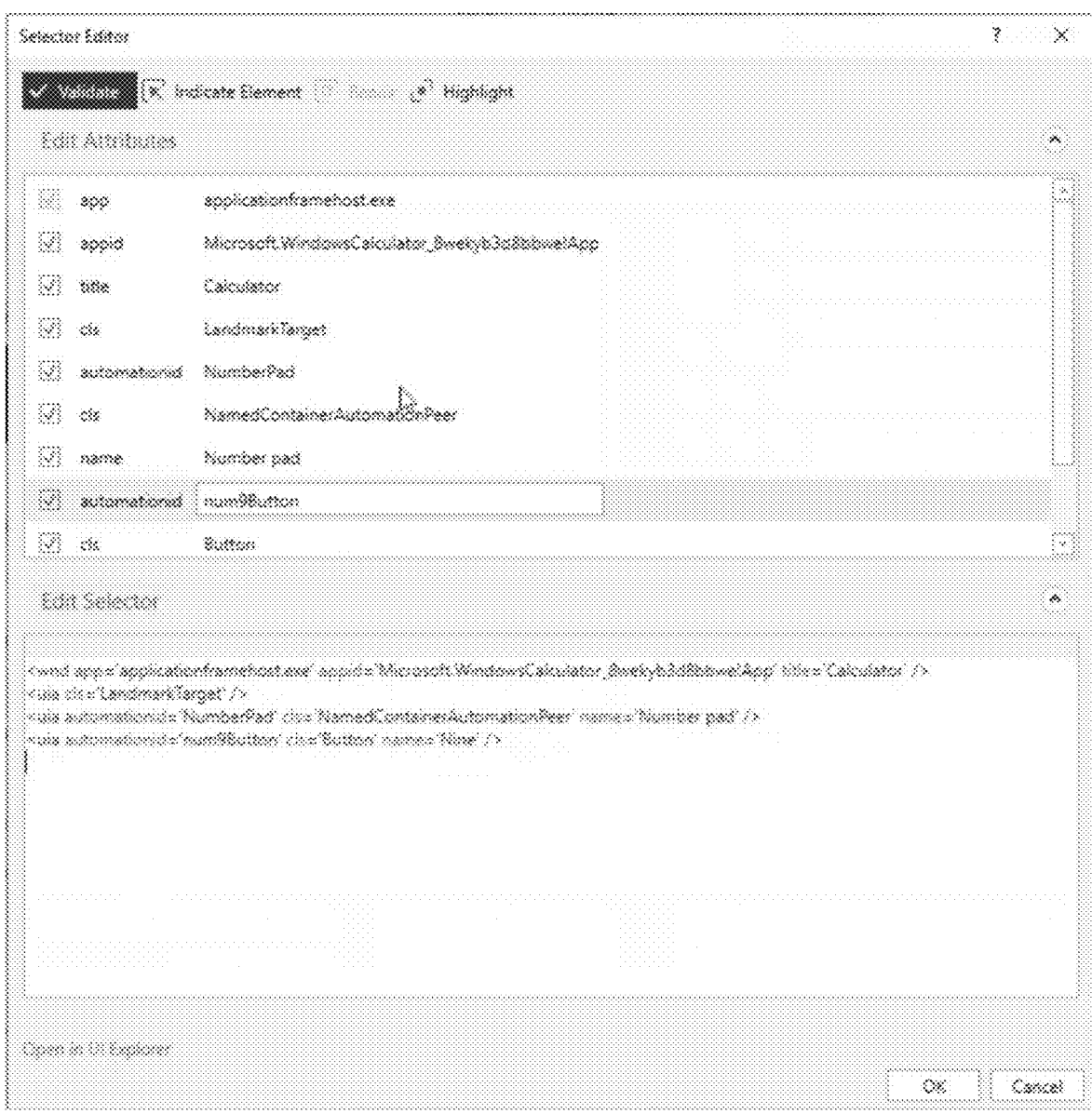
FIG. 7F is a screenshot illustrating a selector editor, according to an embodiment of the present invention.
Figure 7G:
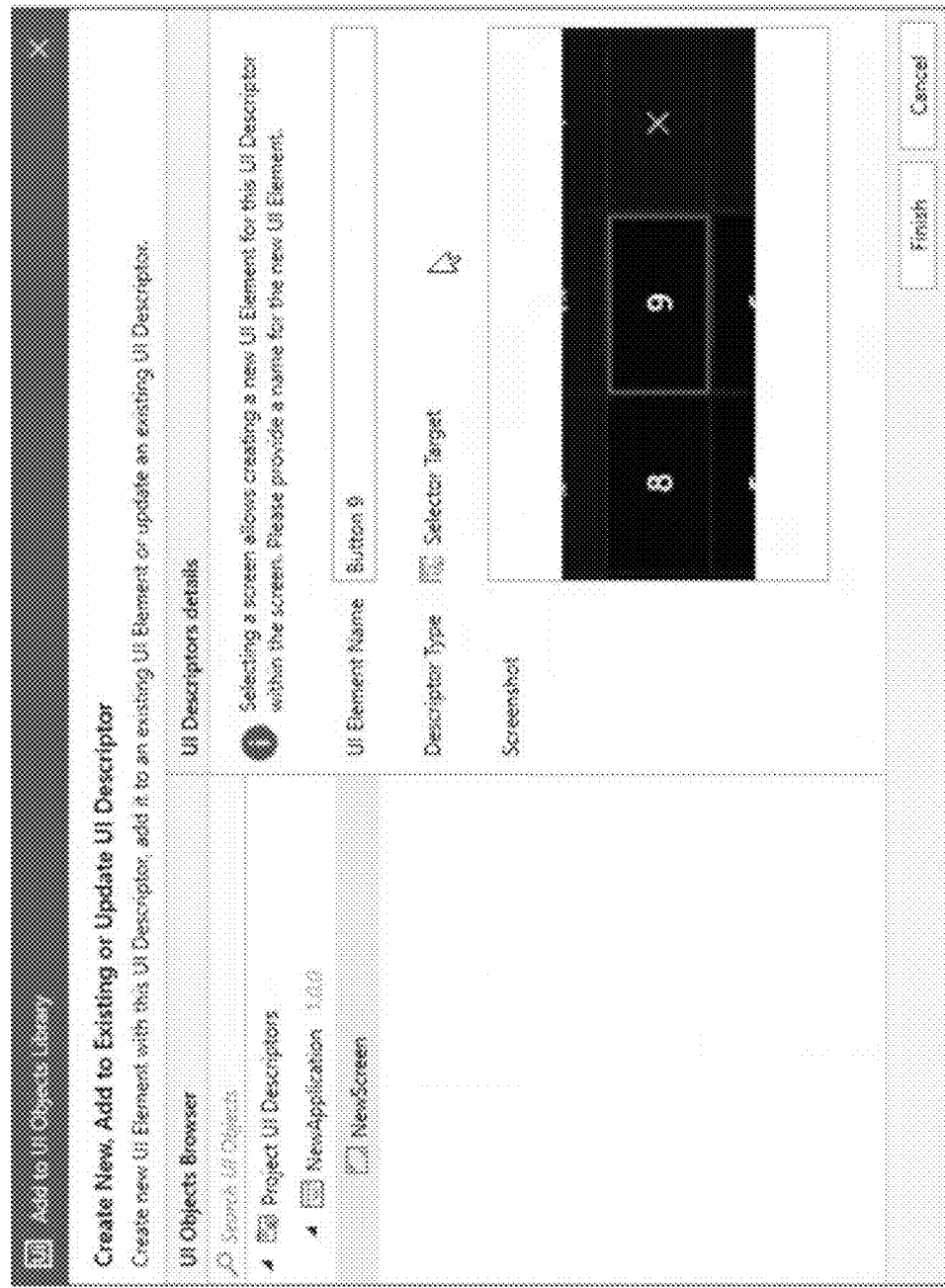
FIG. 7G is a screenshot illustrating add to UI objects library functionality, according to an embodiment of the present invention.
Figure 7H:
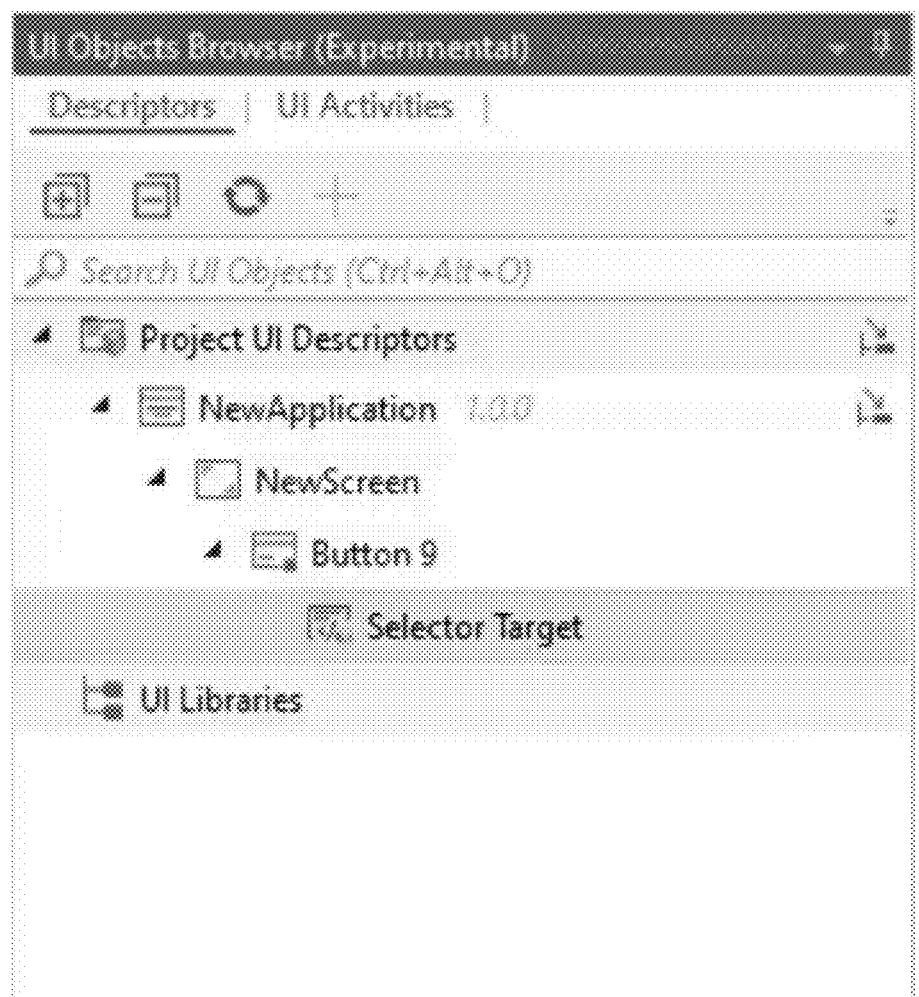
FIG. 7H is a screenshot illustrating a UI descriptors pane, according to an embodiment of the present invention.

By clicking button 724 of selector-based identification activity 720, a menu 725 appears. See FIG. 7E. Choosing the "Edit Selector" option opens a selector editor 726. See. FIG. 7F. Selector editor 726 allows the developer to edit attributes of the selector and validate that the selector finds the respective UI element in Windows® 10 calculator 750 (i.e., 9 button 752). Selecting "Highlight" causes the respective UI element to be highlighted on Windows® 10 calculator 750. After the selector is created, the developer can click button 724 of selector-based identification activity 720 and choose the "Add to UI Objects" option on menu 725, which causes an add to UI objects library window 728 to appear. See FIG. 7G. The developer can then add the created selector for the 9 button to a UI object library for the project. The selector now appears in UI descriptors pane 706. See FIG. 7H.

Figure 7I:
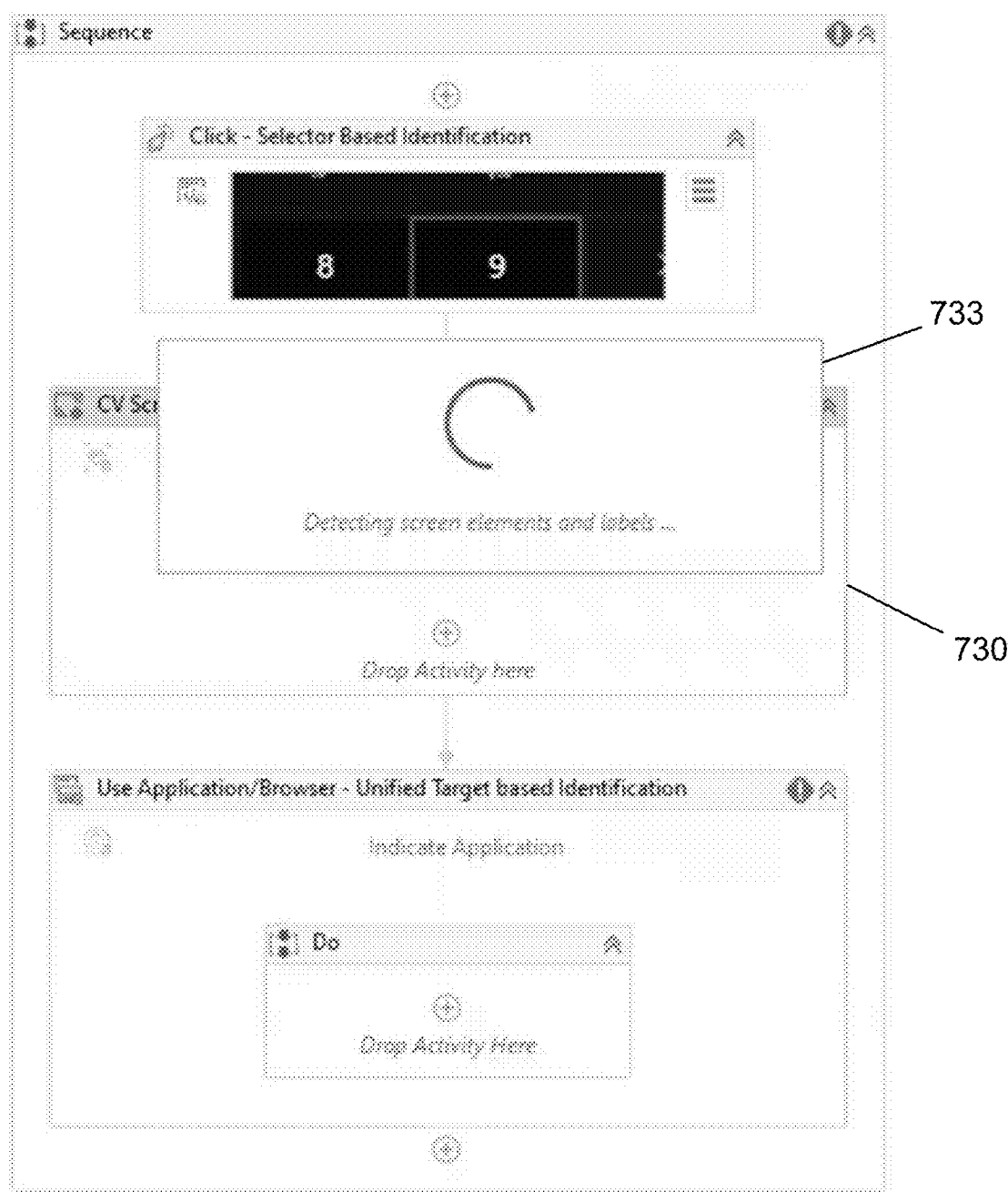
FIG. 7I is a screenshot illustrating the RPA workflow with a detecting screen elements and labels message, according to an embodiment of the present invention.
Figure 7J:
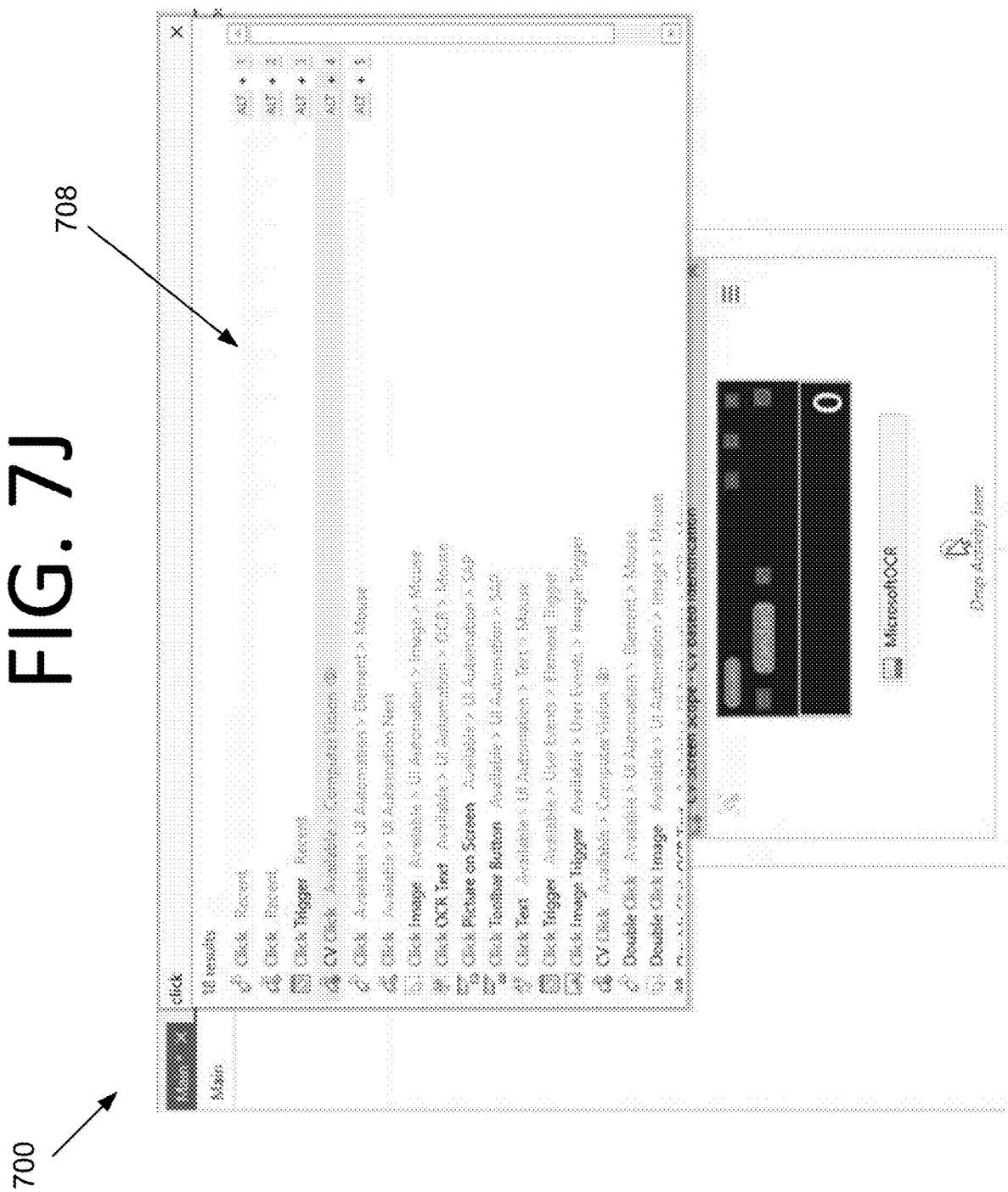
FIG. 7J is a screenshot illustrating a search interface, according to an embodiment of the present invention.
Figure 7K:
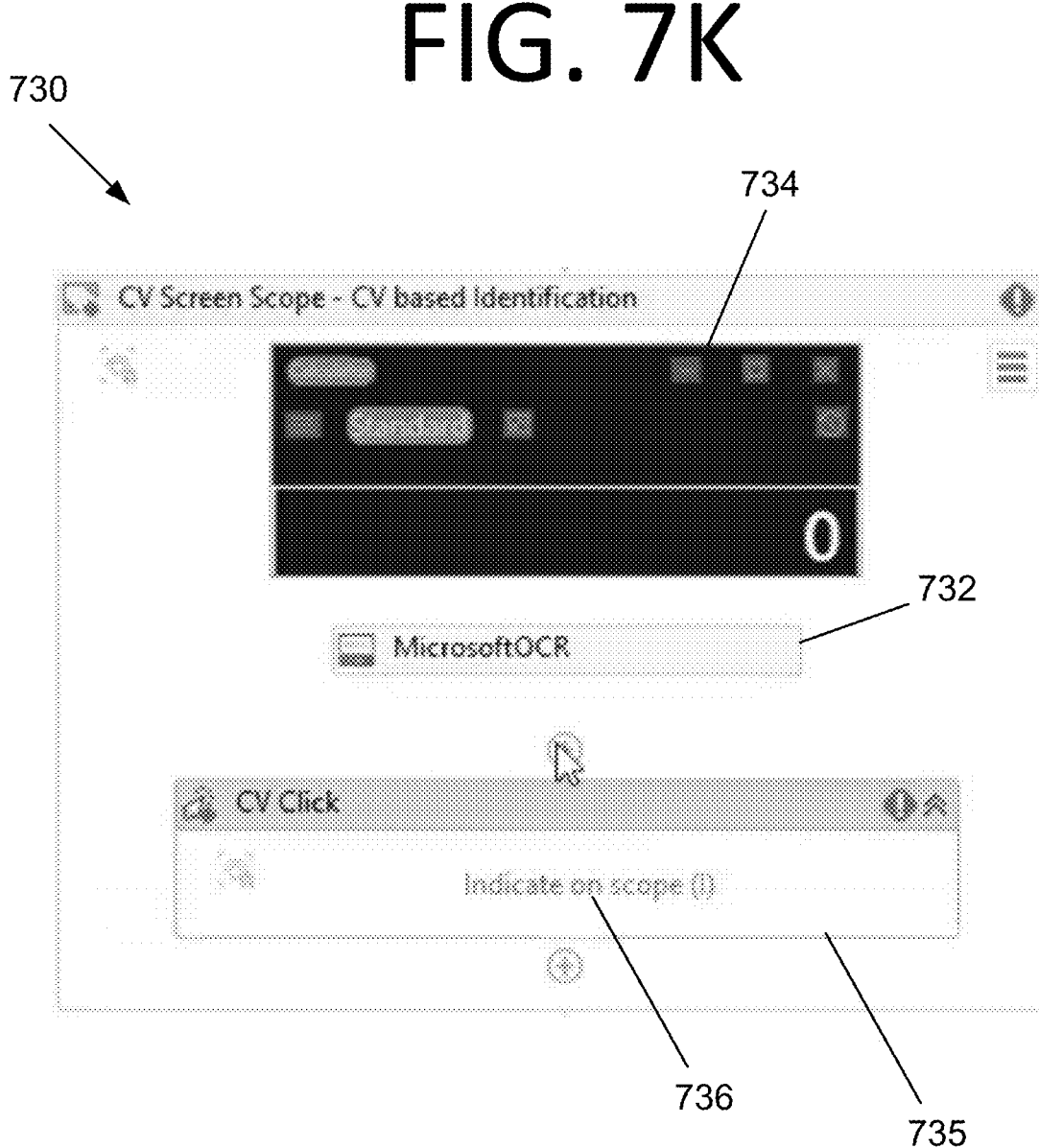
FIG. 7K is a screenshot illustrating a CV-based identification activity, according to an embodiment of the present invention.

In order to configure CV-based identification activity 730, the user should first indicate the screen on which CV is to be performed in this embodiment. When the user selects "indicate on screen" 731 (see FIG. 7B), the user clicks on the UI of Windows® 10 calculator 750, which causes UiPath Studio™ to detect elements (using CV) and labels (using the selected OCR engine 732—in this case, Microsoft® OCR), causing a message 733 to appear. See FIG. 7I. Once the elements and labels in the UI of Windows® 10 calculator 750 are detected, a screenshot of detected UI elements 734 appears in CV-based identification activity 730. See FIG. 7K. A CV click activity 735 may be used that can be configured to use CV to identify the 9 button. This activity may be added as a nested activity within CV-based identification activity 730 using search interface 708, which may appear when the developer clicks the plus icon in a given activity. See FIG. 7J.

Figure 7L:
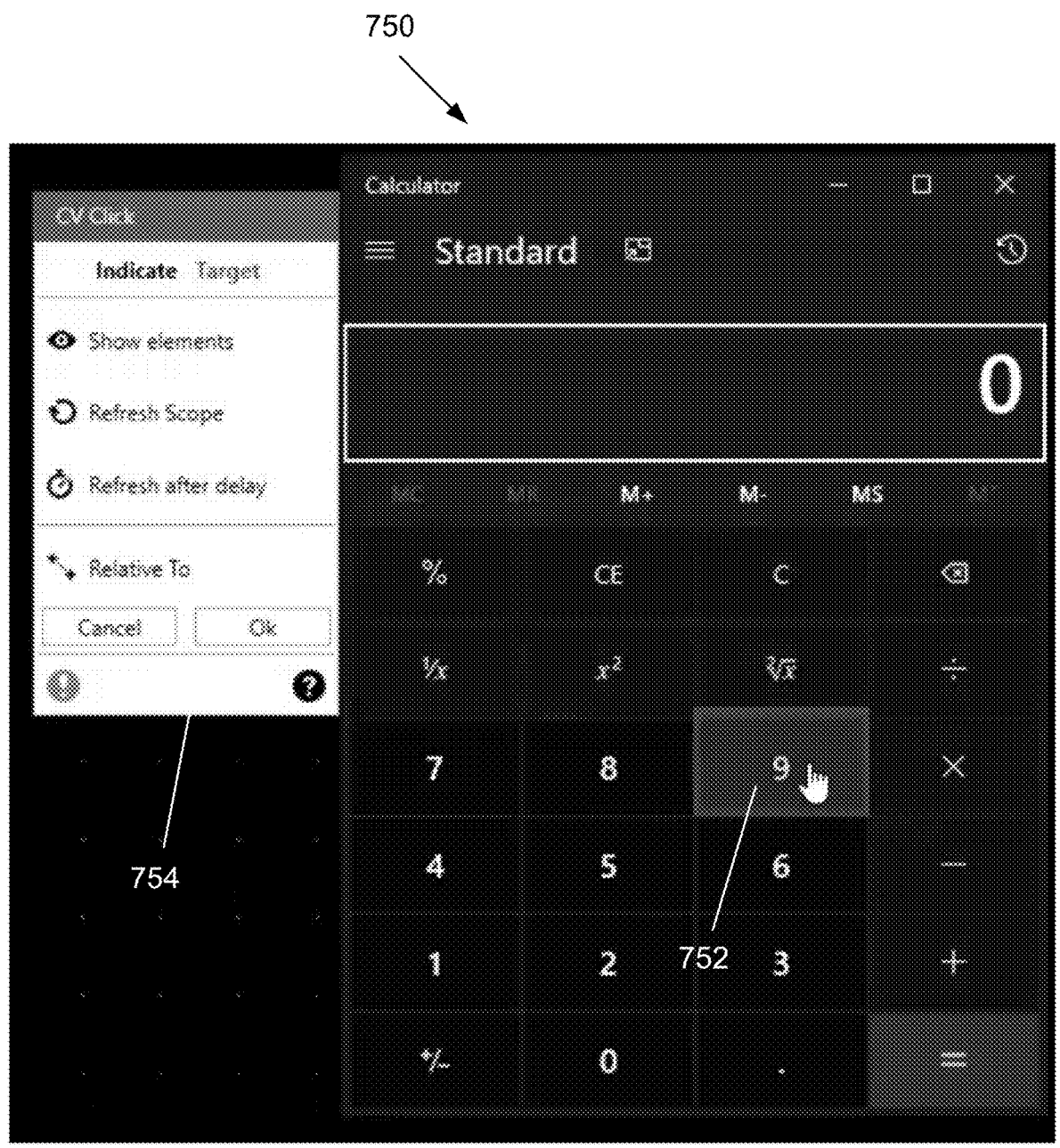
FIG. 7L is a screenshot illustrating the Windows® 10 calculator as modified by UiPath Studio™ after a developer selects "indicate on scope" with a CV click interface, according to an embodiment of the present invention.
Figure 7M:
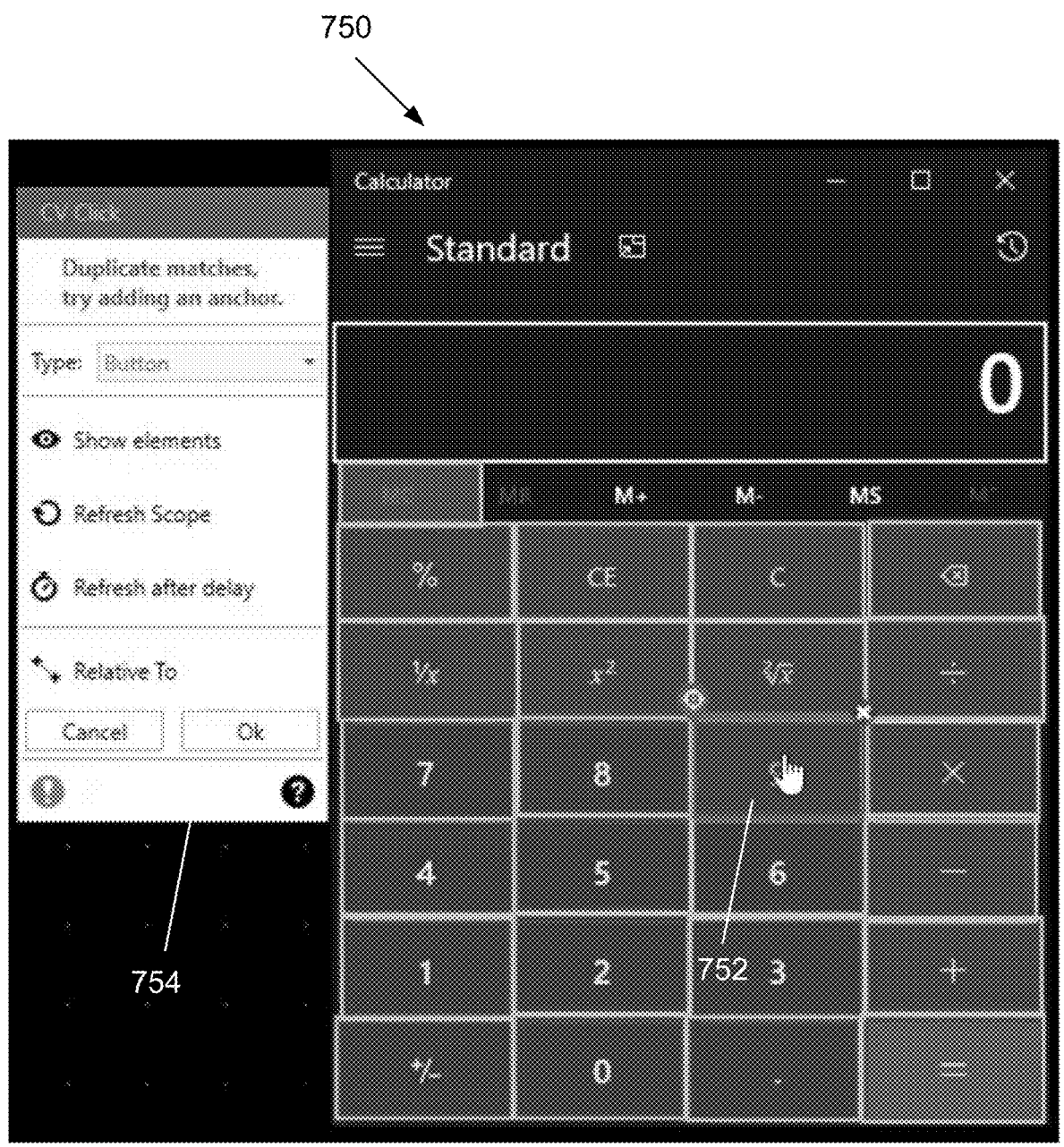
FIG. 7M is a screenshot illustrating the Windows® 10 calculator as modified by UiPath Studio™ and the CV click interface after a developer makes a target selection, according to an embodiment of the present invention.
Figure 7N:
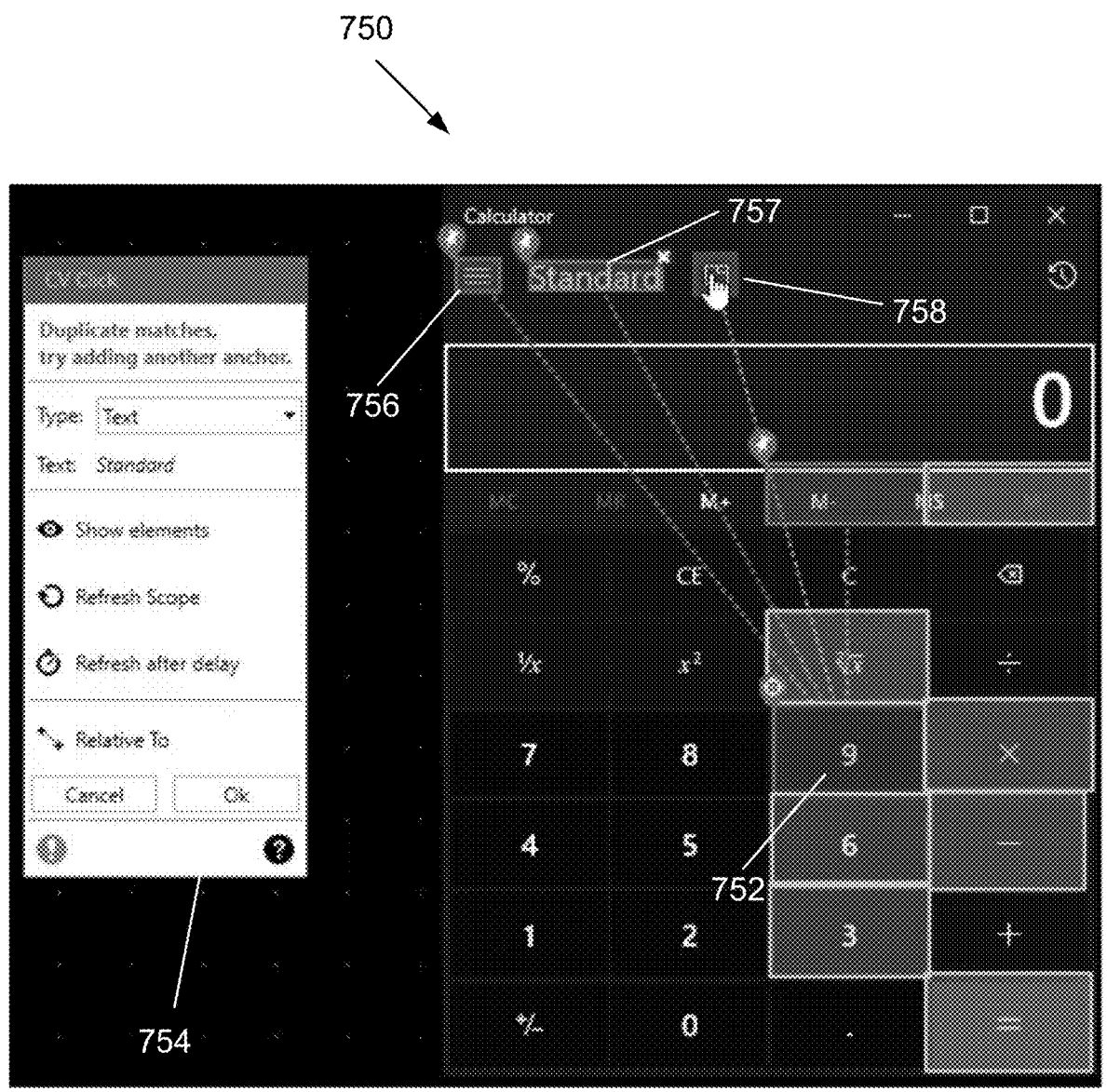
FIG. 7N is a screenshot illustrating the Windows® 10 calculator as modified by UiPath Studio™ and the CV click interface after a developer makes the target selection and anchor selections, according to an embodiment of the present invention.
Figure 70:
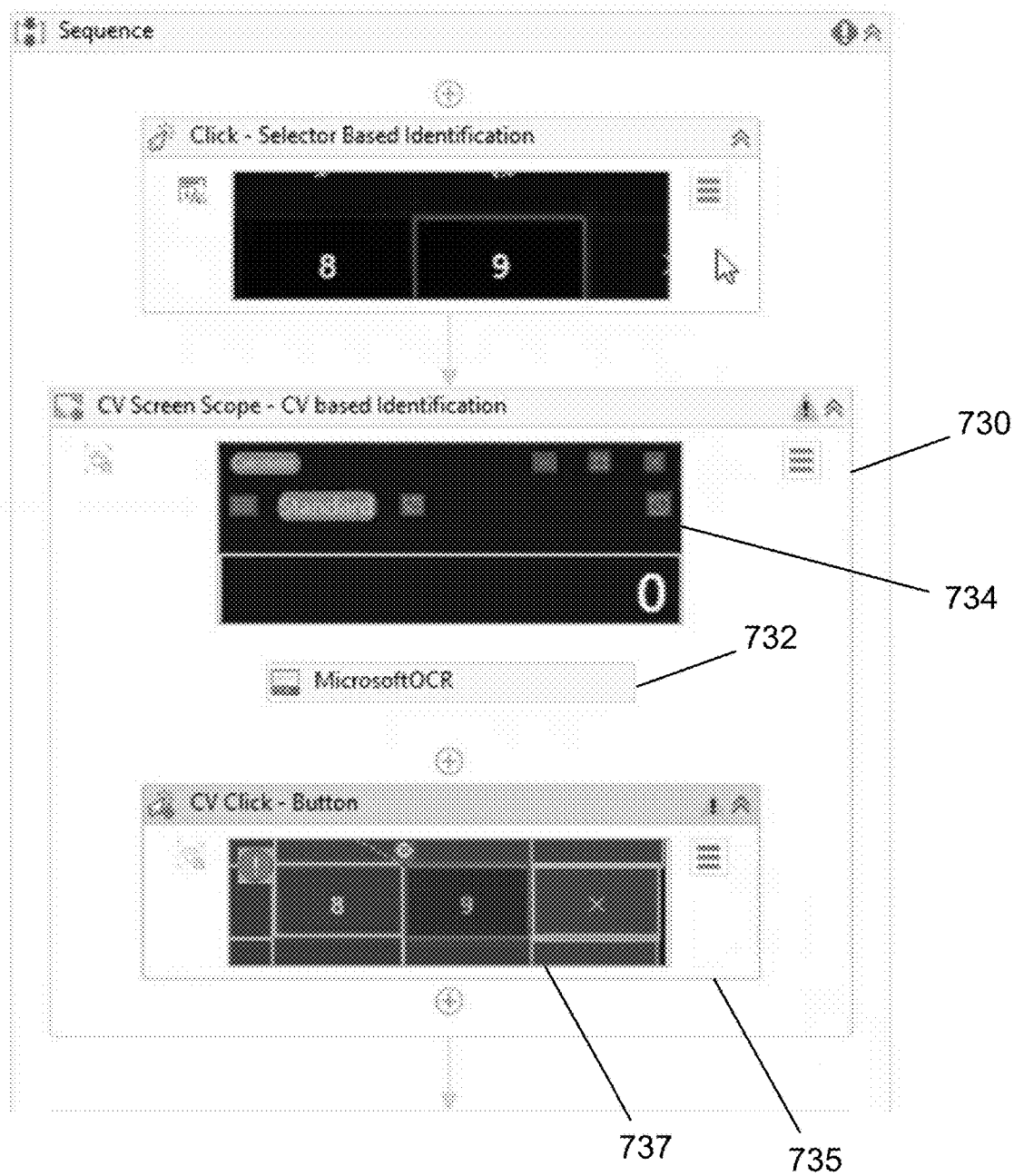

When the developer clicks indicate on scope 736 for CV click activity 735, Windows® 10 calculator 750 appears with a CV click interface 754. See FIG. 7L. However, when the user clicks on 9 button 752, this button is not uniquely recognized using CV. See FIG. 7M. CV click interface 754 displays a message to the developer that duplicate matches were found and asks the developer to add an anchor. The developer then adds anchors for 9 button 752 (e.g., selected anchors 756, 757 and candidate anchor 758 using anchor selection functionality) until button 9 752 is uniquely identified as a target UI element based on its relation to other anchor UI elements in Windows® 10 calculator 750. After the CV descriptor for 9 button 752 uniquely identifies it using the target and anchor(s), a screenshot 737 appears in CV click activity 735. See FIG. 7O. In FIG. 7O, screenshot 737 shows a version without the target and anchors having been properly selected, but this is shown by way of example only. In certain embodiments, the CV descriptor may be saved without configuring it to uniquely identify the target UI element.

Figure 7P:
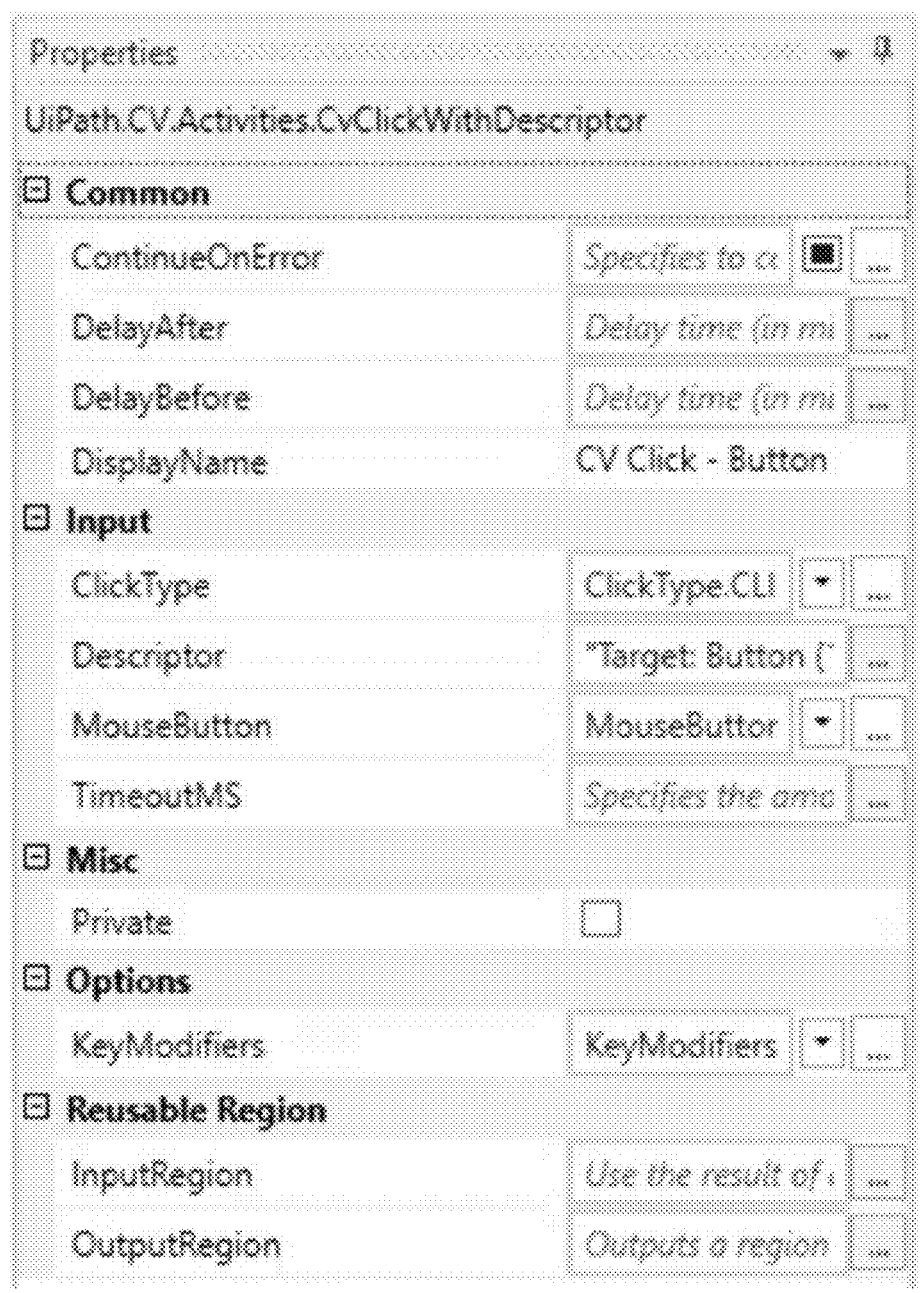
FIG. 7P is a screenshot illustrating a properties tab with the CV click with descriptor properties, according to an embodiment of the present invention.

The developer may view the CV click with descriptor properties using a properties tab 760. See FIG. 7P. This provides various variables of the CV descriptor. However, unlike selectors, the underlying attributes of the selector for the CV descriptor may be complex and pertain to the application of an AI/ML model to the image. Thus, while a CV selector is provided, it may not be readily accessible or modifiable by the developer in some embodiments. Instead, the developer may re-indicate the target UI element in order to edit the CV descriptor/selector. This also means that even non-technical users may indicate targets/anchors in some embodiments. A collection of UI elements on the screen and the UI element that the developer wishes to click may be saved as part of CV-based identification activity 730.

Figure 7Q:
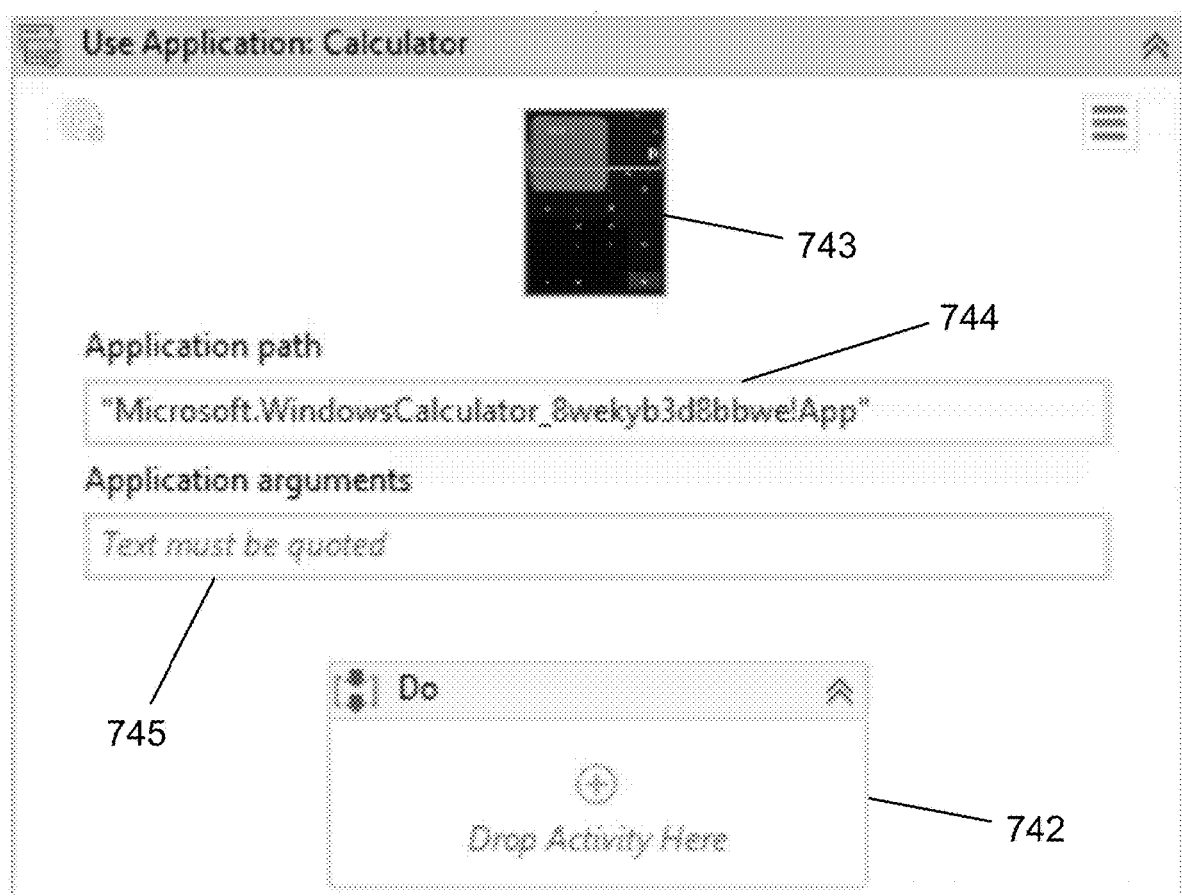
FIG. 7Q is a screenshot illustrating a unified target-based identification activity, according to an embodiment of the present invention.
Figure 7R:
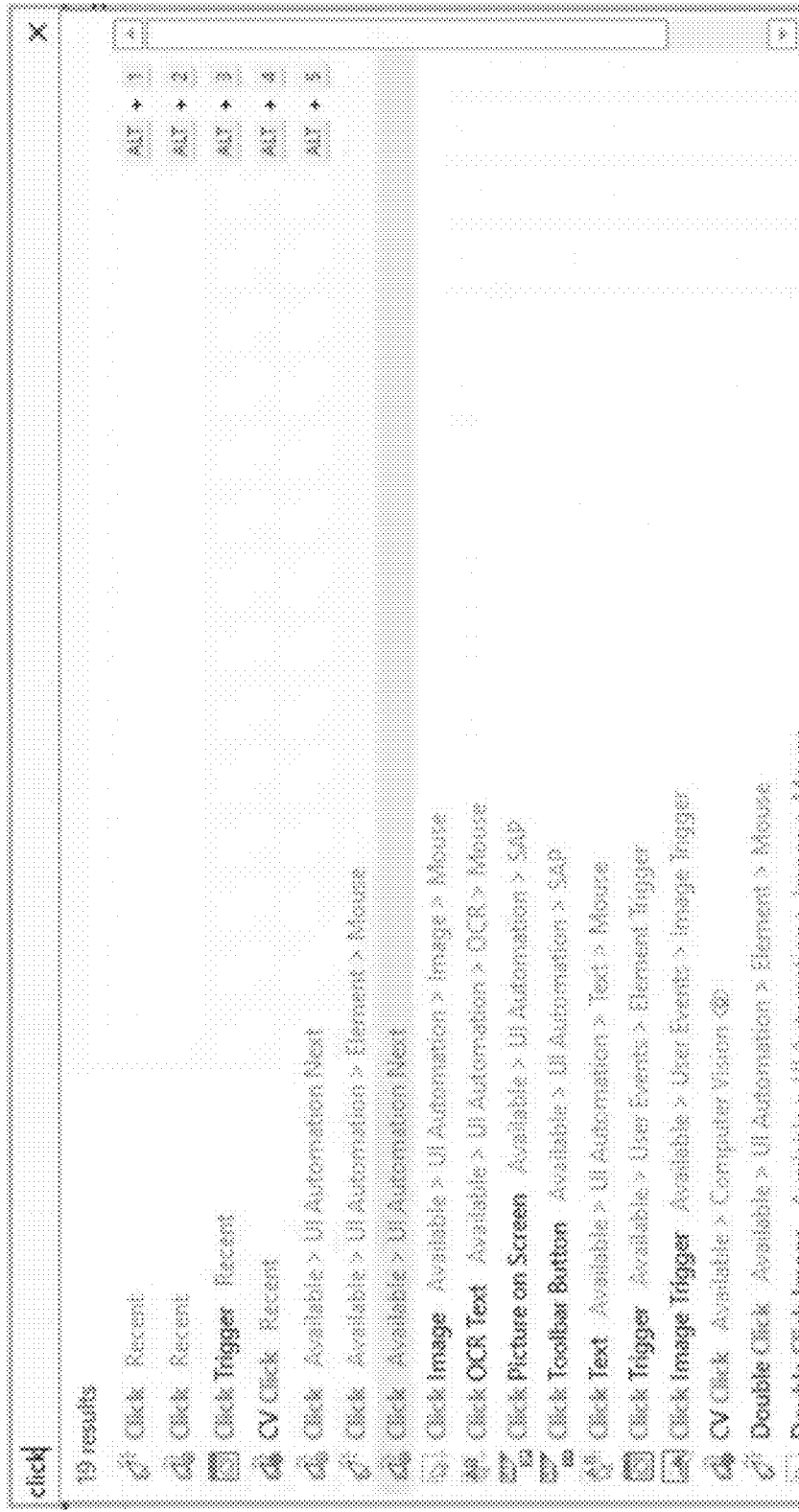
FIG. 7R is a screenshot illustrating the search interface with a unified target click activity highlighted, according to an embodiment of the present invention.

With respect to unified target-based identification activity 740, when the developer selects "Indicate Application" 741 (see FIG. 7B), the user clicks on the UI of Windows® 10 calculator 750, which causes UiPath Studio™ to capture a screenshot 743 of the UI and display screenshot 743 in unified target-based identification activity 740. See FIG. 7Q. An application path 744 for the application associated with screenshot 743 also is shown, and the developer may add application arguments 745, if desired. A do activity 742 is nested in unified target-based identification activity 740. When the developer clicks the plus icon, search interface 708 appears. See FIG. 7R. The developer may then search for the desired click functionality.

Figure 7S:
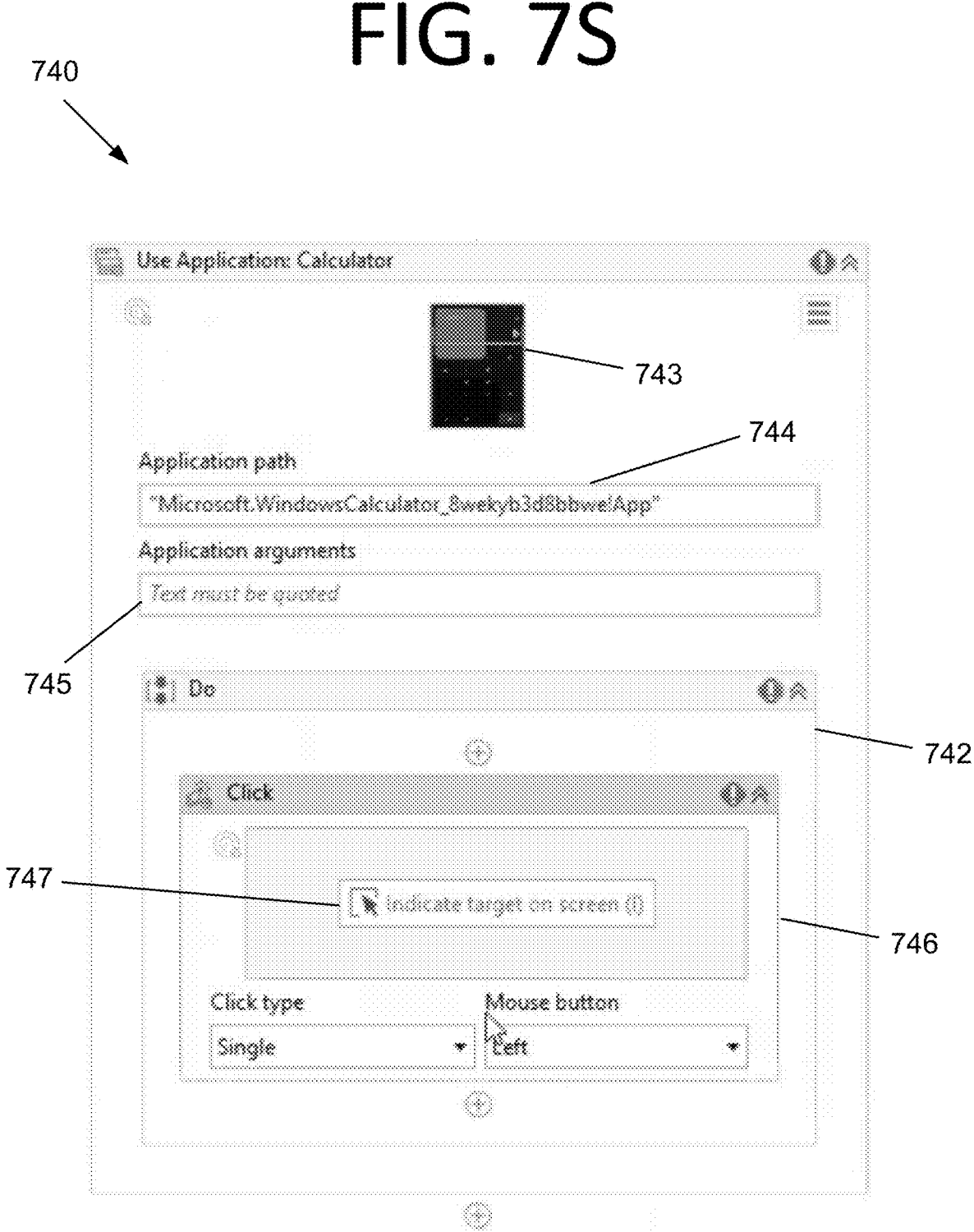
FIG. 7S is a screenshot illustrating the unified target-based identification activity with a nested click activity, according to an embodiment of the present invention.

The selected click option causes a nested click activity 746 to appear within do activity 742. See FIG. 7S. Click activity 746 includes an indicate on screen button 747 that enables the developer to indicate a target to be selected and clicked on the screen. The developer can also specify the click type and the mouse button to be clicked. In this case, a single left click is specified.

Figure 7T:
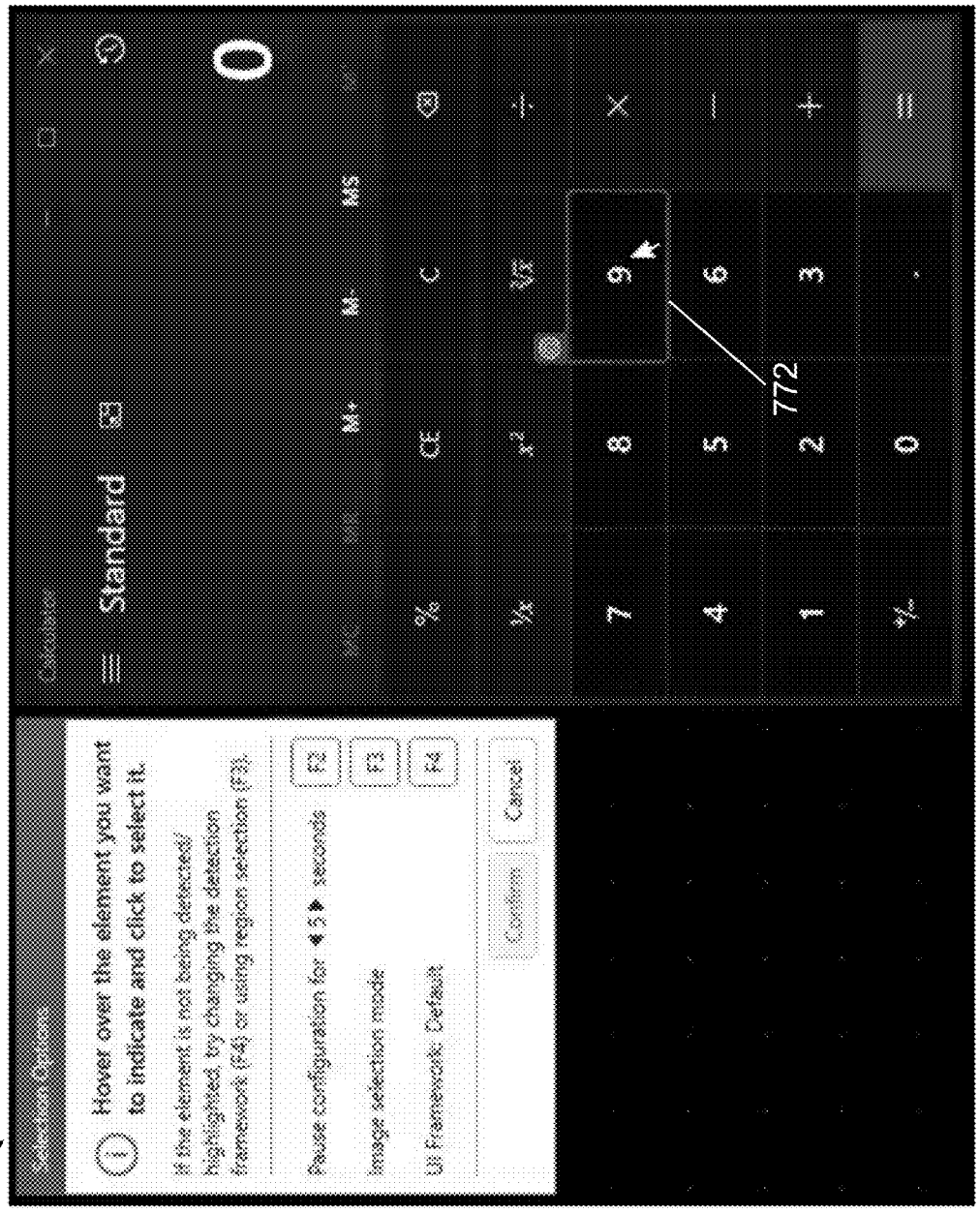
FIG. 7T is a screenshot illustrating the Windows® 10 calculator as modified by UiPath Studio™ and a unified target selection options window, according to an embodiment of the present invention.
Figure 7U:
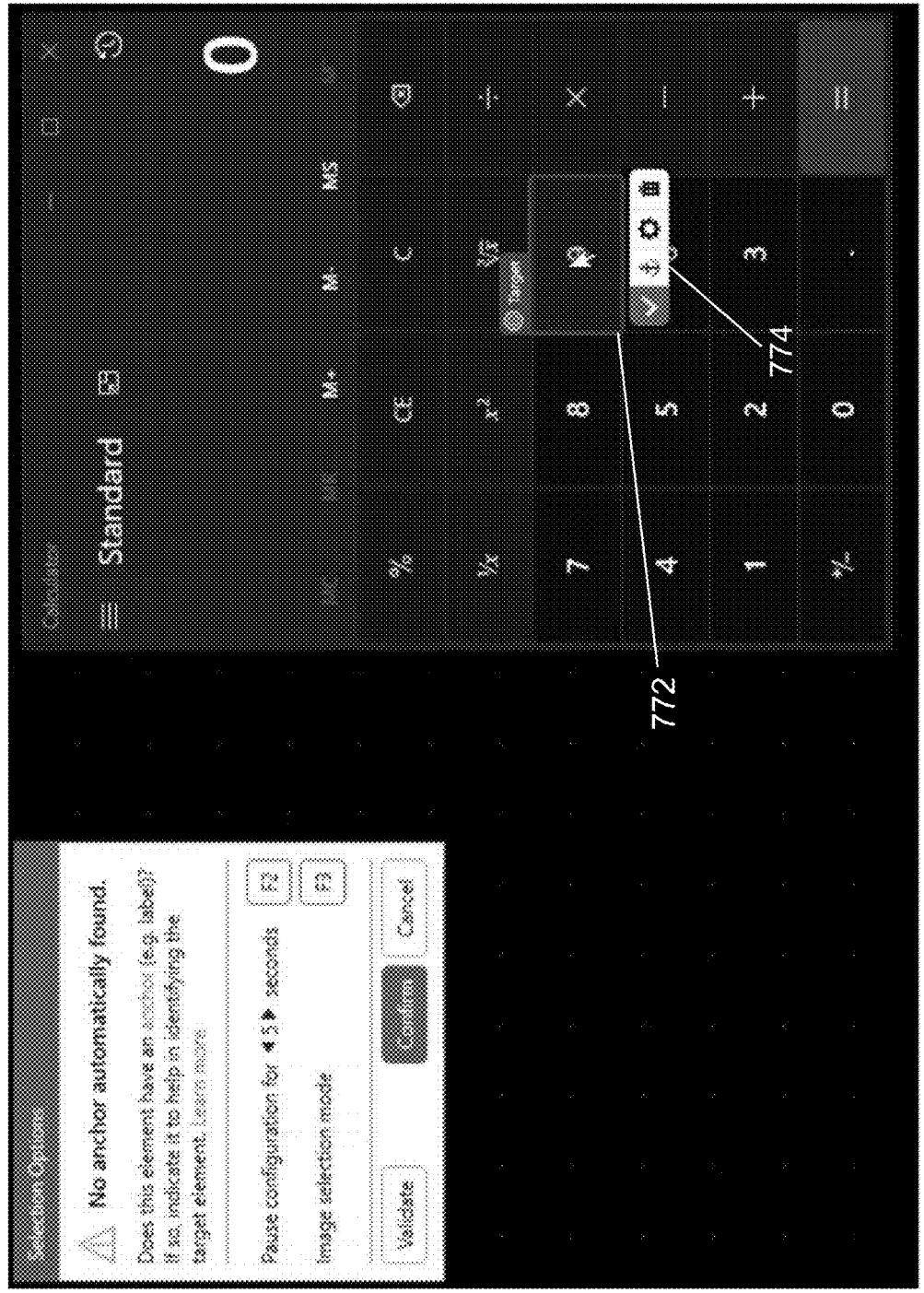
FIG. 7U is a screenshot illustrating the Windows® 10 calculator as modified by UiPath Studio™ with a selected target and the unified target selection options window, according to an embodiment of the present invention.

Clicking indicate on screen button 747 causes a unified target selection options window 770 to appear. See FIG. 7T. Unified target adds targets and/or anchors based on images and uses a selector-based framework behind the scenes. Hovering the mouse over the 9 button causes a target UI element outline 772 to appear. When the user clicks on the 9 button, it is selected as the target, and this status is indicated on target UI element outline 772. See FIG. 7U. Various option icons also appear, including anchor designation icon 774. In this embodiment, UiPath Studio™ attempted to find a suitable anchor automatically, but was unable to do so.

Figure 7V:
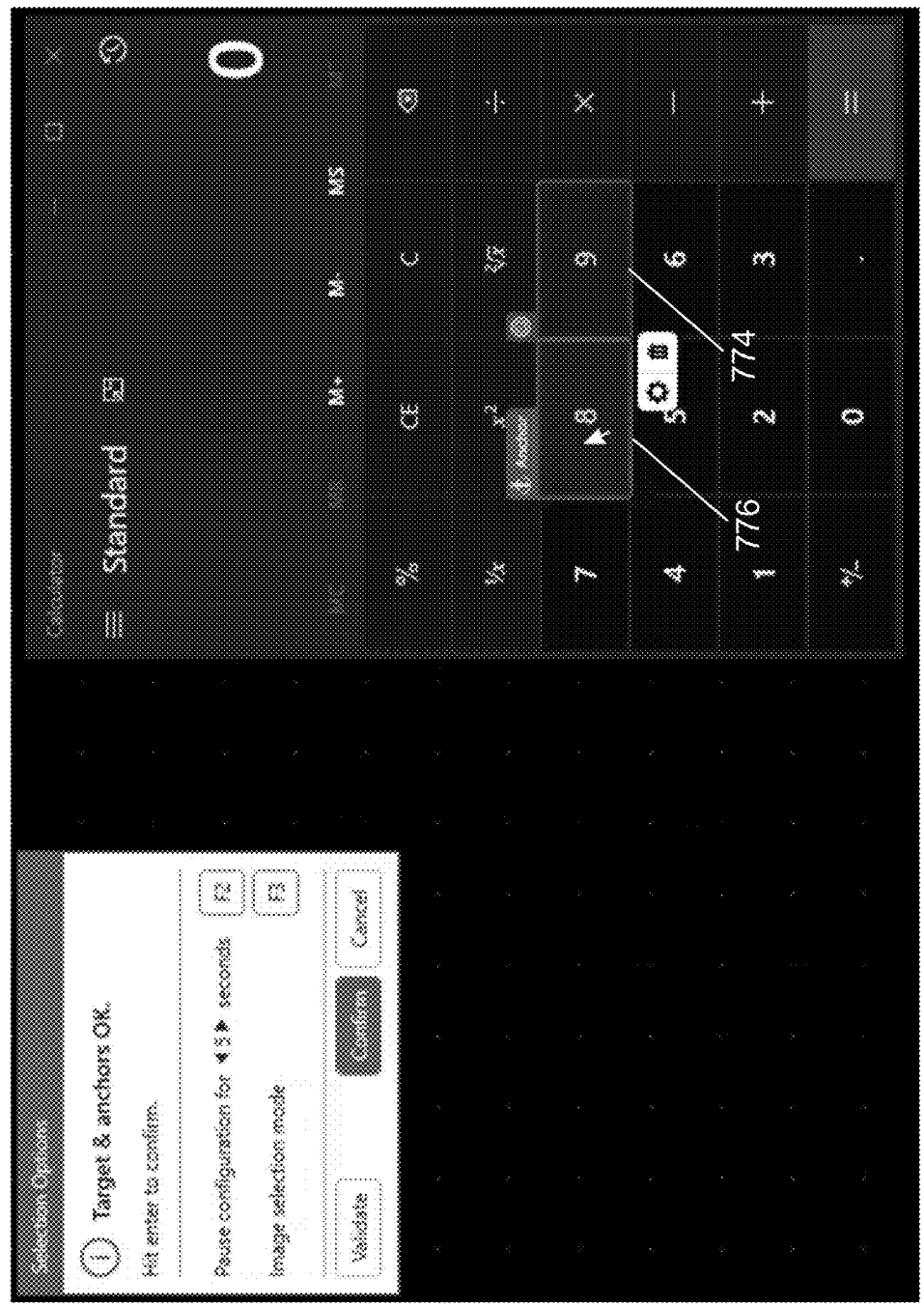
FIG. 7V is a screenshot illustrating the Windows® 10 calculator as modified by UiPath Studio™ with the selected target and a selected anchor, as well as the unified target selection options window, according to an embodiment of the present invention.
Figure 7W:
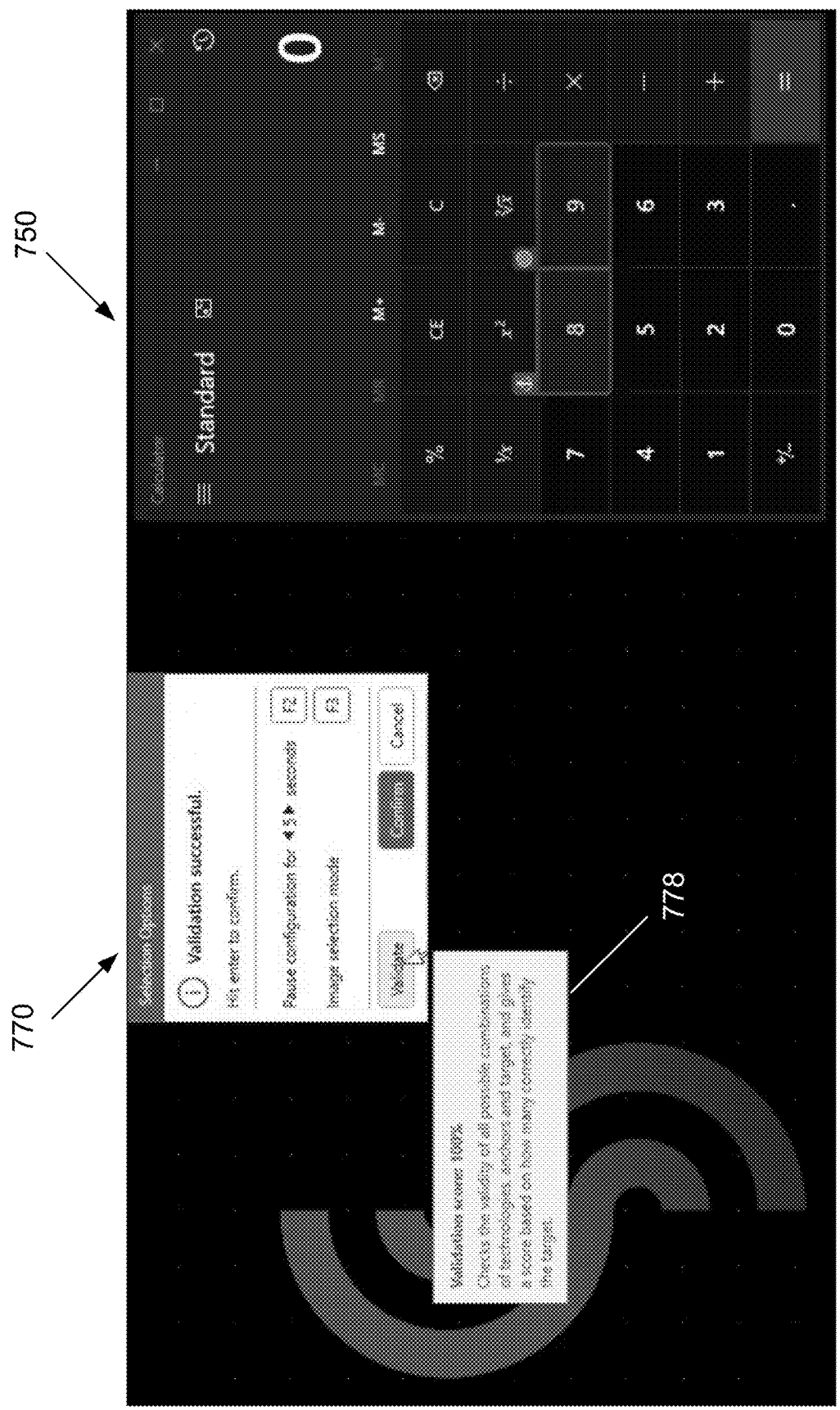
FIG. 7W is a screenshot illustrating the Windows® 10 calculator as modified by UiPath Studio™ with the selected target and the selected anchor being validated via the unified target selection options window, according to an embodiment of the present invention.
Figure 7X:
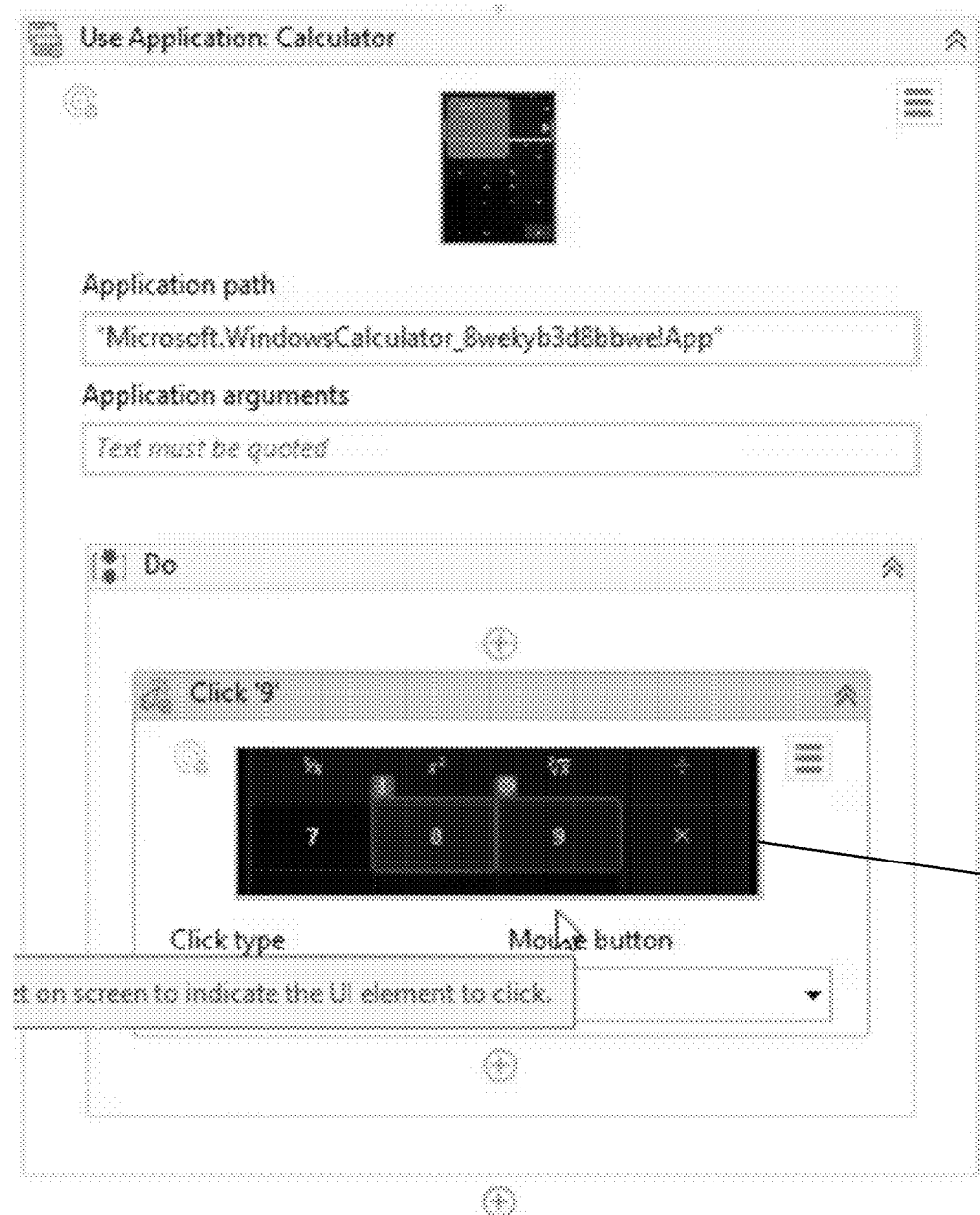
FIG. 7X is a screenshot illustrating the unified target-based identification activity with a screenshot of the target and anchor in the nested click activity, according to an embodiment of the present invention.

The developer designates an anchor 776 (in this case, the 8 button), and the combination of these elements allows the unified target logic to uniquely identify the target 9 button using the combination of the target and the anchor 8 button. See FIG. 7V. This causes unified target selection options window 770 to confirm that the target and anchors are OK, and the designer can validate the target and anchor selectors, confirm the selections, or cancel. Here, the developer chooses to validate the target and anchor selectors, and unified target selection options window 770 confirms that the validation was successful with a validation accuracy score of 100% shown in validation score notification 778. See FIG. 7W. After indicating that the target and anchor selectors are OK, a screenshot 748 of the target and anchor appears. See FIG. 7X. In certain embodiments, CV techniques may be used within the unified target framework.

Figure 7Y:
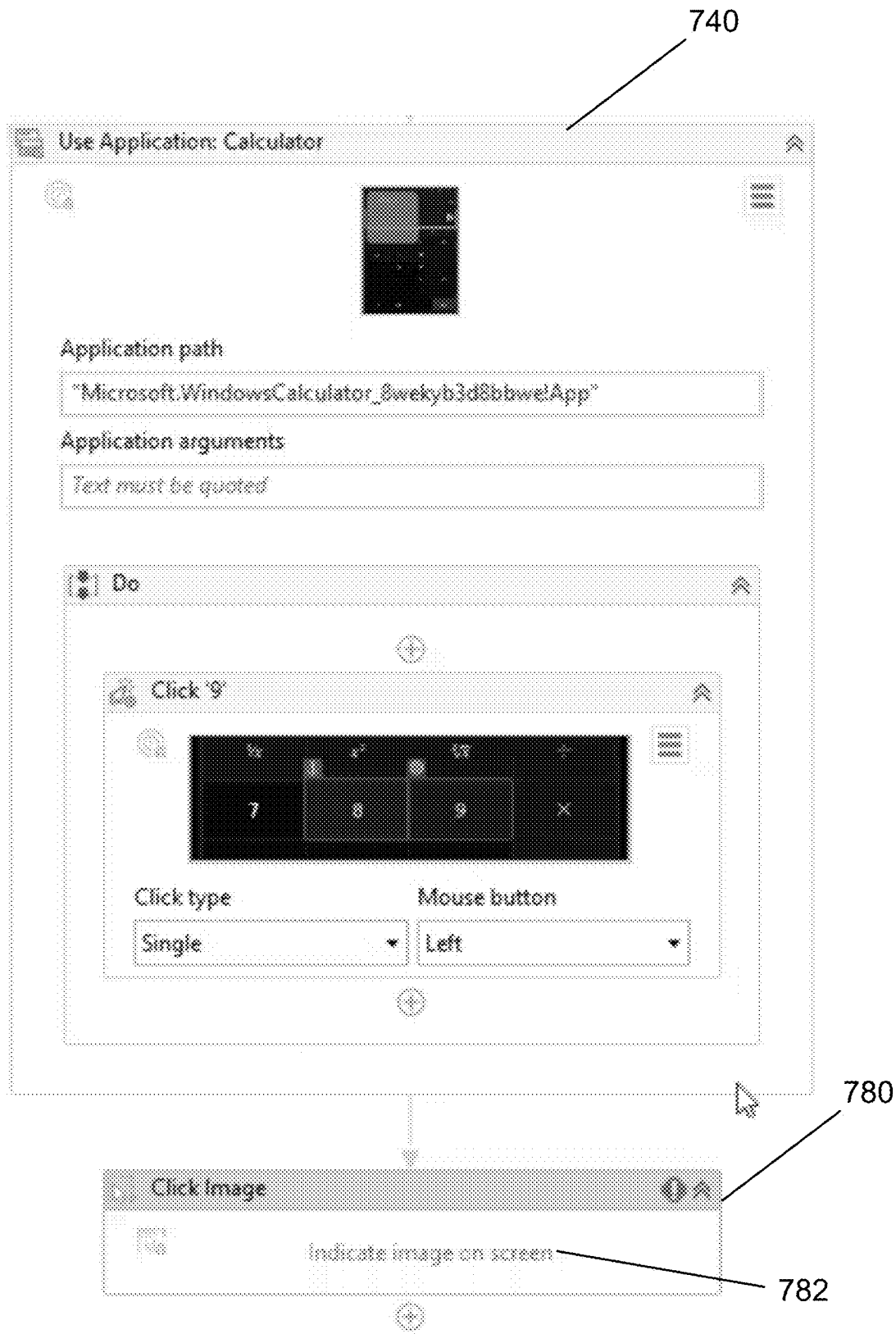
FIG. 7Y is a screenshot illustrating a click image activity added to the workflow, according to an embodiment of the present invention.
Figure 7A:
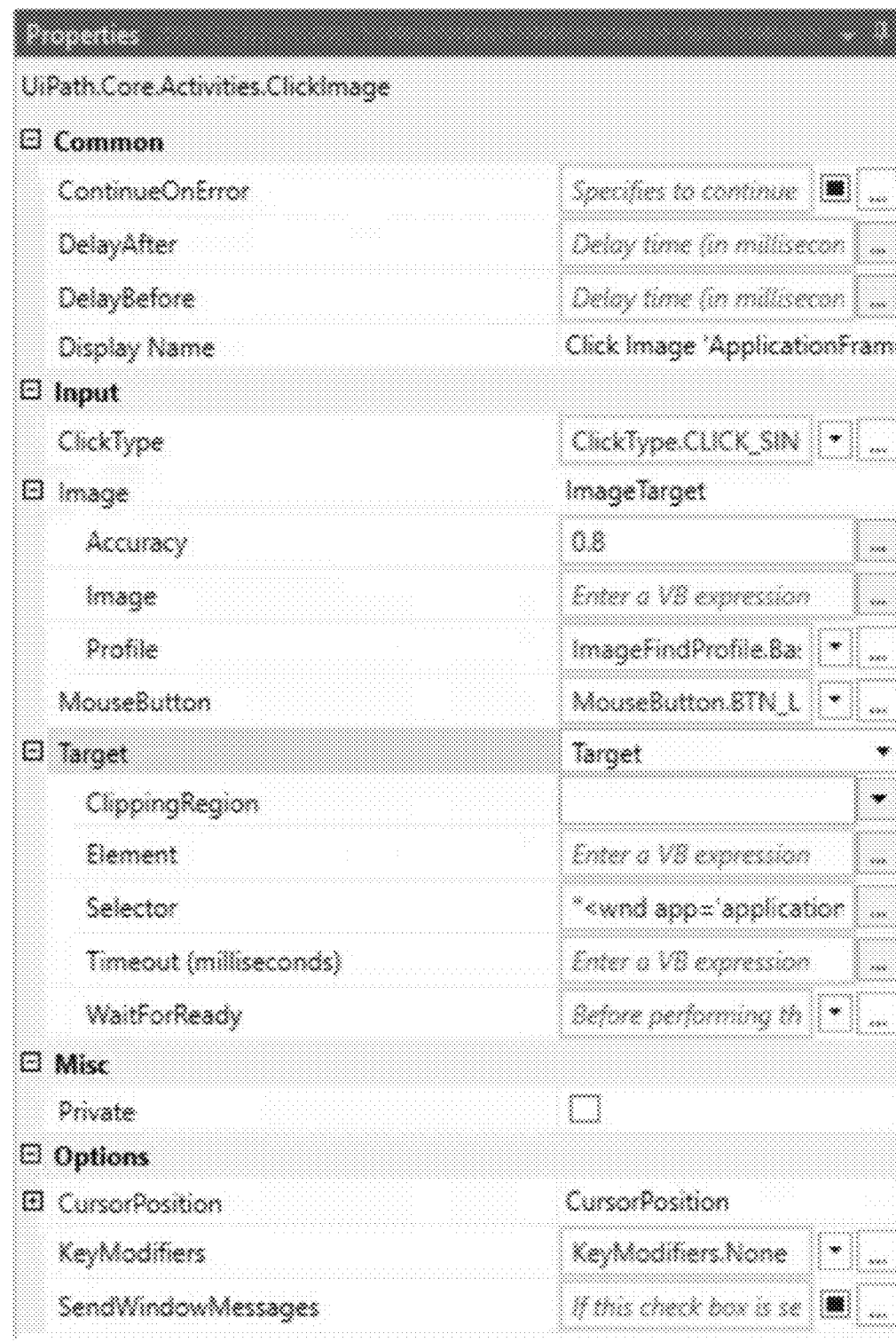
Figure 7B:
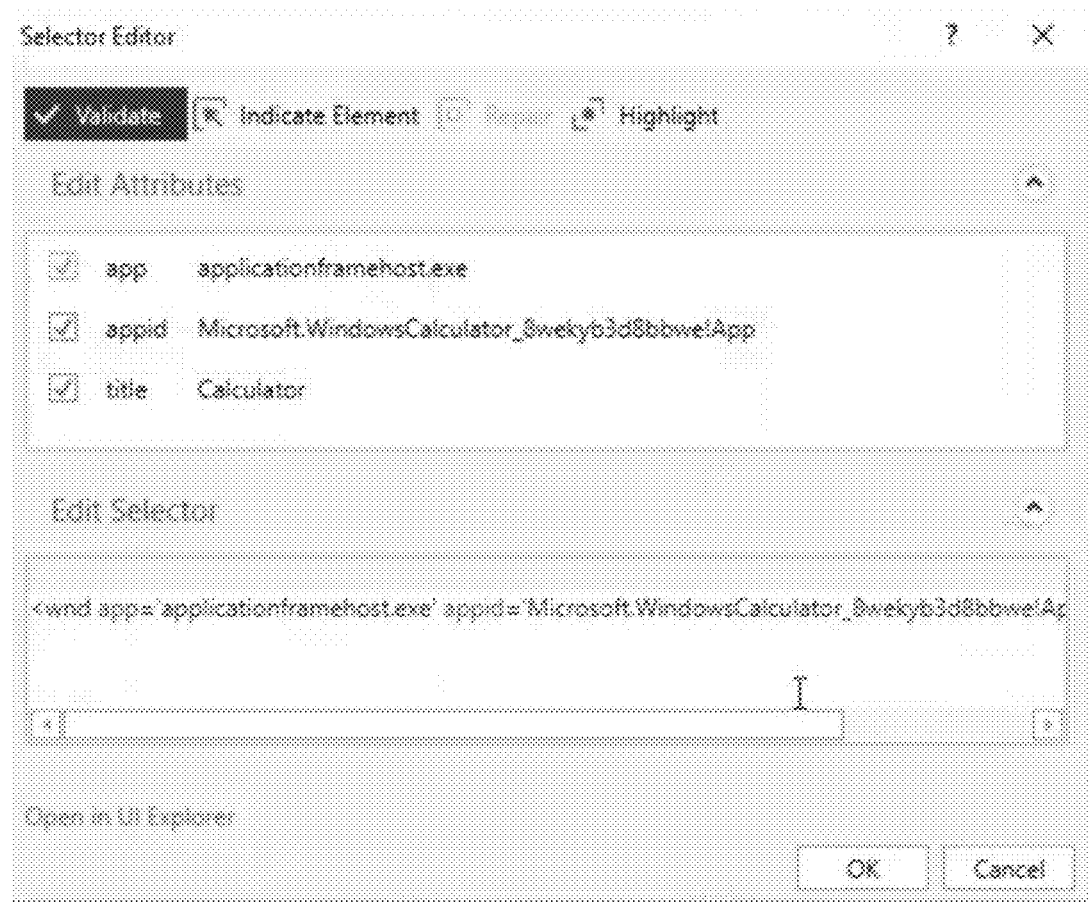
Figure 7C:
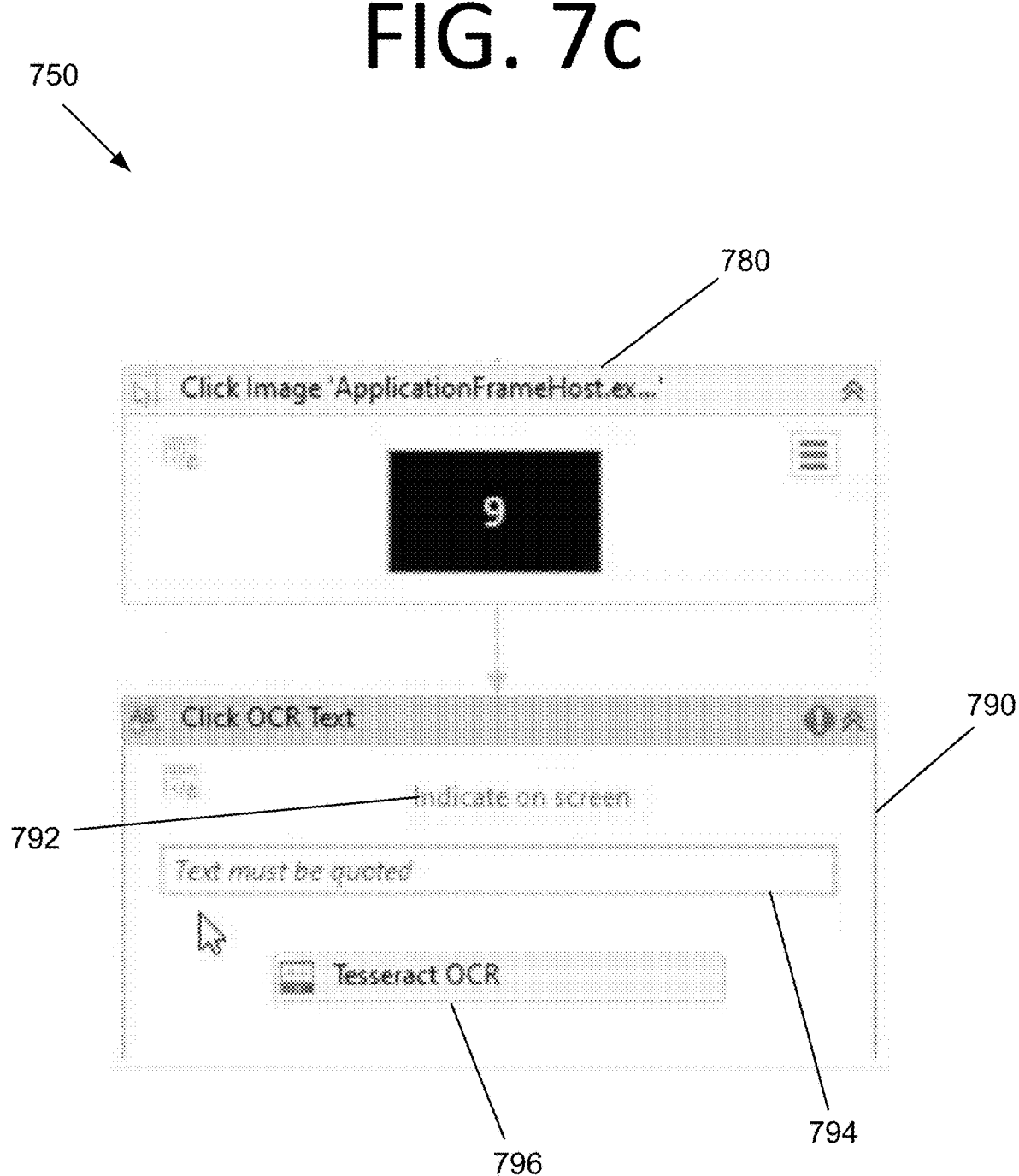
Figure 7D:
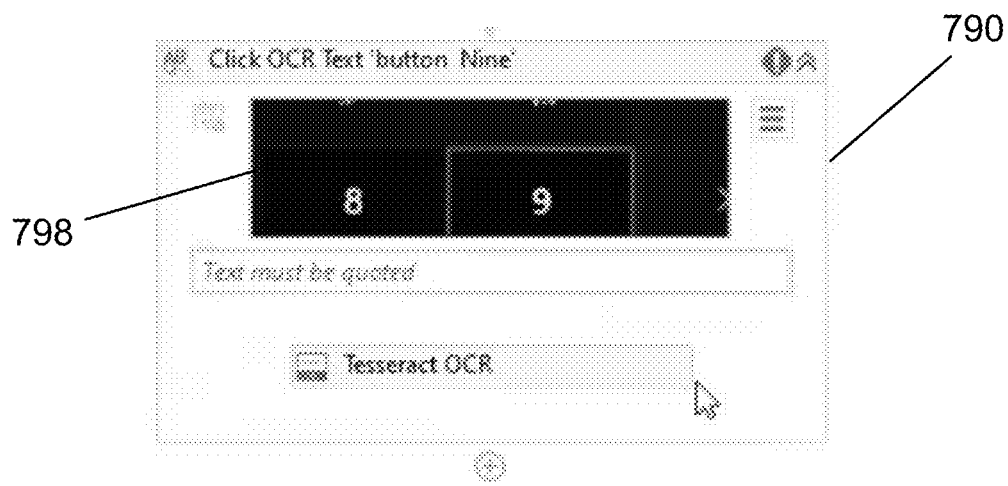

In some embodiments, image matching may be employed to find UI elements. For instance, a click image activity 780 has been added in FIG. 7Y. When the developer selects "indicate image on screen" 782, the developer may define an image for image searching. In FIG. 7Z, the developer drags a box 784 around the 9 button, and a screenshot 786 of the 9 button appears in click image activity 780. Properties of click image activity appear in properties tab 760. See FIG. 7a. A selector for the image is generated as well, as shown in selector editor 726 of FIG. 7*b*. The selector captures the application from which the developer took the snapshot.

In certain embodiments, a combination of a selector and OCR may be used. FIG. 7*c* shows a click OCR text activity 790 that includes a field 794 where a developer can manually input text to search for and an OCR engine 796. In this embodiment, when the user clicks "Indicate on screen" 792, the user selects a UI element in a similar manner to the selector-based approach (see FIG. 7C). After the selection of the UI element, a screenshot 798 of the selected UI element appears in click OCR text activity 790. See FIG. 7*d*. However, unlike the selector-based approach, the selector and OCR approach additionally employs OCR to identify the UI element. For instance, while many of the calculator buttons have the same shape, only one button has each number.

FIG. 8 is a flowchart illustrating a process 800 for generating a selector-based activity, according to an embodiment of the present invention. The process begins with generating a selector-based activity at 810. The activity may click a button, enter text, open a menu and select an option, etc. An indicate on screen command is received at 820, and the application is detected at 830. This may include autodetecting an application, detecting a version of the application, and/or detecting a screen within the application in some embodiments. If the application is not autodetected, detecting the application may include requesting for a user to provide the application name and version. For instance, a dropdown list may be provided to the user to provide the application name and the application version if multiple applications are detected and/or the user may enter this information manually.

A series of activities may be provided that allow the developer to create the desired RPA process. Some activities may allow users use to indicate screens/applications. When a user wishes to perform an automation, the user may indicate a screen, a UI element on the screen, etc., that activities should interact with. Certain activities may open applications. This may include opening a desktop application, navigating using a URL, etc.

The UI elements on the application screen are detected at 840. The detected elements may be highlighted for the user to generate a UI model in some embodiments. The detected UI elements may be organized as a taxonomy, or tree, as a model of the screen. However, in certain embodiments, a non-taxonomical approach may be used, such as an ontology. Ontologies may define certain structural and logical relationships between screens. For instance, if the "Submit" button is clicked on one screen, this may cause another screen to appear with at least some different UI elements. Also, certain UI elements and/or portions of the screen may be common to multiple screens. For instance, in Microsoft Outlook®, the left rail navigation subscreen typically does not change and may be reusable between screens. Knowing which subscreens and/or UI elements do not change may reduce processing time.

An indication of the UI element for the activity is received from the user at 850. This may include clicking a desired UI element in some embodiments. An out-of-the-box selector is generated for the indicated UI element using a driver (e.g., driver 340) based on a best match for the UI element and the activity is configured accordingly at 860.

FIG. 9 is a flowchart illustrating a process 900 for generating a CV descriptor-based activity, according to an embodiment of the present invention. The process begins with generating a CV descriptor-based activity at 910. An indicate on screen command and a user selection of the screen to automate are received at 920. For instance, the user may select an entire application interface in some embodiments. The application is detected at 930 and the UI elements on the application screen are detected at 940 using CV.

A command is received to designate UI elements for an interaction and the interface is displayed with selectable UI elements detected by CV at 950. A selection of a target UI element is then received from the user at 960. If the target can be uniquely identified at 970, the CV descriptor is generated and the activity is configured accordingly at 980. However, if the target cannot be uniquely identified at 970, anchor designations are required and received from the user until the target can be uniquely identified at 990. The process then proceeds to step 980 to generate the CV descriptor and configure the activity.

FIG. 10 is a flowchart illustrating a process 1000 for generating a unified target-based activity, according to an embodiment of the present invention. An indicate application command and a user selection of the screen to automate are received at 1020. For instance, the user may select an entire application interface in some embodiments. The application is detected at 1030 and the UI elements on the application screen are detected at 1040 using the driver, for example.

A command is received to designate UI elements for an interaction and the interface is displayed with selectable UI elements detected by the driver at 1050. A selection of a target UI element is then received from the user at 1060. If the target can be uniquely identified at 1070 using the selector for that element alone, the unified target descriptor is generated (e.g., a selector) and the activity is configured accordingly at 1080. However, if the target cannot be uniquely identified at 1070, anchor designations are required and received from the user until the target can be uniquely identified at 1090. In some embodiments, this may include validating the target and anchor(s) by determining a validation score. The process then proceeds to step 1080 to generate the unified target descriptor (e.g., selectors for the target and anchor(s) and positional/geometric relationships therebetween) and configure the activity.

In order to determine whether UI elements are uniquely identified, a strength computation (e.g., a validation score) may be used to determine how well the target UI element is believed to match based on the unified target UI descriptor. If the strength computation is below a threshold (e.g., below 97%, below 95%, etc.), it is possible that the UI element may not be determined as accurately as desired at runtime. The acceptable accuracy may vary based on task(s) being accomplished by the RPA workflow. UI element targets falling below the threshold may require anchors for unique identification. These anchors may be determined automatically and displayed to the user, or the user may mouse over UI elements to select anchors. Unified target descriptor strength due to adding a given anchor may be shown to the user in some embodiments. If the threshold still is not met after adding an anchor, the user may be required to continue adding additional anchors until the threshold is met for the target UI element.

Anchors are other UI elements on the screen that can be used to assist in uniquely identifying a target UI element on the screen. For instance, if multiple text fields are included on a screen, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field for the selector, which is the "target".

Various positional and/or geometric associations between the target and the anchor may be used in some embodiments, potentially within a tolerance, to uniquely identify the target. For instance, the center of a bounding box for the anchor and the target may be used to define a line segment. This line segment could then be required to have a certain length within a tolerance and/or slope within a tolerance to uniquely identify the target using the target/anchor pair.

In some cases, a single anchor may not be sufficient to uniquely identify a target element on a screen. For instance, consider the case where two text field for entering a first name appear to the right of respective labels "First Name" in different locations on the screen. In such cases, one or more additional anchors may be useful to uniquely identify a given target. The geometric properties between the anchors and the target (e.g., line segment lengths, angles, and/or relative locations with tolerances) may be used to uniquely identify the target. The user may be required to continue to add anchors until a match strength for the target exceeds the threshold.

In some embodiments, rather than marking and displaying the UI elements and anchor candidates to the user, one or more anchors may automatically be assigned to until the strength computation exceeds the threshold. For instance, if the threshold is 97% and a given UI element has a match strength of 90%, the system may continue to add anchors until the match strength meets or exceeds the threshold. This may be accomplished in some embodiments by determining an anchor that increases the match strength the most for the selector, adding this anchor, if still below the threshold, determining match strength increases for other elements after adding the anchor, adding the anchor causing the highest increase in match strength, and repeating until the threshold is met.

FIG. 11 is a flowchart illustrating a process 1100 for generating an image matching activity, according to an embodiment of the present invention. The process begins with generating an image matching activity at 1110. The activity may click a button, enter text, open a menu and select an option, etc. based on image matching techniques. An indicate on screen command is received at 1120, and the application is detected at 1130.

A selection of a region of the application on which image matching is to be performed is received at 1140. This may include the user drawing a box around the UI element of interest, using a lasso tool, drawing a freeform selection, or any other selection mechanism without deviating from the scope of the invention. The image matching selector is then generated for the selected image and the activity is configured accordingly at 1150.

FIG. 12 is a flowchart illustrating a process 1200 for generating a selector and OCR-based activity, according to an embodiment of the present invention. The process begins with generating a selector and OCR-based activity at 1210. The activity may click a button, enter text, open a menu and select an option, etc. An indicate on screen command is received at 1220, and the application is detected at 1230. The UI elements on the application screen are also detected at 1240.

An indication of the UI element for the activity is received from the user at 1250. This may include clicking a desired UI element in some embodiments. An out-of-the-box selector is generated for the indicated UI element using a driver based on a best match for the UI element and the activity is configured accordingly at 1260. A selection of an OCR engine is received and the activity is configured accordingly at 1270. Rather than searching for the selector alone, the selector and OCR-based activity, when executed as part of an RPA process, checks both that the selector for the UI element is found and verifies that the text of the UI element matches text designated in the activity using OCR.

FIG. 13 is a flowchart illustrating a process 1300 for generating an RPA workflow that uses multiple identification techniques, according to an embodiment of the present invention. The process begins with generating UI element identification and interaction activities at 1310. The activities may be one or more selector-based identification activities, CV-based identification activities, unified target identification activities, image matching identification activities, selector and OCR-based identification activities, any other suitable identification activities, any combination thereof, etc.

The UI element identification and interaction activities are then configured into a logical relationship at 1320. The logical relationship may be sequential, conditional (e.g., if the first activity does not uniquely detect the UI element successfully, use the second, then the third, etc. until the UI element is uniquely identified or all activities have been attempted), in parallel, etc. An RPA robot implementing a workflow that includes the UI element identification and interaction activities is generated at 1330, and the RPA robot is executed to detect and interact with the UI element at 1340.

FIG. 14 is a flowchart illustrating a process 1400 for creating a UI object library and configuring a project to work with a new version of an application, according to an embodiment of the present invention. The process may begin with loading one or more UI object libraries from a UI object repository if these have been previously created at 1410. UI descriptors for interacting with respective UI elements for the activities are then created and/or added from one or more UI object libraries at 1420 to interact with a new version of an application with a changed UI.

Once the appropriate UI descriptors have been updated, a UI object library including the UI descriptors is published in the UI object repository at 1430. The UI object library may also include the application, screens, and least some UI elements from the application with which the activities interact. However, in certain embodiments, other UI elements and/or UI descriptors may be included that are not specifically used in the RPA workflow. The UI object library is then published or republished in the UI object repository at 1440 for use in other RPA workflows and/or by other developers.

If UI objects are missing from the UI object library or UI descriptors for activities no longer work for a new version of an application, the user may thus add these. The created UI object library, and potentially other UI object libraries in the UI object repository, may be displayed to the user in the designer application. The publication of the object library may be performed as part of a global object library database (OLDB) or a local OLDB in some embodiments. The global OLDB UI object repository may be a globally shared database (Center of Excellence (CoE) level), for instance. The local OLDB UI object repository may be a locally shared database (local machine level). In some embodiments, the UI object libraries may be pushed and published to a service, such as a UiPath™ service or Go! service. This allows sharing of a set of UI object libraries with the world, if desired. The storage form for the UI object repository (e.g., an OLDB) should be decided at an architectural/technical level.

The process steps performed in FIGS. 8-14 may be performed by a computer program, encoding instructions for the processor(s) to perform at least part of the process(es) described in FIGS. 8-14 in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 8-14, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program for using a user interface (UI) object repository for robotic process automation (RPA) at runtime embodied on a non-transitory computer-readable medium, the computer program configured to cause at least one processor to:
   execute an RPA workflow; and
   call one or more UI descriptors referenced in one or more respective activities of the RPA workflow from one or more UI object libraries of a UI object repository by executing respective sets of instructions comprising an application and an application version, wherein
   the UI descriptors identify respective graphical elements in the UI for the respective activities in the RPA workflow at runtime,
   the UI object repository comprises UI descriptors corresponding to one or more screens from multiple application versions of an application, and
   the UI descriptors comprise a UI element selector, an anchor selector, a computer vision (CV) descriptor, a unified target descriptor, a screen image capture, a graphical element image capture, or any combination thereof.

2. The computer program of claim 1, wherein the one or more UI descriptors are called via one or more web services.

3. The computer program of claim 1, wherein the computer program is configured to call a version of the one or more UI descriptors via the UI object repository that corresponds with an application version from the multiple application versions of the application.

4. The computer program of claim 1, wherein the RPA workflow comprises a selector-based identification activity, a CV-based identification activity, a unified target identification activity, an image matching identification activity, a selector and optical character recognition (OCR)-based identification activity, or a combination thereof.

5. The computer program of claim 1, wherein at least one of the one or more UI object libraries is an encapsulation of UI descriptors grouped by applications, application versions, and screens.

6. The computer program of claim 1, wherein the one or more object libraries are configured as dependencies of the computer program.

7. The computer program of claim 1, wherein an application shown in the UI is a web application and the one or more UI descriptors comprise HyperText Markup Language (HTML) paths to the respective graphical elements for the one or more corresponding UI descriptors.

8. The computer program of claim 1, wherein the computer program is or comprises an RPA robot.

9. The computer program of claim 1, wherein the computer program is further configured to cause the at least one processor to:
extract the one or more UI descriptors from the one or more activities of the RPA workflow; and
add the extracted one or more UI descriptors to a structured schema that groups the one or more UI descriptors by UI applications, screens, and graphical elements of the UI.

10. The computer program of claim 1, wherein the computer program is further configured to cause the at least one processor to:
scan a set of projects in the UI object repository;
detect processes in the scanned projects that are using UI descriptors that belong to the application and the application version; and
automatically update at least one of the one or more UI descriptors with one or more respective UI descriptors from the detected processes.

11. A computer-implemented method for using a user interface (UI) object repository for robotic process automation (RPA) at runtime, comprising:
executing an RPA workflow, by an RPA robot; and
calling one or more UI descriptors referenced in one or more respective activities of the RPA workflow from one or more UI object libraries of a UI object repository, by the RPA robot, by executing respective sets of instructions comprising an application and an application version, wherein
the UI descriptors identify respective graphical elements in the UI for the respective activities in the RPA workflow at runtime,
the UI object repository comprises UI descriptors corresponding to one or more screens from multiple application versions of an application, and
the UI descriptors comprise a UI element selector, an anchor selector, a computer vision (CV) descriptor, a unified target descriptor, a screen image capture, a graphical element image capture, or any combination thereof.

12. The computer-implemented method of claim 11, wherein the one or more UI descriptors are called via one or more web services.

13. The computer-implemented method of claim 11, wherein the RPA robot is configured to call a version of the one or more UI descriptors via the UI object repository that corresponds with an application version from the multiple application versions of the application.

14. The computer-implemented method of claim 11, wherein the RPA workflow comprises a selector-based identification activity, a CV-based identification activity, a unified target identification activity, an image matching identification activity, a selector and optical character recognition (OCR)-based identification activity, or a combination thereof.

15. The computer-implemented method of claim 11, wherein at least one of the one or more UI object libraries is an encapsulation of UI descriptors grouped by applications, application versions, and screens.

16. The computer-implemented method of claim 11, wherein the one or more object libraries are configured as dependencies of the RPA robot.

17. The computer-implemented method of claim 11, wherein an application shown in the UI is a web application and the one or more UI descriptors comprise HyperText Markup Language (HTML) paths to the respective graphical elements for the one or more corresponding UI descriptors.

18. A computer-implemented method for using a user interface (UI) object repository for robotic process automation (RPA) at runtime, comprising:
executing an RPA workflow, by an RPA robot; and
calling one or more UI descriptors referenced in one or more respective activities of the RPA workflow from one or more UI object libraries of a UI object repository, by the RPA robot, wherein
the UI descriptors identify respective graphical elements in the UI for the respective activities in the RPA workflow at runtime,
the RPA robot is configured to call a version of the one or more UI descriptors via the UI object repository, the version of the one or more UI descriptors corresponding to one or more screens from multiple application versions of an application, and
the one or more object libraries are configured as dependencies of the RPA robot.

19. The computer-implemented method of claim 18, wherein the one or more UI descriptors are called via one or more web services.

20. The computer-implemented method of claim 18, wherein the RPA workflow comprises a selector-based identification activity, a (CV)-based identification activity, a unified target identification activity, an image matching identification activity, a selector and optical character recognition (OCR)-based identification activity, or a combination thereof.

21. The computer-implemented method of claim 18, wherein at least one of the one or more UI object libraries is an encapsulation of UI descriptors grouped by applications, application versions, and screens.

22. The computer-implemented method of claim 18, wherein an application shown in the UI is a web application and the one or more UI descriptors comprise HyperText Markup Language (HTML) paths to the respective graphical elements for the one or more corresponding UI descriptors.

* * * * *